US009142104B2

(12) United States Patent
Nakamura et al.

(10) Patent No.: US 9,142,104 B2
(45) Date of Patent: Sep. 22, 2015

(54) HAPTIC INFORMATION PRESENTATION SYSTEM AND METHOD

(71) Applicant: NATIONAL INSTITUTE OF ADVANCED INDUSTRIAL SCIENCE AND TECHNOLOGY, Tokyo (JP)

(72) Inventors: Norio Nakamura, Ibaraki (JP); Yukio Fukui, Ibaraki (JP); Masataka Sakai, Ibaraki (JP)

(73) Assignees: National Institute of Advanced Industrial Science and Technology, Tokyo (JP); MIRAISENS, INC., Ibaraki (JP)

( * ) Notice: Subject to any disclaimer, the term of this patent is extended or adjusted under 35 U.S.C. 154(b) by 0 days.

(21) Appl. No.: 13/855,881

(22) Filed: Apr. 3, 2013

(65) Prior Publication Data

US 2013/0265148 A1    Oct. 10, 2013

Related U.S. Application Data

(63) Continuation of application No. 12/710,813, filed on Feb. 23, 2010, which is a continuation of application No. 10/579,672, filed as application No. PCT/JP2004/017277 on Nov. 19, 2004, now abandoned.

(30) Foreign Application Priority Data

| Nov. 20, 2003 | (JP) | 2003-390802 |
| Dec. 2, 2003 | (JP) | 2003-402892 |
| Nov. 15, 2004 | (JP) | 2004-331263 |

(51) Int. Cl.
*H04B 3/36*    (2006.01)
*G08B 6/00*    (2006.01)
(Continued)

(52) U.S. Cl.
CPC G08B 6/00 (2013.01); G06F 3/016 (2013.01); *G10K 15/04* (2013.01); *H04B 3/36* (2013.01); *G06F 3/041* (2013.01); *G09G 5/00* (2013.01)

(58) Field of Classification Search
CPC .......... G06F 3/016; G06F 3/011; G08B 6/00; G10K 15/04; A63F 13/06; B06B 1/0276
USPC ................. 340/407.1, 407.2; 341/20–27, 34; 345/168–183, 156, 161, 163, 167, 157; 715/701, 702
See application file for complete search history.

(56) References Cited

U.S. PATENT DOCUMENTS 6,275,213 B1 * 8/2001 Tremblay et al. .............. 345/156
7,079,995 B1 * 7/2006 Buttafoco ........................ 703/6
(Continued)

FOREIGN PATENT DOCUMENTS

| JP | 9-221753 A | 8/1997 |
| JP | 11-150794 A | 6/1999 |

(Continued)

OTHER PUBLICATIONS

Mar. 8, 2005 International Search Report in PCT/JP/2004/017277, National Institute of Advanced Industrial Science and Technology, Applicant, 2 pages.
(Continued)

*Primary Examiner* — Ariel Balaoing
*Assistant Examiner* — Mancil Littlejohn, Jr.

(57) ABSTRACT

A system and method are disclosed in which in a conventional non-grounding man-machine interface having no reaction base on the human body and for giving the existence of a virtual object and the impact force of a collision to a person, a haptic sensation of a torque, a force and the like can be continuously presented in the same direction, which cannot be presented by only the physical characteristic of a haptic sensation presentation device. In a haptic presentation device, the rotation velocity of at least one rotator in the haptic presentation device is controlled by a control device, and a vibration, a force or a torque as the physical characteristic is controlled, so that the user is made to conceive various haptic information of the vibration, force, torque or the like.

26 Claims, 39 Drawing Sheets

(51) Int. Cl.
*G09G 5/00* (2006.01)
*G06F 3/033* (2013.01)
*G06F 3/02* (2006.01)
*G06F 3/01* (2006.01)
*G10K 15/04* (2006.01)
*G06F 3/041* (2006.01)

(56) References Cited

U.S. PATENT DOCUMENTS

| | | | |
|---|---|---|---|
| 7,148,875 B2* | 12/2006 | Rosenberg et al. | 345/156 |
| 7,218,310 B2* | 5/2007 | Tierling et al. | 345/156 |
| 2006/0061545 A1* | 3/2006 | Hughes et al. | 345/156 |

FOREIGN PATENT DOCUMENTS

| | | |
|---|---|---|
| JP | 2000-126459 A | 5/2000 |
| JP | 2000-148393 A | 5/2000 |
| JP | 2002-359888 A | 12/2002 |
| JP | 2003-251277 A | 9/2003 |
| WO | WO 95/20788 | 8/1995 |
| WO | WO 9520788 A1 * | 8/1995 ... G06F 3/00 |
| WO | WO 02/073385 A1 | 9/2002 |

OTHER PUBLICATIONS

Jul. 17, 2012 Office Action in KR 10-2012-7008624, National Institute of Advanced Industrial Science and Technology, Applicant, 4 pages.

Oct. 28, 2011 Office Action in CA 2,547,961, National Institute of Advanced Industrial Science and Technology, Applicant, 2 pages.

Yokichi Tanaka et al., ICAT 2001, Dec. 5-7, Tokyo, Japan, entitled Mobile Torque Display and Haptic Characteristics of Human Palm, 6 pages.

Yoshie Masayuki et al., "Development of Non-grounded Force Display Using Gyro Moment Effect", Transactions of the virtual Reality Society of Japan, vol. 7, No. 3, 6 pages (plus 3 pages partial translation) (2002).

* cited by examiner

FIG.4A

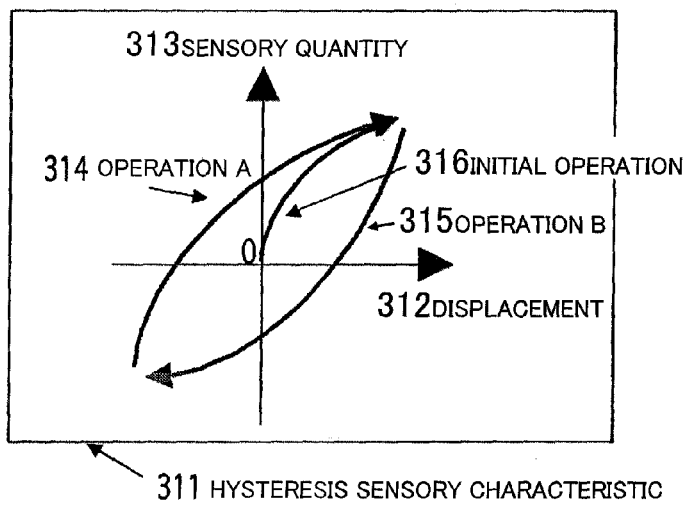

313 SENSORY QUANTITY
314 OPERATION A
316 INITIAL OPERATION A
315 OPERATION B
312 DISPLACEMENT
311 HYSTERESIS SENSORY CHARACTERISTIC

※ HYSTERESIS:
SENSORY QUANTITY IS DIFFERENT BETWEEN INCREASE AND DECREASE OF DISPLACEMENT

FIG.4B

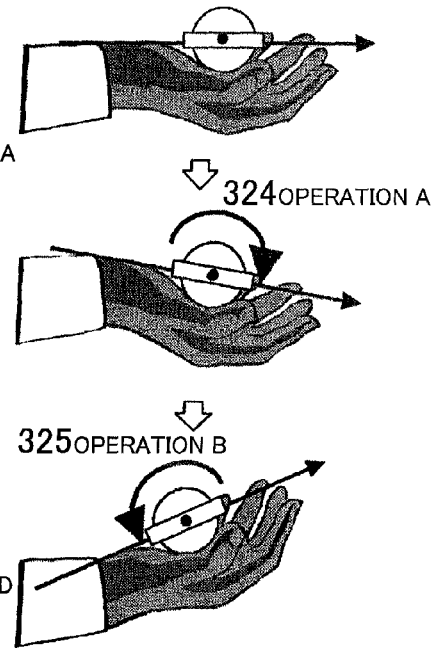

324 OPERATION A
325 OPERATION B

FIG.4C

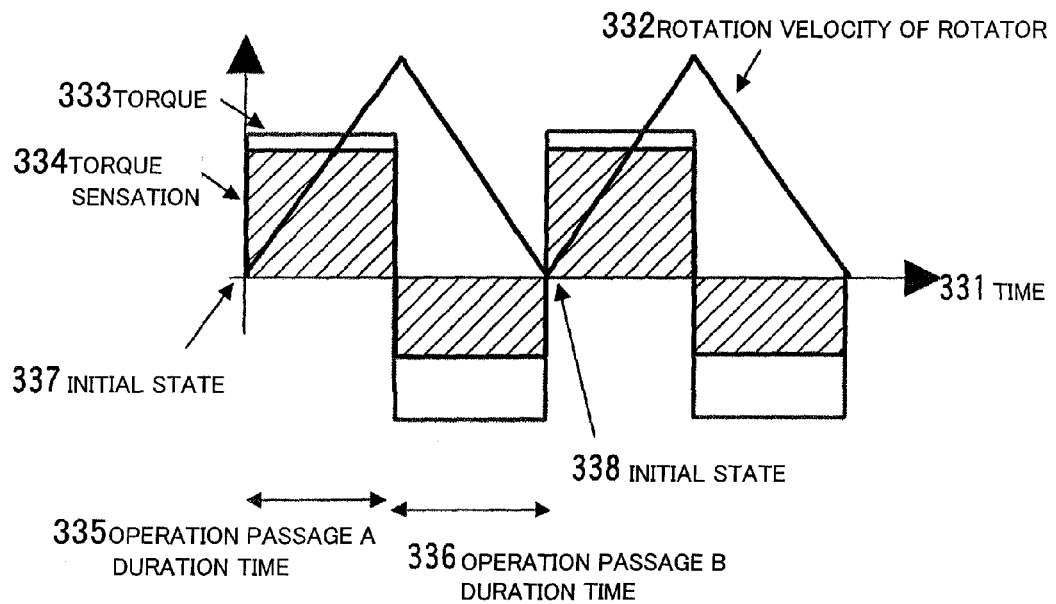

332 ROTATION VELOCITY OF ROTATOR
333 TORQUE
334 TORQUE SENSATION
331 TIME
337 INITIAL STATE
338 INITIAL STATE
335 OPERATION PASSAGE A DURATION TIME
336 OPERATION PASSAGE B DURATION TIME

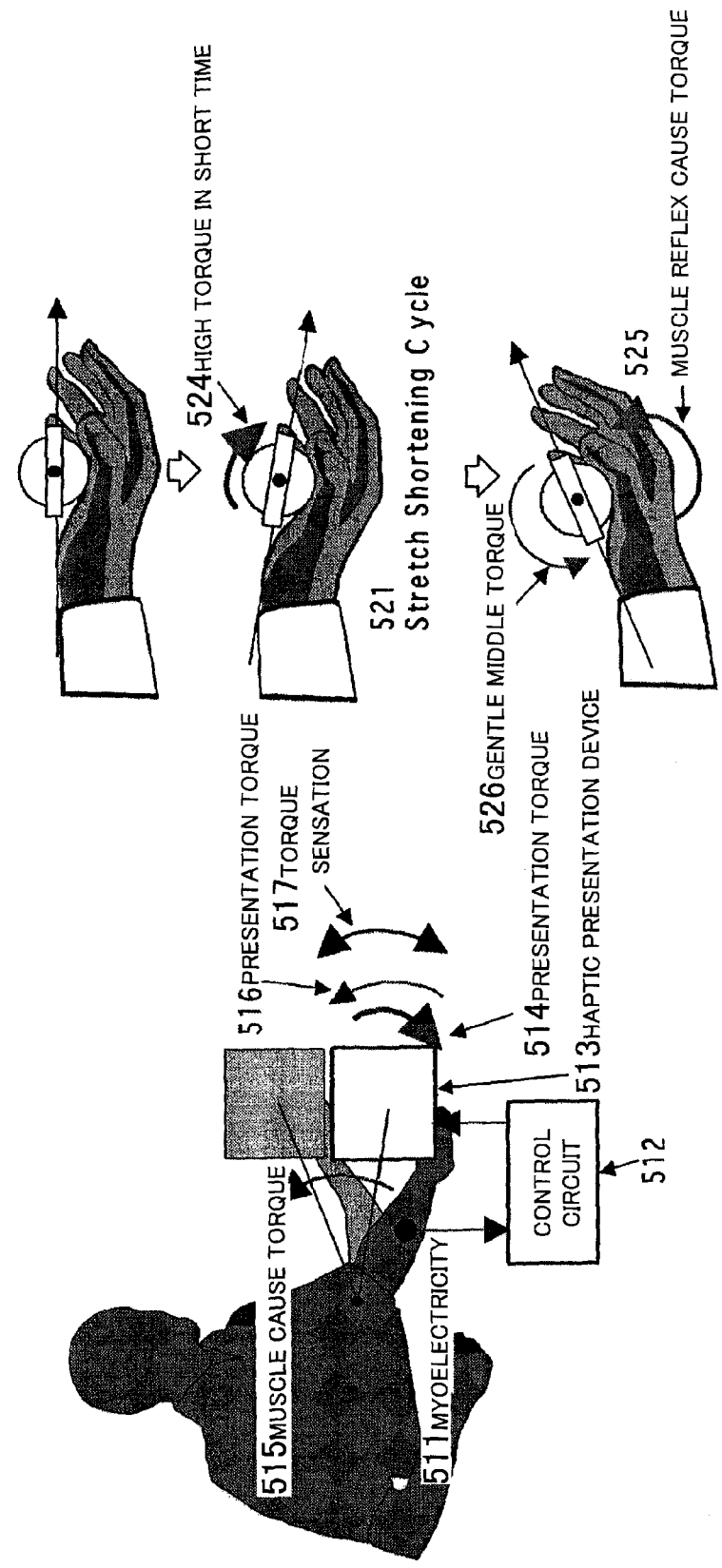

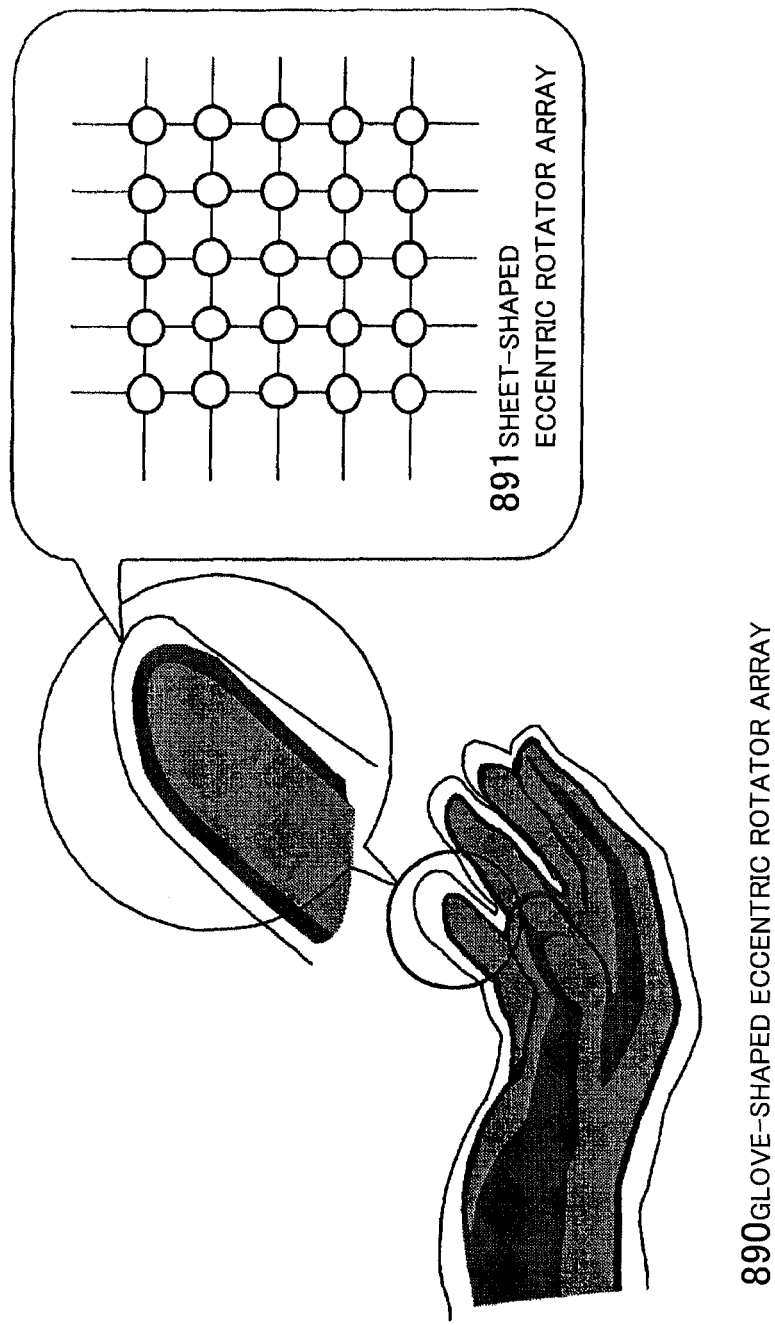

1171 SKIN-SHAPED ECCENTRIC ROTATOR ARRAY
1172 TWIN ECCENTRIC ROTATOR
1173 FORCE
1174 SHEAR FORCE
1175 TORQUE

1170 GLOVE-SHAPED ECCENTRIC ROTATOR ARRAY

1185 RESULTANT TORQUE

1181 SKIN-SHAPED ECCENTRIC ROTATOR ARRAY

1191 SPHERICAL RESISTING FORCE
1192 CUBIC RESISTING FORCE
1193 RESISTING FORCE

1195 FEELING
IN WHICH FORCE IS
TRANSMITTED ON PALM

1196 FORCE FEELING
IN WHICH FORCE
PASSES THROUGH PALM

1311 GYROSCOPE TYPE

1312 RESULTANT ANGULAR MOMENTUM
VECTOR DIFFERENTIAL TYPE

1330 INERTIA COORDINATE SYSTEM

1341 VIBRATION

1342 ONE-DIMENSIONAL
    TORQUE PRESENTATION

1343 TWO-DIMENSIONAL
    TORQUE PRESENTATION

1344 THREE-DIMENSIONAL
    TORQUE PRESENTATION

1351 STABILIZER

TWO-DIMENSIONAL SECTIONAL VIEW OF HAPTIC PRESENTATION DEVICE
(EXPANSION MAY BE MADE TO THREE DIMENSIONS)

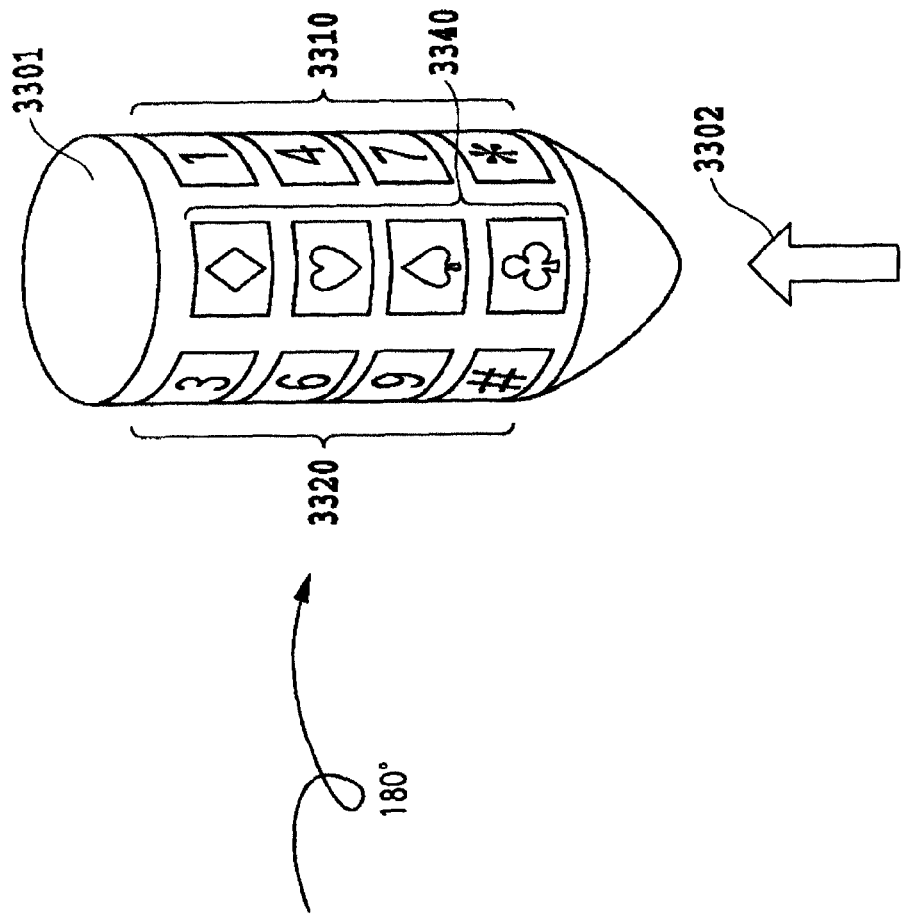
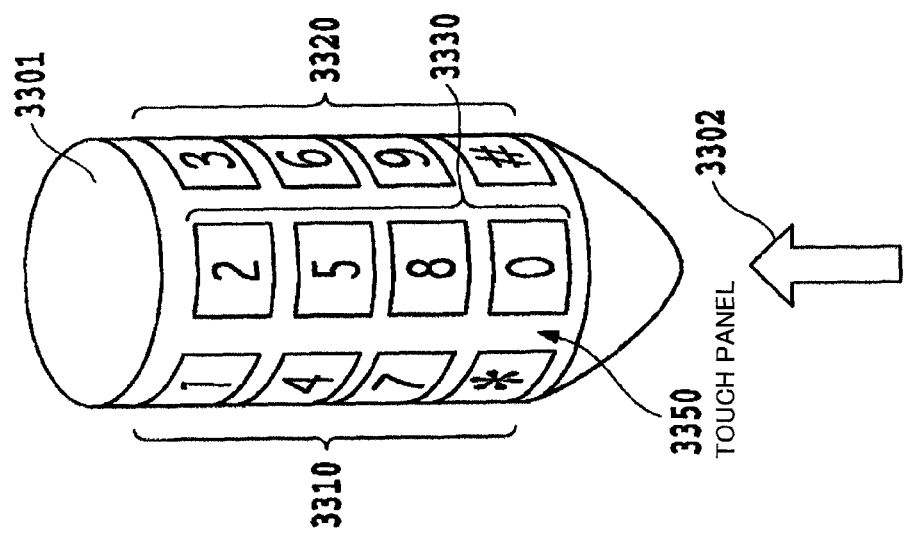

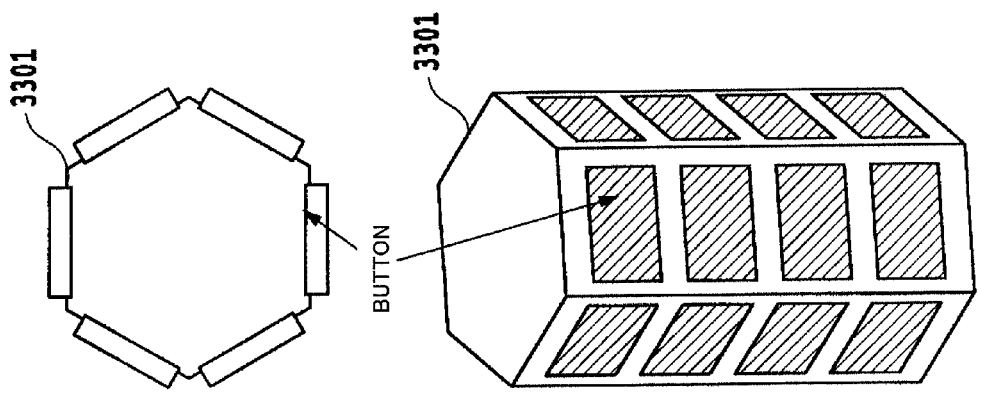
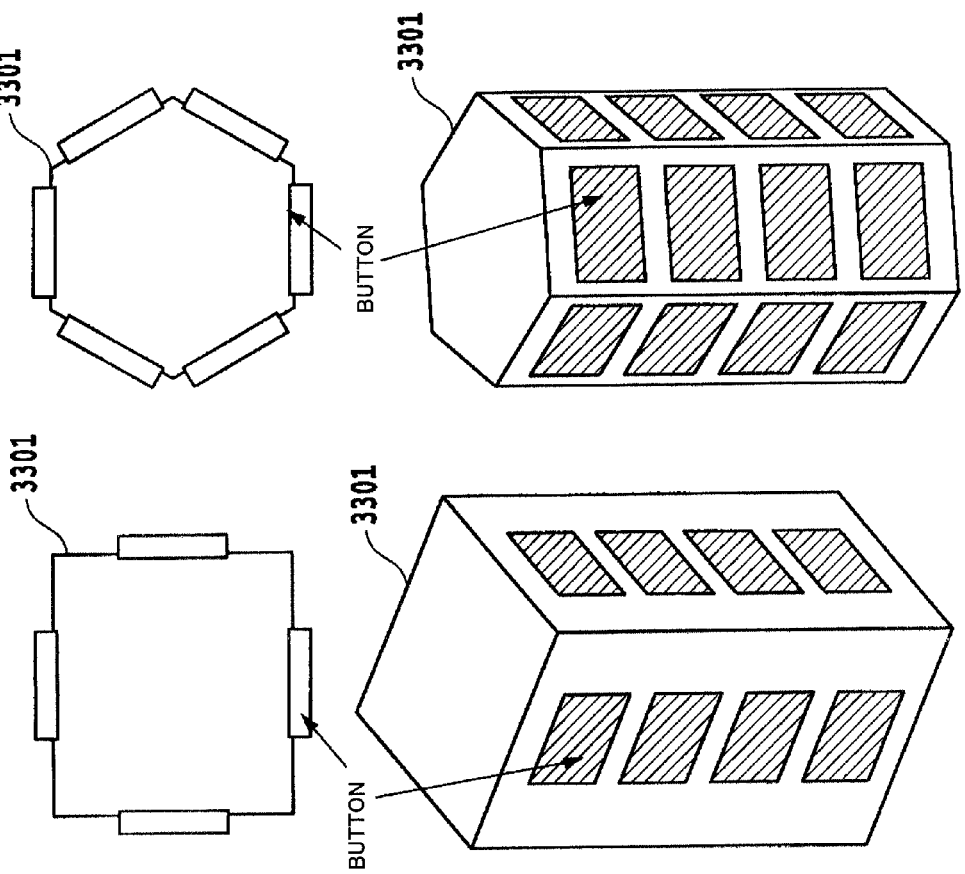
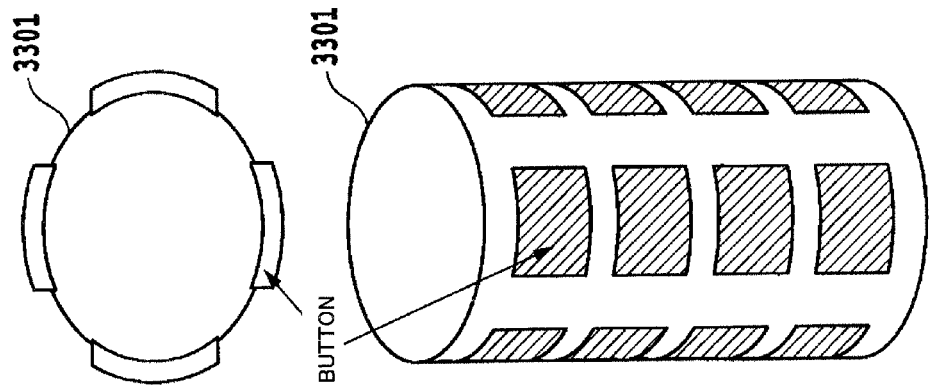

HAPTIC INFORMATION PRESENTATION SYSTEM AND METHOD

CROSS-REFERENCE TO RELATED APPLICATIONS

This application is a continuation of co-pending U.S. patent application Ser. No. 12/710,813, filed on Feb. 23, 2010, and entitled: "HAPTIC INFORMATION PRESENTATION SYSTEM AND METHOD," which is hereby incorporated by reference.

Application Ser. No. 12/710,813, is a continuation of application Ser. No. 10/579,672, filed on Sep. 21, 2006, and entitled: "HAPTIC INFORMATION PRESENTATION SYSTEM AND METHOD," which is hereby incorporated by reference.

This application, application Ser. No. 12/710,813, and application Ser. No. 10/579,672 claim priority under 35 USC §371 of International Application No. PCT/JP2004/017277, filed on Nov. 19, 2004, which is hereby incorporated by reference.

FIELD OF THE INVENTION

The present invention relates to a haptic information presentation system and method, which uses sensory characteristics.

More particularly, the invention relates to a haptic information presentation system, a haptic information presentation method, a haptic presentation device of a haptic information presentation system, and a control device of a haptic information presentation system, which is for providing a man-machine interface mounted on an equipment used in the field of VR (Virtual Reality), an equipment used in the field of game, a cellular phone, a portable navigation equipment, a PDA (Personal Digital Assistant) or the like.

BACKGROUND

With respect to a conventional haptic device in the VR, in the haptic presentation of a tensile force or reaction force, a haptic presentation part in contact with a human sense organ and a haptic presentation system main body are connected to each other by a wire or an arm, and there has been a disadvantage that the existence of the wire, arm or the like restricts the human motion. Besides, since use is limited to an effective space in which the haptic presentation system main body and the haptic presentation part are connected to each other by the wire or the arm, there has been a limitation in the expanse of the space which can be used.

On the other hand, a man-machine interface which is of a non-grounding type and has no reaction base on the human body has been proposed. However, in this type of presentation device, the rotation velocity (angular velocity) of a motor is controlled so that a torque is presented by a temporal change of an angular momentum vector, and it has been difficult to continuously present haptic information of torque, force or the like in the same direction.

As a non-grounding type haptic information presentation device, a torque presentation apparatus using a gyro moment and a gimbal structure has been developed (non-patent document 1). However, in the gimbal structure, there are problems that the direction of a torque which can be presented is limited, the structure becomes complicated, and the control becomes troublesome.

On the other hand, a non-grounding mobile haptic information presentation device (non-patent document 2) has been proposed in which a torque in an arbitrary direction or with an arbitrary magnitude can be presented by independently controlling the rotations of three gyro motors arranged in three-axis orthogonal coordinates. In this haptic information presentation device, since the torque is generated by controlling a resultant angular momentum vector generated by the three gyro motors, the structure is relatively simple and the control is also easy. However, there are such problems to be solved that haptic information is made to be capable of being continuously presented, and a force sensation other than the torque is made to be capable of being presented.

[Non-patent document 1] Masayuki Yoshie, Hiroaki Yano, Hiroo Iwata "Development of Non-grounded Force Display Using Gyro Moment", Research Report Collection (Kenkyu Hokokusho) of Human Interface Society, vol. 3, No. 5, pp. 25-30 (2000)

[Non-patent document 2] Yokichi Tanaka, Masataka Sakai, Yuka Kohno, Yukio Fukui, Juli Yamashita, Norio Nakamura, "Mobil Torque Display and Haptic Characteristics of Human Palm", INTERNATIONAL CONFERENCE ON ARTIFICIAL REALITY AND TELEXISTENCE, pp. 115-120 (2001/12)

SUMMARY

Various deficiencies in the prior art are addressed by embodiments for haptic information presentation.

An apparatus according to one embodiment comprises a first communication control device; and a second communication control device including a haptic presentation device. The second communication device is controlled so as to communicate with the first communication device, wherein the haptic presentation device is adapted to control a physical quantity utilizing a haptic sensory characteristic representing a relationship between the physical quantity to be applied to a human body and a sensory quantity to be perceived by the human body, and thereby to present haptic information.

BRIEF DESCRIPTION OF THE DRAWINGS

The teachings herein can be readily understood by considering the following detailed description in conjunction with the accompanying drawings, in which:

FIGS. 4A to 4C are views showing a haptic information presentation method using a hysteresis sensory characteristic relating to a haptic sense;

FIGS. 8A and 8B are views showing a haptic information presentation method using a method of controlling haptic information presentation in conformity with a change of a sensory characteristic relating to a haptic sense;

FIG. 15 is an explanatory view of a glove-shaped eccentric rotator array to which the invention is applied;

FIGS. 33A and 33B are explanatory views of a pen-shaped device 3301 having a built-in haptic presentation device of the embodiment;

FIGS. 42A to 42C are supplemental explanatory views of the pen-shaped device 3301 having the built-in haptic presentation device of the embodiment.

To facilitate understanding, identical reference numerals have been used, where possible, to designate identical elements that are common to the figures.

DETAILED DESCRIPTION OF THE INVENTION

Figure 1:
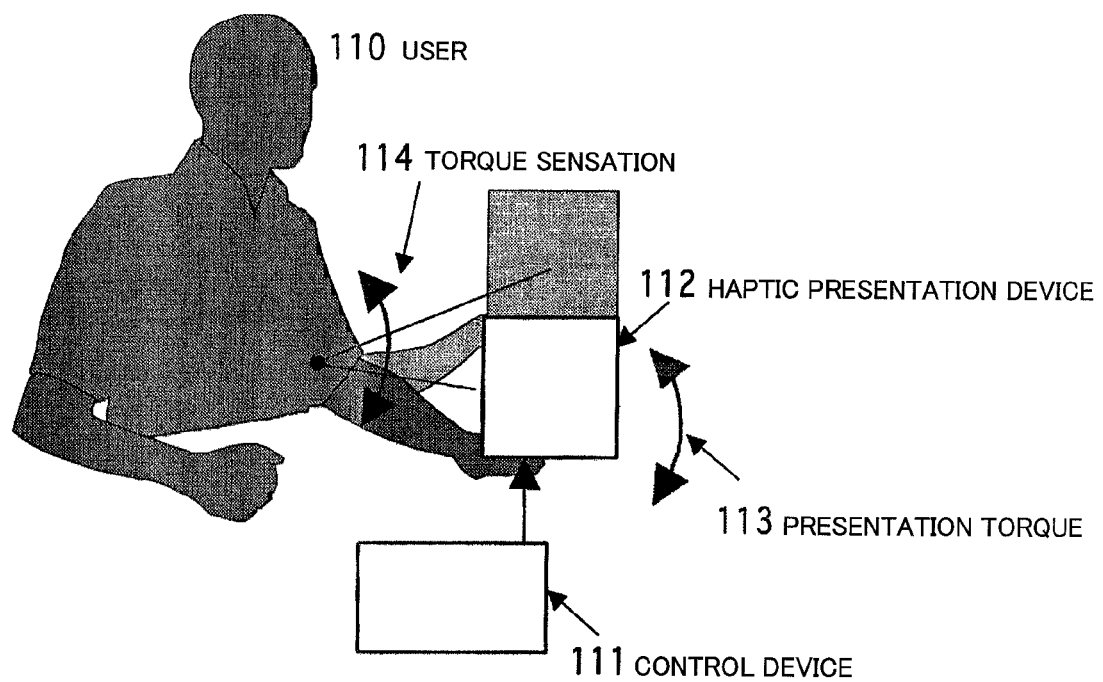
FIG. 1 is a view showing a rough structure of a haptic information presentation system of an embodiment of the invention.

In view of the above, a first object of the invention is to provide a haptic information presentation system and method, in which in a conventional non-grounding man-machine interface having no reaction base on the human body and for giving the existence of a virtual object and the impact force of a collision to a person, a haptic information presentation mechanism using human sensory characteristics is realized, so that haptic information of vibration, torque, force and the like can be continuously presented in the same direction, which can not be presented only by the physical characteristics of a haptic presentation device.

Besides, when a physical quantity continues to be continuously presented in the man-machine interface, in case the performance of the presentation device is sufficiently high, the physical quantity such as the torque or force can continue to be continuously presented in the same direction. However, actually, the performance of the presentation device is not infinite, and in the case where the performance of the presentation device is not sufficient, for example, when the torque continues to be continuously presented, it becomes necessary to return the rotation velocity of the rotator to the initial state in one cycle of the presentation. That is, it is required that the integral value of the angular momentum vector of the rotator is made zero. In this case, the quite opposite torque or force is presented, and there arises a problem that the senses in the positive direction and the negative direction cancel each other out.

Thus, a second object of the invention is to provide a haptic information presentation system and method, in which human sensory characteristics are used, and in an operation of a haptic presentation device, even if a return is made physically to the initial state in one cycle, and a integral value of physical quantity becomes zero, a integral value of a sensory quantity does not become zero, and a sense can continue to be presented freely in an arbitrary direction.

In order to achieve the above object, according to a first aspect of the invention, a haptic information presentation system includes a haptic presentation unit having two eccentric rotators, and a control unit that independently changes a frequency and an intensity of a vibration and/or a vibration sensation by controlling rotation directions, a phase relation and rotation speeds of the two eccentric rotators.

According to a second aspect of the invention, a haptic information presentation system includes a haptic presentation unit having two eccentric rotators, and a control unit that independently changes a frequency and an intensity of a force and/or a force sensation by inverting rotation directions of the two eccentric rotators.

According to a third aspect of the invention, a haptic information presentation system includes a haptic presentation unit having an eccentric rotator array in which plural single eccentric rotators, and/or plural twin eccentric rotators each having two eccentric rotators, and/or plural twin eccentric rotators arranged in a three-dimensional space are arranged two-dimensionally or three-dimensionally, and a control unit to control a rotation state of each of the eccentric rotators included in the haptic presentation unit.

According to a fourth aspect of the invention, a haptic information presentation system includes a haptic presentation unit having plural rotators arranged three-dimensionally, and a control unit to control a temporal change of a resultant angular momentum vector of the haptic presentation unit, in which the control unit generates a torque with a fixed value by abruptly changing the resultant angular momentum vector in the vicinity of zero, and controls a precession torque to be a specified value or less.

According to a fifth aspect of the invention, in a haptic information presentation method, when a haptic presentation unit having two eccentric rotators is controlled, a frequency and an intensity of a vibration and/or a vibration sensation are independently changed by controlling rotation directions, a phase relation and rotation speeds of the two eccentric rotators.

According to a sixth aspect of the invention, in a haptic information presentation method, when a haptic presentation unit having two eccentric rotators is controlled, a frequency and an intensity of a force and/or a force sensation are independently changed by inverting rotation directions of the two eccentric rotators.

According to a seventh aspect of the invention, in a haptic information presentation method, when a control is made on a haptic presentation unit having an eccentric rotator array in which plural single eccentric rotators, and/or plural twin eccentric rotators each having two eccentric rotators arranged on a same rotation axis, and/or plural twin eccentric rotators arranged in a three-dimensional space are arranged two-dimensionally or three-dimensionally, a rotation state of each of the eccentric rotators included in the haptic presentation unit is individually controlled.

According to an eighth aspect of the invention, in a haptic information presentation method, when a haptic presentation unit having plural rotators arranged three-dimensionally is controlled, a temporal change of a resultant angular momentum vector of the haptic presentation unit is controlled, a torque with a fixed value is generated by abruptly changing the resultant angular momentum vector in the vicinity of zero, and a precession torque is controlled to have a specified value or less.

When the haptic information presentation system of the invention and the haptic information presentation method are carried out, special effects listed below can be obtained.

(1) It becomes possible to continuously or intermittently present the haptic information of the torque, force and the like in the same direction, which has been difficult in a conventional man-machine interface which is of a non-grounding type and has no reaction base on the body.

(2) By using human sensory characteristics and illusion, it becomes possible to present the haptic sensory-physical characteristics of the torque, force or the like, which can not exist physically, to a person.

(3) By using the human sensory characteristics, it becomes possible to present the haptic information efficiently while energy is saved, and a miniaturized haptic presentation system can be realized.

(4) In order to present a vibration sensation, a torque sensation, and a force sensation, a device corresponding to each of them is conventionally required. However, according to the invention, it becomes possible to simultaneously present one or more of the vibration sensation, the torque sensation, and the force sensation by one mechanism of the eccentric rotators, various haptic information can be presented, and the presentation system can be miniaturized.

(5) By carrying out the invention, it is possible to realize a useful man-machine interface, an interface between a robot and a machine, an interface between an animal and a machine, and the like, which can be mounted on an equipment used in the field of VR (Virtual Reality), an equipment used in the field of game, a cellular phone, a portable navigation equipment, a PDA (Personal Digital Assistant) and the like. For example, in the field of the VR, the existence of an object in a virtual space or the shock due to a collision can be presented by presenting a force to a person through the man-machine interface or by giving a resisting force or reaction force. Besides, by mounting the interface on the cellular phone, portable navigation equipment, PDA, or the like, various instructions, guides and the like, which have not existed conventionally, can be realized through the skin of an operator.

(6) An eccentric rotator which is conventionally known and is used in a manner mode of a cellular phone or the like, the vibration intensity is increased by increasing the rotation velocity, and the vibration frequency and the vibration intensity have not been capable of being independently controlled. However, in the eccentric rotator to which the invention is applied, the vibration intensity of the eccentric vibration can be changed without changing the rotation velocity. By this, it becomes possible to independently control the vibration frequency and the vibration intensity.

(7) According to the sheet-shaped eccentric rotator array to which the invention is applied, by suitably controlling the rotations of the respective eccentric rotators, the vibration sensation, torque sensation, and force sensation of various patterns in space and time can be presented onto the palm. Besides, the sheet-shaped eccentric rotator array can be applied to a glove, clothes, or something having a wearable shape.

(8) According to the sheet-shaped eccentric rotator array to which the invention is applied, various haptic information relating to an object, such as the existence, shape, elasticity, texture and the like of a virtual object, can be presented by suitably changing a space portion of a force sensation in accordance with the movement of a palm or the like.

(9) In an inertia coordinate system, in the case where the temporal change of the resultant angular momentum vector is controlled, the easiness of the control is a great merit. That is, the resultant angular momentum vector is abruptly changed in the vicinity of zero, so that a large torque is generated, and a precession torque can be suppressed to be low. Besides, in the case where the torque presentation device sways according to the movement of the user and difficulty occurs, the resultant angular momentum vector is temporarily changed in the vicinity of the resultant angular momentum vector with a suitable magnitude, so that a specified torque can be presented while the sway of the torque presentation device is suppressed.

Hereinafter, embodiments of the invention will be described with reference to the drawings.

(Operation Principle 1)

FIG. 1 is a view showing a rough structure of a haptic information presentation system of an embodiment of the invention.

A haptic presentation device 112 is such that the rotation velocity of at least one rotator in the haptic presentation device 112 is controlled by using a control device 111, and a vibration, force or torque as its physical characteristics is controlled, so that a user 110 is made to perceive various haptic information such as the vibration, force or torque.

Hereinafter, although the haptic information presentation system of the embodiment will be described with reference to FIGS. 2A to 40 in addition to FIG. 1, before that, the outline of the block structure of the system will be described with reference to a block diagram of the haptic information presentation system of the embodiment of FIG. 41 attached to the end of the drawings.

Figure 41:
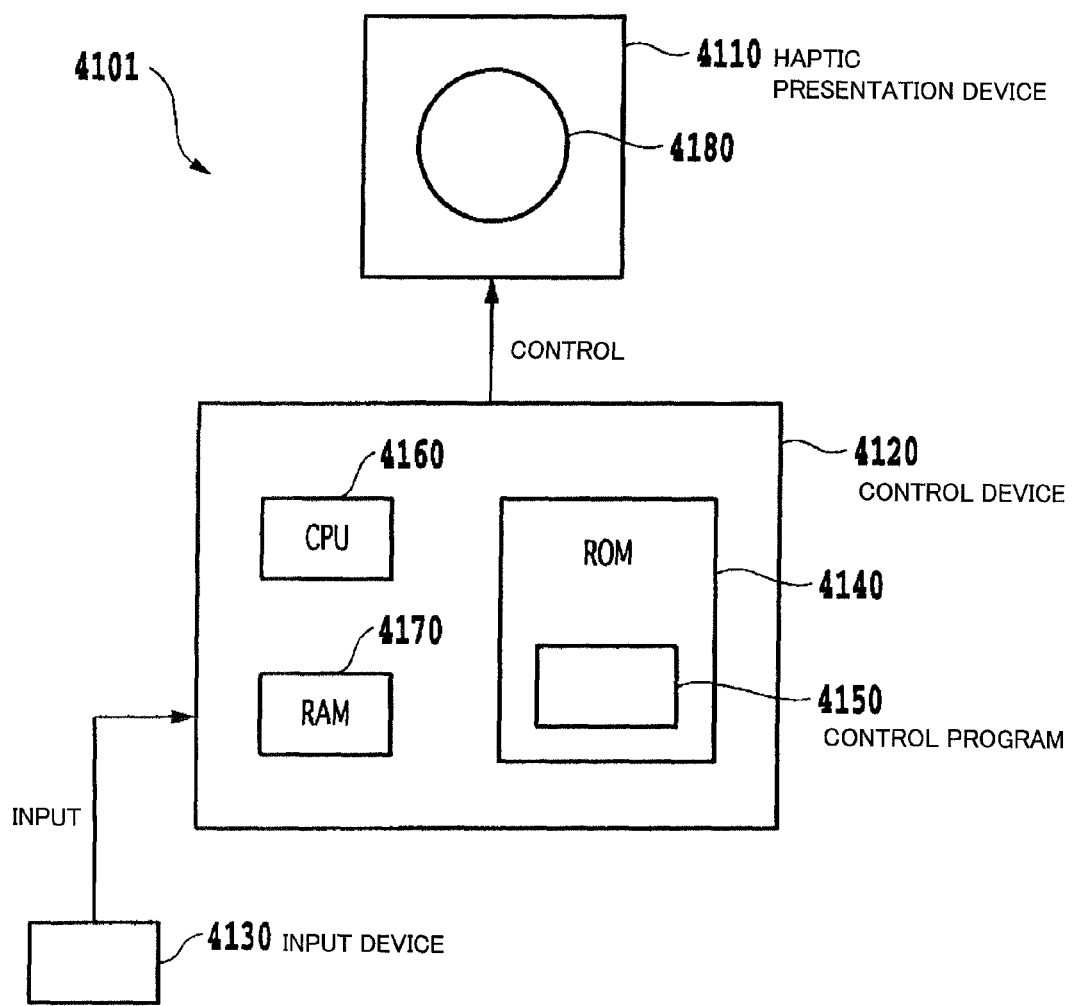
FIG. 41 is a block diagram of a haptic information presentation system of the embodiment.

In FIG. 41, a haptic information presentation system 4101 includes a haptic presentation device 4110, a control device 4120, and an input device 4130. The haptic presentation device 4110 includes therein at least one rotator 4180 rotated by a motor, and it is rotated by the control from the control device 4120. A stepping motor, a servo motor, or the like can be applied to the driving of the rotator 4180. The control device 4120 includes a CPU (central processing unit) 4160, a RAM (random access memory) 4170, a ROM (read only memory) 4140 and the like.

The CPU 4160 controls the whole operation of the control device 4120. The RAM 4170 is used as a work area to temporarily store data of a processing object and the like when the CPU 4160 performs the processing. A control program 4150 is previously stored in the ROM 4140. The control program 4150 is a program to prescribe the control processing of the haptic presentation device 4110 corresponding to the input signal from the input device 4130. The CPU 4160 reads the control program 4150 from the ROM 4140 and executes it, and controls the rotator 4180 of the haptic presentation device 4110 correspondingly to the respective input signals.

The input device 4130 is, for example, a select button of an input menu. The CPU 4160 performs a processing (for example, the haptic presentation device 4110 is controlled so as to generate a torque in a specified rotation direction) corresponding to the input of the select button selected by depression, touch or the like. The input device 4130 as stated above may be united with the control device 4120 and made a part of the control device 4120.

Alternatively, the input device 4130 is a device such as a well-known myoelectric detector to detect myoelectricity described later, or a well-known angular acceleration sensor. When a trigger signal of myoelectricity occurrence from the myoelectric detector, or a signal of angular acceleration from the angular acceleration sensor is inputted to the control device 4120, the CPU 4160 feeds back the input and controls the haptic presentation device 4110. The input device 4130 such as the angular acceleration sensor, together with the haptic presentation machine 4110, may be included in the inside of the haptic presentation device 4110.

Since a general processing method in which the CPU 4160 reads the control program 4150 from the ROM 4140 and executes it so that the control of the rotator 4180 of the haptic presentation device 4110 is performed correspondingly to each input signal, is well known for one skilled in the art through non-patent documents 1 and 2 and the others, the detailed description would be unnecessary. Accordingly, in the following, a description will be given to a processing method of the control device in the haptic information presentation system and the structure of the haptic presentation device, which are features of the embodiment.

FIGS. 2A, 2B, 3A, and 3B are views showing the haptic information presentation method in which a sensory characteristic relating to a haptic sense is used and the haptic presentation device is controlled by the control device of the haptic information presentation system.

Figure 2A:
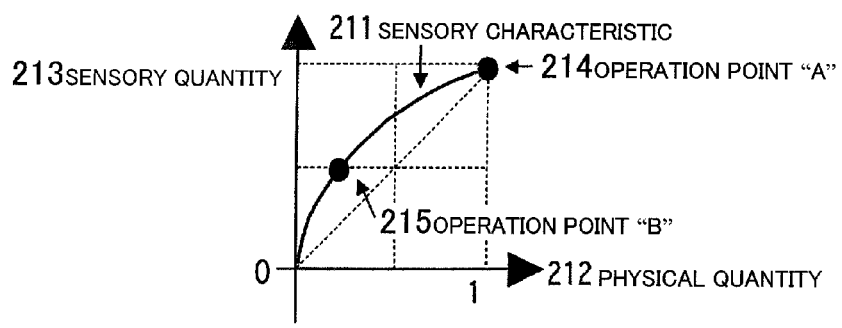
FIGS. 2A and 2B are views showing a haptic information presentation method using a sensory characteristic relating to a haptic sense.
Figure 2B:
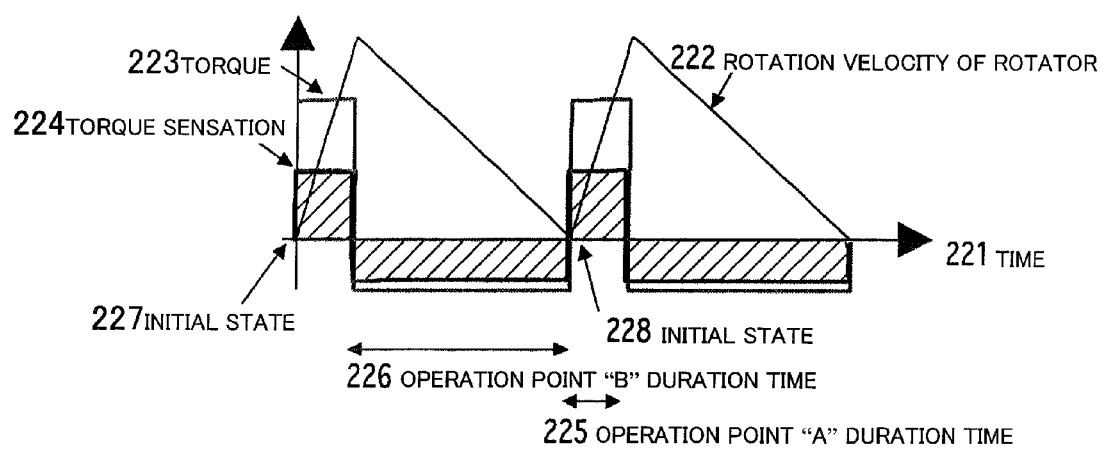

In a sensory characteristic 211, a sensory quantity 213 thereof is often a nonlinear characteristic, such as a logarithm, with respect to a physical quantity 212 which is mainly a stimulus. FIG. 2A schematically shows a case where the sensory characteristic 211 is a logarithmic function characteristic. When consideration is given to a case where a positive torque is generated at an operation point A 214 on the sensory characteristic 211, and a negative torque in the reverse direction is generated at an operation point B 215, a torque sensation 224 is represented as shown in FIG. 2B. A torque 223 is proportional to the time differential of a rotation velocity (angular velocity) 222. When an operation is performed at the operation point A 214 and the operation point B 215, the torque sensation 224 is perceived. The torque 223 is physically returned to an initial state 228 in one cycle, and an integral value thereof is zero. However, a sensory integral value of the torque sensation 224 as the sensory quantity does not necessarily become zero. By suitably selecting the operation point A 214 and the operation point B 215 and by suitably setting an operation point A duration time 225 and an operation point B duration time 226, the torque sensation can freely continue to be presented in an arbitrary direction.

The above is established also when the sensory characteristic 211 exhibits a nonlinear characteristic of an exponential function case or the like.

Figure 3A:
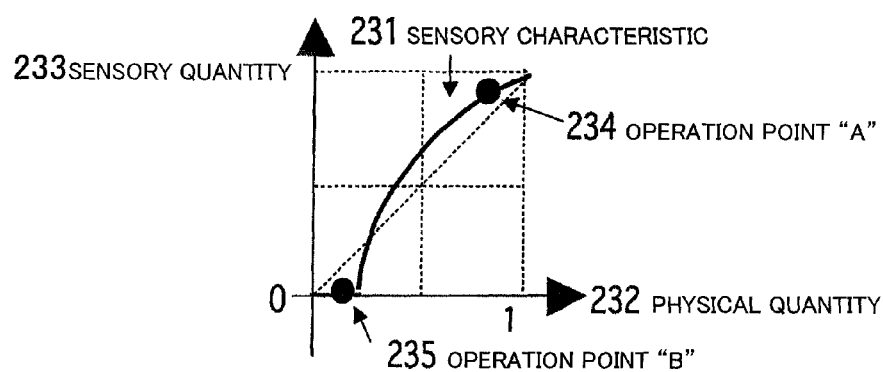
FIGS. 3A and 3B are views showing a haptic information presentation method using a sensory characteristic relating to a haptic sense.
Figure 3B:
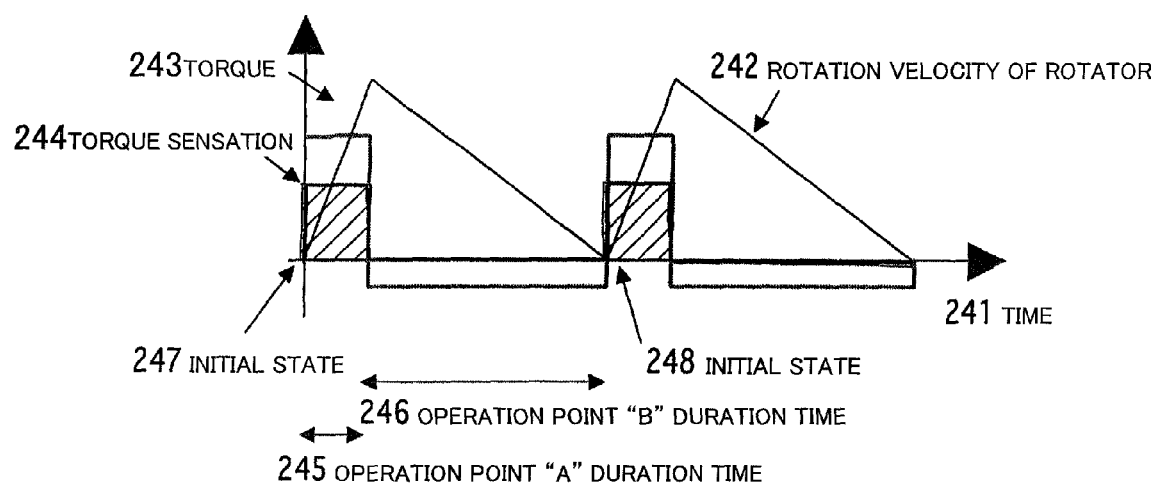

FIG. 3A schematically shows a case where a sensory characteristic 231 has a threshold value. When consideration is given to a case where a positive torque is generated at an operation point A 234 on the sensory characteristic 231, and a negative torque in the reverse direction is generated at an operation point B 235, a torque sensation 244 is represented as in FIG. 3B.

Similarly to the case which is shown in FIG. 2A and FIG. 2B and in which the sensory characteristic is nonlinear, a torque 243 is physically returned to an initial state 248 in one cycle, and an integral value thereof is zero. However, since the torque sensation 244 as the sensory quantity is the sensory threshold value or less in a section of an operation point B duration time 246, it becomes zero. As a result, a torque sensation can continue to be intermittently presented only in one direction.

FIGS. 4A to 4C are views showing a haptic information presentation method using a hysteresis sensory characteristic relating to a haptic sense.

The sensory characteristic is not isotropic between a time when a displacement 312 is increased and a time when it is decreased, for example, between a time when a muscle is extended and a time when it is contracted, and often indicates a hysteresis sensory characteristic 311. The hysteresis sensory characteristic 311 of FIG. 4A schematically represents the hysteresis characteristic of the sensory characteristic. When consideration is given to a case where a positive torque is generated in an operation passage A 314 on the hysteresis sensory characteristic 311, and a negative torque in the reverse direction is generated in an operation passage B 315, these behaviors are represented as in FIG. 4B, and a torque sensation 334 is represented as in FIG. 4C. A torque 333 is proportional to the time differential of a rotation velocity 332 of a rotator. When an operation is performed in the operation passage A 314 and the operation passage B 315, the torque sensation 334 is perceived. The torque 333 is physically returned to an initial state 338 in one cycle, and an integral value thereof is zero. However, a sensory integral value of the torque sensation 334 as the sensory quantity does not necessarily become zero. By suitably selecting the operation passage A 314 and the operation passage B 315, and by suitably setting an operation passage A duration time 335 and an operation passage B duration time 336, a high torque sensation in an arbitrary direction can continue to be intermittently and continuously presented.

FIGS. 5A to 5C and FIGS. 6A to 6C are views showing, as an example of a method of changing a sensory characteristic, a haptic information presentation method using a method of changing a sensory characteristic by a masking effect relating to a haptic sensation.

Figure 5A:
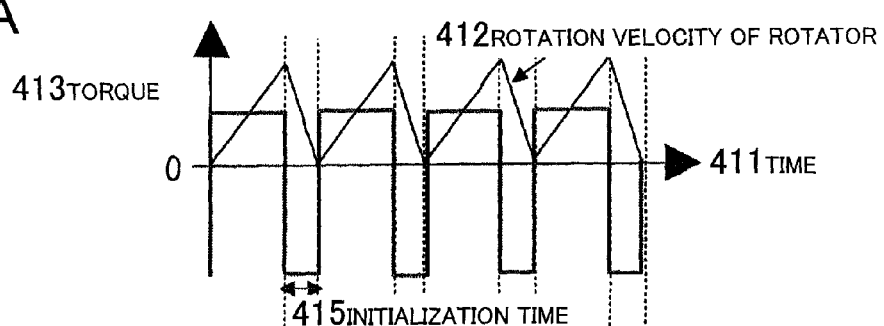
FIGS. 5A to 5C are views showing a haptic information presentation method using a method of changing a sensory characteristic by a masking effect relating to a haptic sense.
Figure 5B:
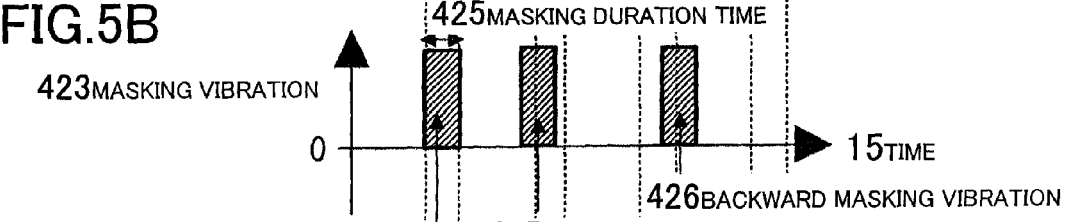
Figure 5C:
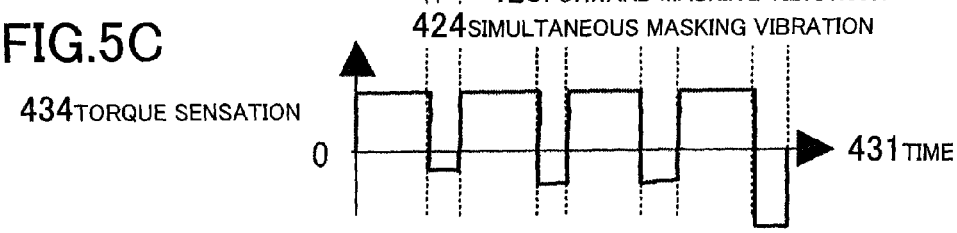

In the sensory characteristic, masking is performed by a masking vibration and a torque sensation 434 is decreased. As this masking method, simultaneous masking 424 (having satisfactory results in masking of the visual sense and hearing sense), forward masking 425, and backward masking 426 are enumerated. FIG. 5A schematically shows a torque 413 as a maskee, and the torque sensation 434 perceived at this time is represented as in FIG. 5C. The torque 413 is proportional to the time differential of a rotation velocity 412 of a rotator.

Figure 6A:
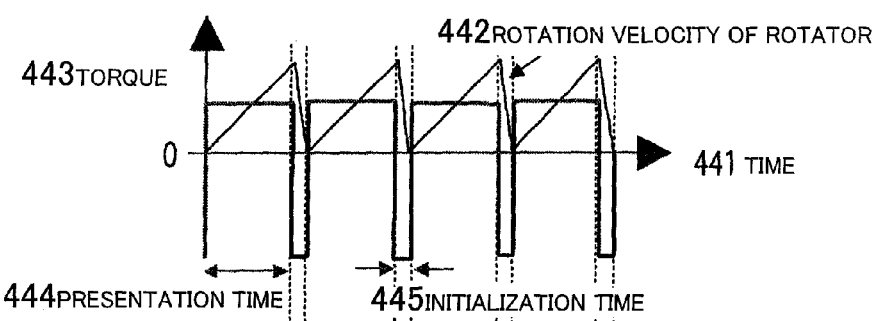
FIGS. 6A to 6C are views showing a haptic information presentation method using a method of changing a sensory characteristic by a masking effect relating to a haptic sense.
Figure 6B:
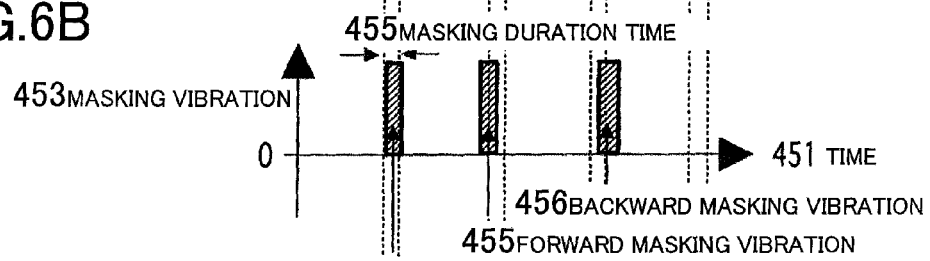
Figure 6C:
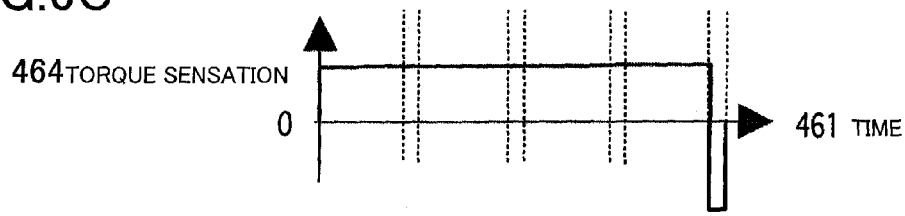

At this time, an initialization time 415 in which the rotation velocity 412 of the rotator is initialized, and a masking duration time 425 corresponding thereto are shortened like an initialization time 445 and a masking duration time 455 shown in FIG. 6A, and when it becomes shorter than a certain specific time, a critical fusion occurs in which although a negative torque due to the initialization physically exists, it is felt as if torque is continuously presented like a torque sensation 464.

Incidentally, a masker to generate a masking vibration may be a rotator different from a rotator as a maskee whose torque is masked by that or the rotator itself as the maskee.

The case where the rotator of the maskee is also the masker means that at the time of masking, the rotator is controlled to generate the masking vibration by the control device. The vibration direction of the masker may be the same as the rotation direction of the rotator as the maskee or may not be the same.

Figure 7A:
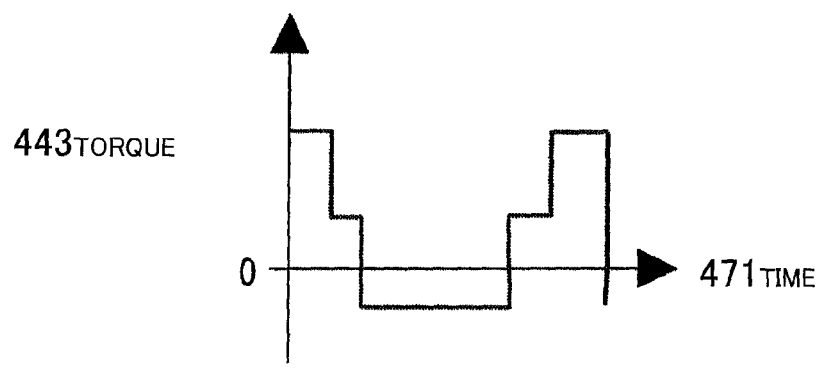
FIGS. 7A and 7B are schematic views showing a method of changing a sensory characteristic by a masking effect relating to a haptic sense.
Figure 7B:
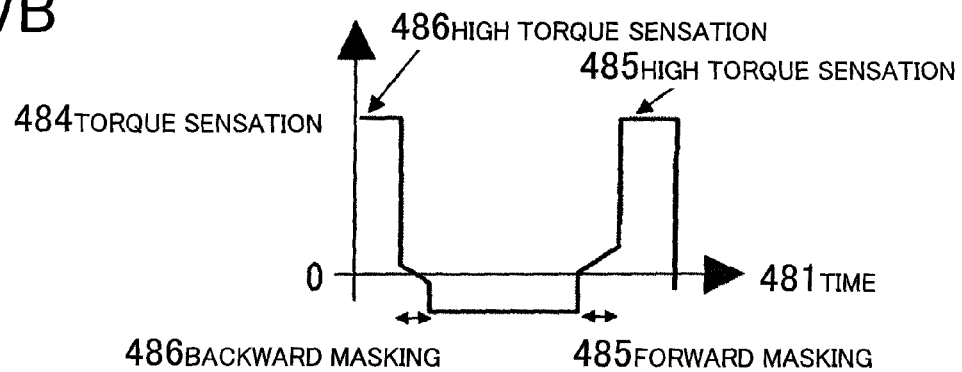

The above can occur also in the case where the maskee and the masker are the same stimulus (in the case where the rotator of the maskee is also the masker). FIGS. 7A and 7B are views schematically showing this case. As shown in FIG. 7B, before and after high torque sensations 485 and 486, a torque sensation 484 is decreased by forward masking 485 and backward masking 486.

FIGS. 8A and 8B are views showing a haptic information presentation method using a method of controlling haptic information presentation in conformity with changes of sensory characteristics relating to a haptic sense.

With respect to the sensory characteristic, the sensitivity of a torque sensation 517 is changed according to a muscle tensile state or at least one state of physical, physiological and psychological states. For example, when a muscle is instantaneously expanded by a presented torque 514 (high torque 524 in a short time) as an external force, a sensor called a muscle spindle in the muscle senses this, and the muscle is quickly contracted in a conditioned reflex way by a muscle cause torque 515 (muscle reflex cause torque 525) having power not lower than this external force. At this time, myoelectricity 511 is generated. A control circuit 512 having detected it controls a haptic presentation device 513, and changes the sensitivity of the torque sensation 517 by activating a presentation torque 516 (gentle middle torque 526) in synchronization with the contraction of the muscle.

The above is established not only in the muscle tensile state but also in the case of the change of sensory sensitivity due to at least one state of breath, posture and neural firing states.

Figure 9:
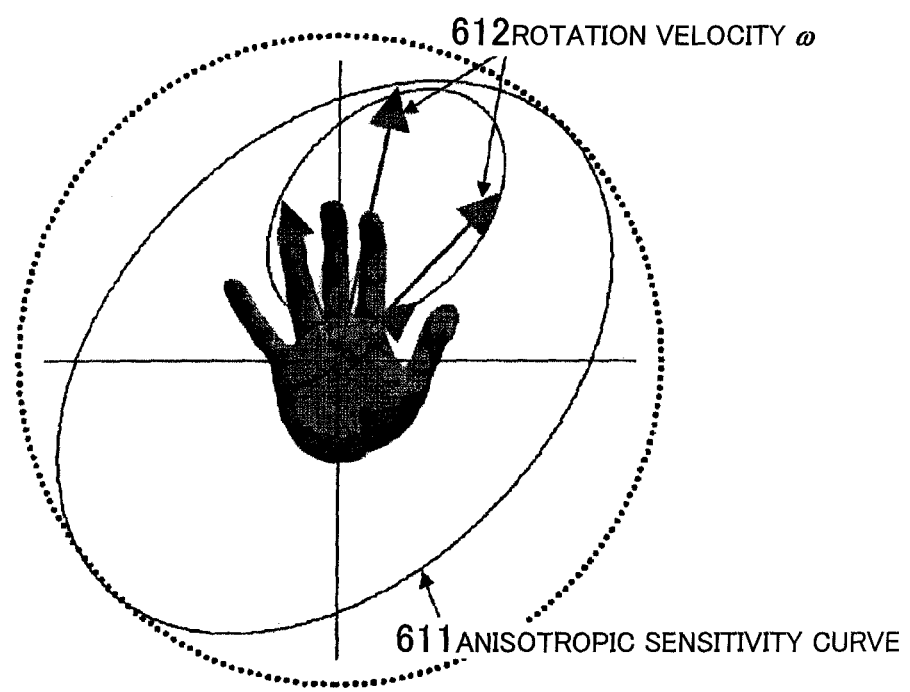
FIG. 9 is a view showing a haptic information presentation method using a method of controlling haptic information presentation in conformity with an anisotropic sensitivity curve change as a sensory characteristic relating to a haptic sense.

FIG. 9 shows a haptic information presentation method using a method of correcting a presentation physical quantity according to a relation between the presentation physical quantity and a sensory quantity with respect to a palm direction and relating to a haptic sense. In the palm, the sensitivity is different according to the palm direction because of the anatomical structure of a skeleton, joint, tendon, muscle and the like. The direction presentation with high precision becomes possible by correcting the intensity (rotation velocity ω 612) of the presentation physical quantity in conformity with the sensitivity (anisotropic sensitivity curve 611) dependent on the palm direction.

Figure 10C:
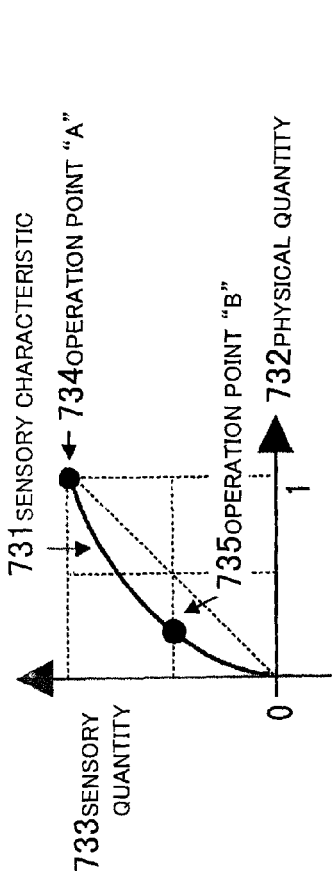
FIGS. 10A to 10D are views showing a haptic information presentation method in which a sensory characteristic relating to a haptic sense is used, and rotation of an eccentric rotator 711 is phase synchronized.
Figure 10A:
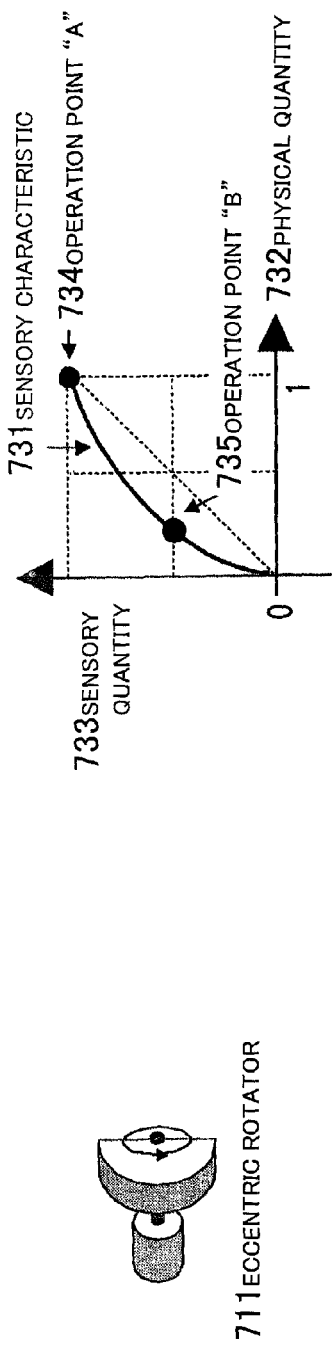
Figure 10D:
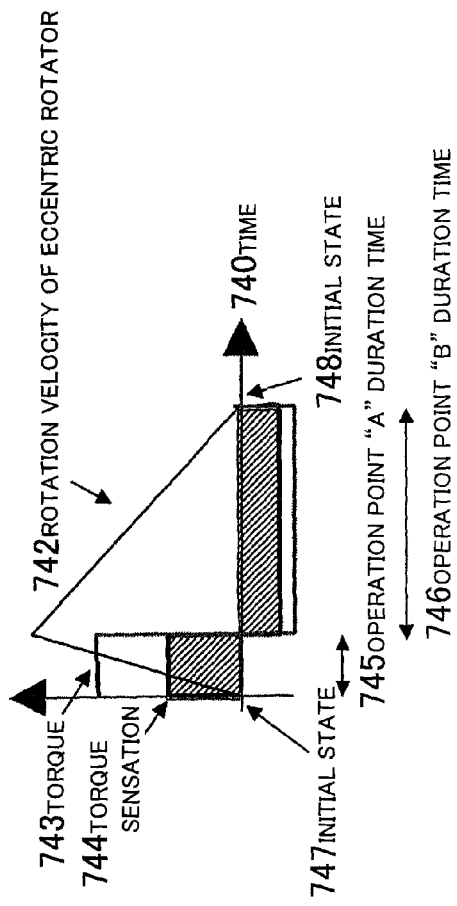
Figure 10B:
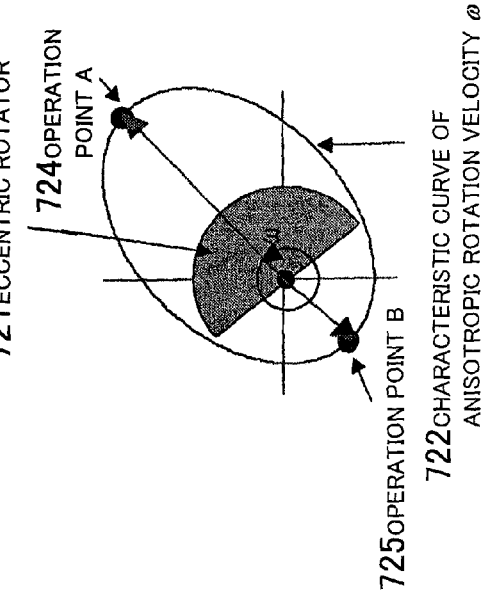

FIGS. 10A to 10D are explanatory views of an eccentric rotator which can be applied to the rotator of the haptic presentation device of the embodiment, and are views showing a haptic information presentation method in which a sensory characteristic relating to a haptic sense is used, and the rotation of an eccentric rotator 711 is phase synchronized as in FIG. 10B.

FIG. 10C schematically shows a case where a sensory characteristic 731 is a logarithmic function characteristic, and the sensory characteristic 731 indicates that similarly to the sensory characteristic 211, a sensory quantity 733 has a non-linear characteristic of a logarithm or the like with respect to a physical quantity 732 as a stimulus. When consideration is given to a case where a positive torque is generated at an operation point A 734 on the sensory characteristic 731 (vibration is also generated by the eccentricity of the eccentric rotator 711), and a negative torque in the reverse direction is generated at an operation point B 735, a torque sensation 744 is represented as in FIG. 10D. A torque 743 is proportional to the time differential of a rotation velocity 742 of the rotator. When an operation is performed at the operation point A 734 and the operation point B 735, the torque sensation 744 is perceived. The torque 743 is physically returned to an initial state 748 in one cycle, and an integral value thereof is zero. However, the sensory integral value of the torque sensation 744 as the sensory quantity does not necessarily become zero. By suitably selecting the operation point A 734 and the operation point B 735, and by suitably setting an operation point A duration time 745 and an operation point B duration time 746, the torque sensation can continue to be freely presented in an arbitrary direction.

The above is established also when the sensory characteristic 731 exhibits nonlinear characteristics of an exponential function case or the like. Also in the case where the sensory characteristic 731 of FIG. 10C has a threshold value as in the sensory characteristic 231 of FIG. 3A, a torque sensation similar to that of FIG. 3B occurs, and a torque sensation can continue to be intermittently presented only in one direction.

FIGS. 11A to 11D are explanatory views of an eccentric rotator applicable to the rotator of the haptic presentation device of the embodiment, and are views showing a haptic information presentation method of a vibration sensation, torque sensation, and force sensation by suitable synchronization of rotation directions and phases of both an eccentric rotator A 812 and an eccentric rotator B 813.

Figure 11B:
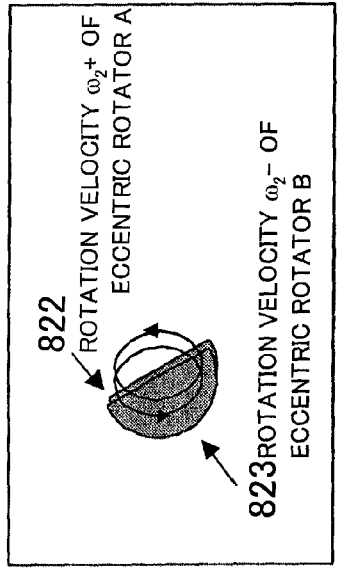
FIGS. 11A to 11D are views showing a haptic information presentation method of a vibration sensation, a torque sensation, and a force sensation by suitably synchronizing rotation directions and phases of both an eccentric rotator A 812 and an eccentric rotator B 813.
Figure 11D:
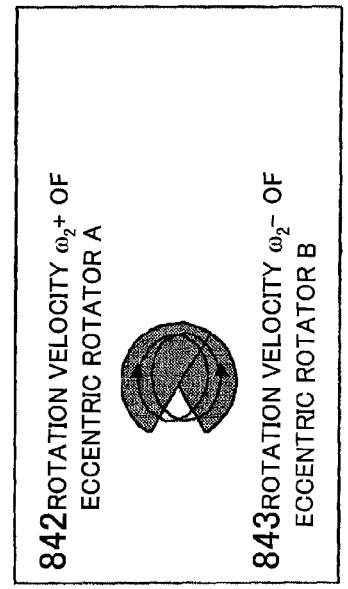
Figure 11A:
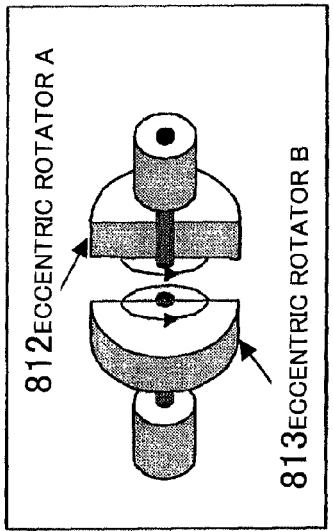
Figure 11C:
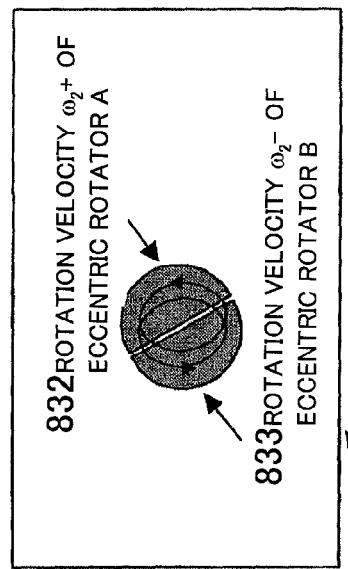

FIG. 11B schematically shows a case where both the eccentric rotator A 812 and the eccentric rotator B 813 of FIG. 11A are synchronously rotated in the same direction. As a result of the synchronous rotation, the eccentric rotations are combined. FIG. 11C schematically shows a case where both the eccentric rotator A 812 and the eccentric rotator B 813 of FIG. 11A are synchronously rotated with a phase delay of 180 degrees and in the same direction. As a result of the synchronous rotation, the torque rotation without eccentricity can be formed.

FIG. 11D schematically shows a case where both the eccentric rotator A 812 and the eccentric rotator B 813 of FIG. 11A are synchronously rotated in the opposite directions. As a result of the synchronous rotation in the opposite directions, a force to linearly generate simple harmonic oscillations in an arbitrary direction can be synthesized.

Figure 12A:
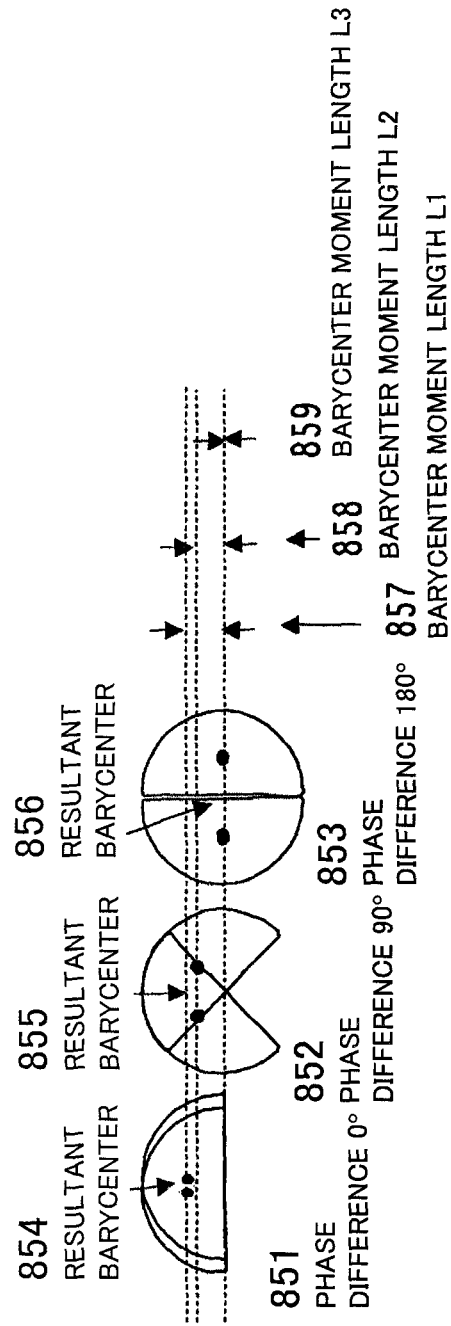
FIGS. 12A and 12B are views showing a haptic information presentation method of a vibration sensation and a force sensation by suitably synchronizing rotation directions and phases of both the eccentric rotator A 812 and the eccentric rotator B 813.

FIG. 12A is a view showing a method of changing a vibration intensity of an eccentric vibration by suitably synchronizing the rotation directions and phases of both the eccentric rotator A 822 and the eccentric rotator B 823 in FIG. 11B. A phase difference (for example, a phase difference 0° 851, a phase difference 90° 852, a phase difference 180° 853) of rotations of both the eccentric rotator A 822 and the eccentric rotator B 823 is adjusted, and resultant barycenters (854, 855, 856) of the two eccentric rotators, and barycenter moment lengths (857, 858, 859) between the rotation centers of the rotators and the resultant barycenters are suitably changed, so that the vibration intensity of the eccentric vibration can be changed without changing the rotation velocities of the eccentric rotators (822, 823). By this, the vibration frequency and the vibration intensity can be independently controlled.

On the other hand, in an eccentric rotator used in a manner mode of a cellular phone or the like, the vibration intensity is increased by increasing the rotation velocity, and the vibration frequency and the vibration intensity can not be independently controlled.

Figure 12B:
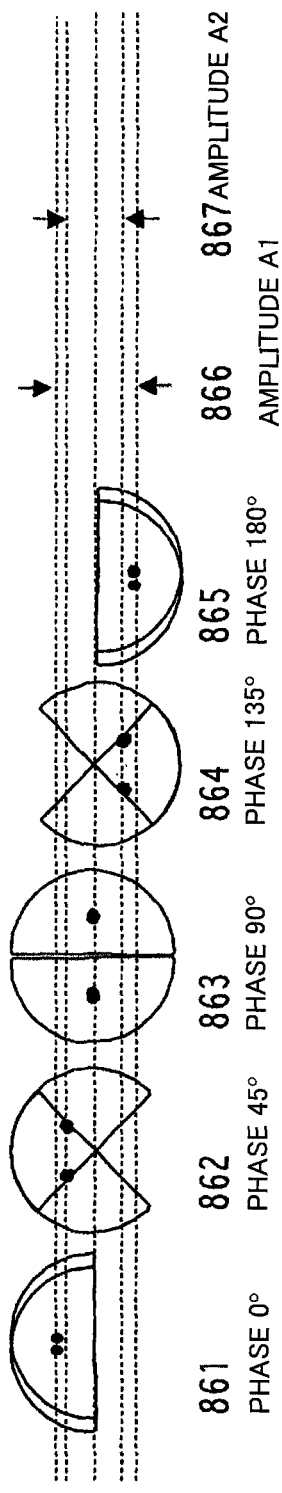

FIG. 12B is a view showing a method in which the rotation directions of both the eccentric rotator A 842 and the eccentric rotator B 843 in FIG. 11D are suitably inverted, so that the intensity of a force and/or a force sensation and the intensity of a vibration and/or a vibration sensation are changed. By inverting the rotation direction in suitable phases (for example, phase 0° 861, phase 45° 862, phase 90° 863, phase 135° 864, phase 180° 865) of both the eccentric rotator A 842 and the eccentric rotator B 843, amplitudes (866, 867) of vibrations are suitably changed, and the intensity of a force and/or a force sensation can be made variable without changing the rotation velocities of the eccentric rotators (842, 843). By this, the frequency and the intensity of the force and/or the force sensation can be independently controlled.

In the description of FIGS. 11A to 11D, 12A, and 12B, although the rotation axes of both the eccentric rotators are represented on the same axis, it is not inevitable that they are on the same axis, and the rotation axes have only to be parallel to each other, inclusive of the case where they are on the same axis.

Figure 13:
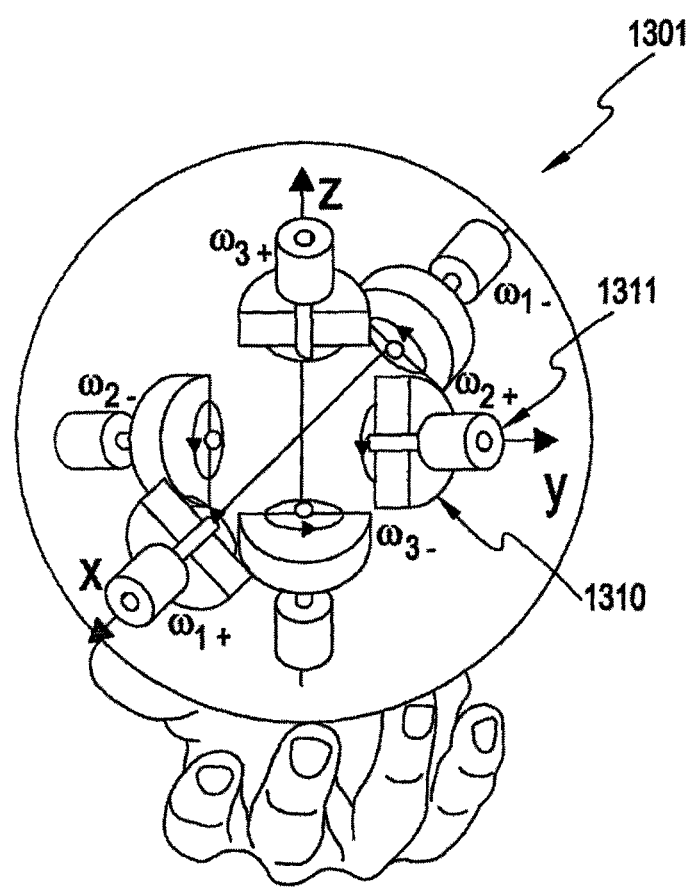
FIG. 13 is an explanatory view in which both the eccentric rotator A 812 and the eccentric rotator B 813 are made one pair, and three such pairs are arranged in an orthogonal coordinate system.

FIG. 13 is a view showing a haptic presentation device 1301 in which both the eccentric rotator A 812 and the eccentric rotator B 813 are made one pair and three such pairs are arranged in an orthogonal coordinate system. Reference numeral 1310 in the drawing denotes an eccentric rotator; and 1311, a motor to drive it. By arranging the plural eccentric rotators in the three-dimensional space, the vibration sensation, the torque sensation, and the force sensation shown in FIG. 11B to FIG. 11D can be presented in an arbitrary three-dimensional direction. The arrangement of the orthogonal coordinate system is an example for presentation in the three-dimensional direction.

(Applied Example 1)

Figure 14:
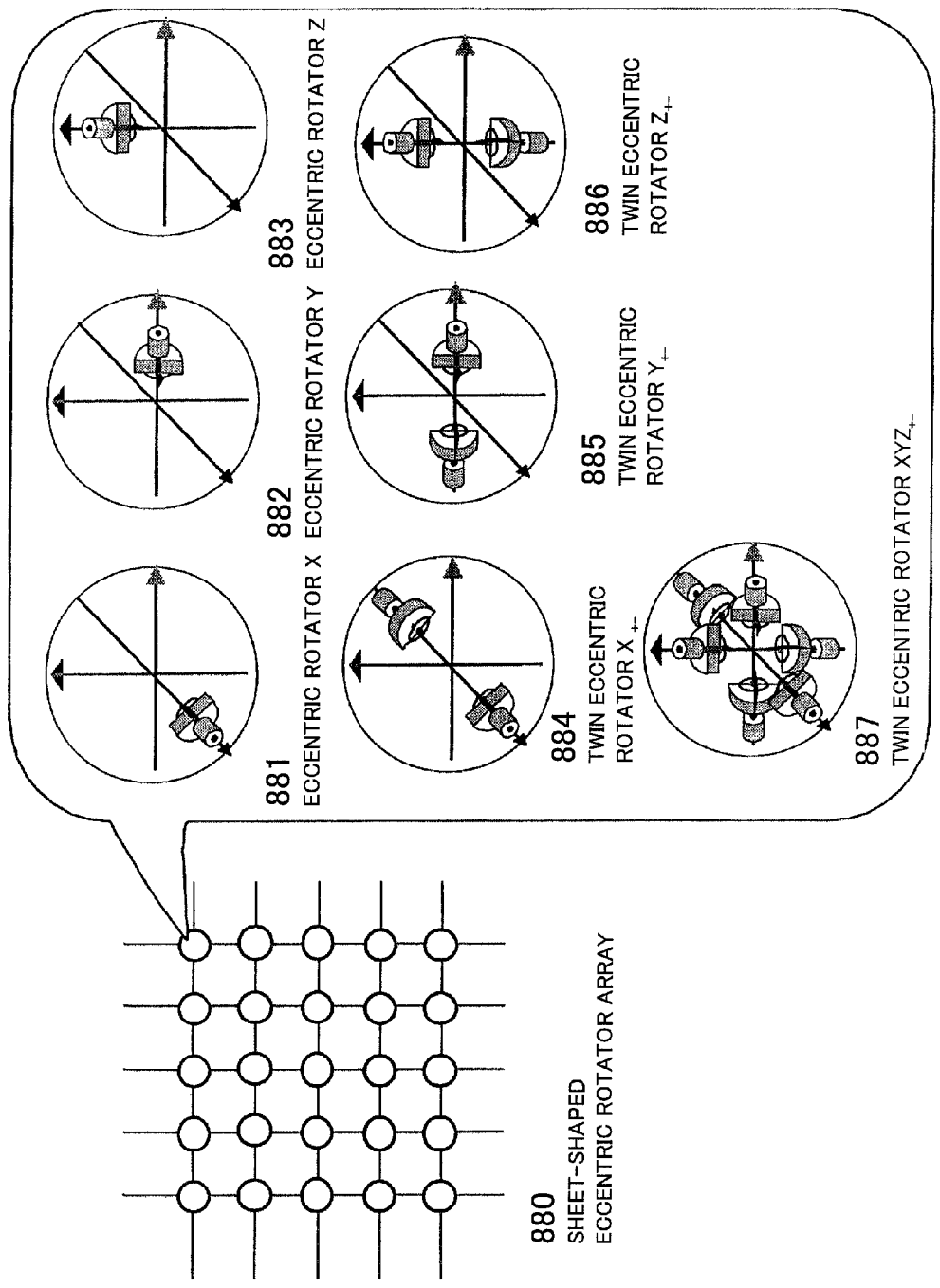
FIG. 14 is an explanatory view of a sheet-shaped eccentric rotator array to which the invention is applied.

FIG. 14 is a view showing a sheet-shaped eccentric rotator array 880 in which one of the eccentric rotator 711 of FIG. 10A, the twin eccentric rotator 811 of FIG. 11A, and the twin eccentric rotator arranged in the three-dimensional space of FIG. 13 is arranged like a sheet in a two-dimensional plane. A practicing method of a drive portion of the twin eccentric rotator may be a molecular motor or a piezoelectric element, and anything may be used as long as an objective physical quantity can be presented.

FIG. 15 is a view showing a glove-shaped eccentric rotator array 890 in which the sheet-shaped eccentric rotator array 880 is formed into a glove shape. By suitably controlling the rotation of each eccentric rotator, the vibration sensation, torque sensation, and force sensation of various patterns in space and time can be presented onto a palm.

Incidentally, the sheet-shaped eccentric rotator array 880 and the glove-shaped eccentric rotator array 890 are merely examples of the embodiment, and the embodiment can be applied to clothes and wearable haptic information presentation, inclusive of a case where the eccentric rotator array is three-dimensionally arranged.

FIGS. 16A to 16D are views showing a haptic information presentation method in which a sensory characteristic relating to a haptic sense is used, and rotations of both an eccentric rotator A 912 and an eccentric rotator B 913 are phase synchronized.

Figure 16A:
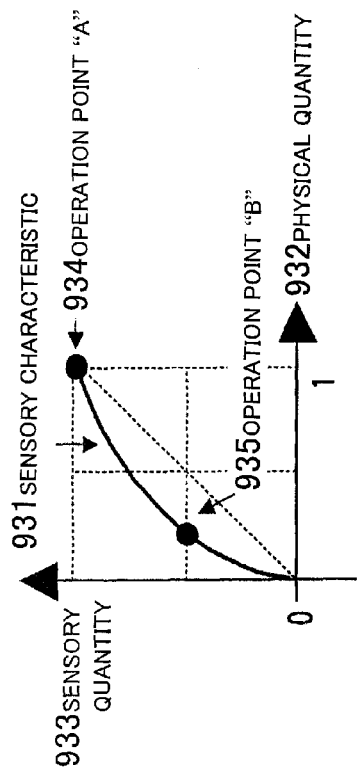
FIGS. 16A to 16D are views showing a haptic information presentation method in which a sensory characteristic relating to a haptic sense is used, and rotations of both an eccentric rotator A 912 and an eccentric rotator B 913 are phase synchronized.
Figure 16B:
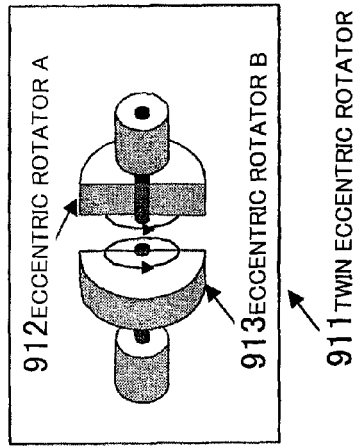

Here, FIG. 16B schematically shows a case where both the eccentric rotator A 912 and the eccentric rotator B 913 of FIG. 16A are synchronously rotated with a phase delay of 180 degrees in the same direction. As a result of the synchronous rotation, the torque rotation without eccentricity can be formed.

Figure 16C:
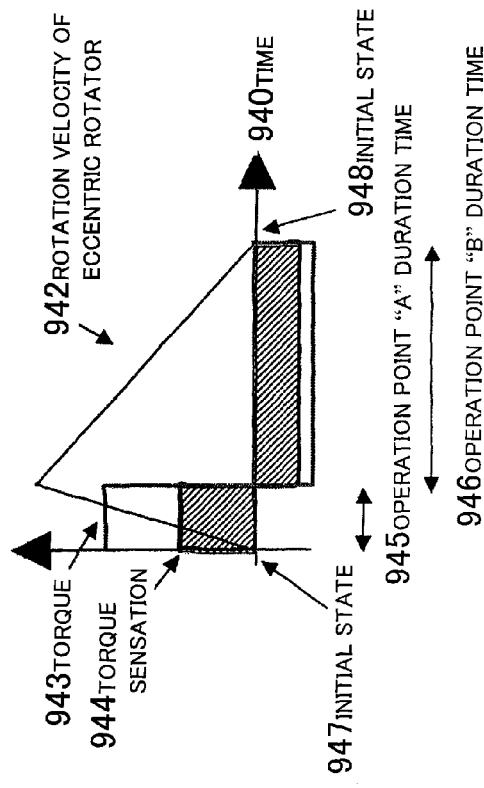
Figure 16D:
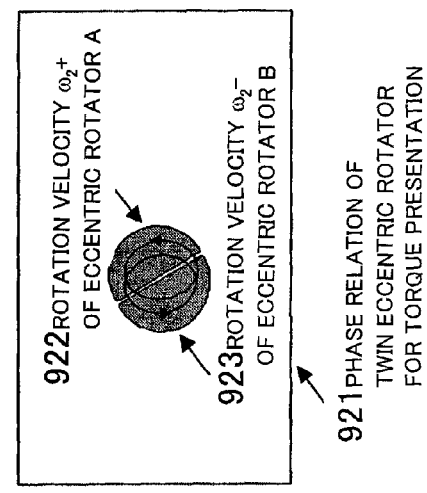

FIG. 16C schematically shows a case where a sensory characteristic 931 is a logarithmic function characteristic, and similarly to the sensory characteristic 211, the sensory characteristic 931 indicates that a sensory quantity 933 has a nonlinear characteristic of a logarithm or the like with respect to a physical quantity 932 as a stimulus. When consideration is given to a case where a positive torque is generated at an operation point A 934 on the sensory characteristic 931, and a negative torque in the reverse direction is generated at an operation point B 935, a torque sensation 944 is represented as in FIG. 16D. A torque 943 is proportional to the time differential of a rotation velocity 942 of a rotator. When an operation is performed at an operation point A 934 and an operation point B 935, the torque sensation 944 is perceived.

The torque 943 is physically returned to an initial state 948 in one cycle, and an integral value thereof is zero. However, a sensory integral value of the torque sensation 944 as a sensory quantity does not necessarily become zero. By suitably selecting the operation point A 934 and the operation point B 935 and by suitably setting an operation point A duration time 945 and an operation point B duration time 946, the torque sensation can continue to be freely presented in an arbitrary direction.

The above is established also when the sensory characteristic 931 exhibits a nonlinear characteristic of an exponential function case or the like. Also in the case where the sensory characteristic 931 of FIG. 16C has a threshold value like the sensory characteristic 231 of FIG. 3A, a torque sensation similarly to that of FIG. 3B occurs, and the torque sensation can continue to be intermittently presented only in one direction.

FIGS. 17A to 17D are views showing a haptic information presentation method in which a sensory characteristic relating a haptic sense is used, and the rotations of both an eccentric rotator A 1012 and an eccentric rotator B 1013 are phase synchronized in the opposite directions.

Figure 17A:
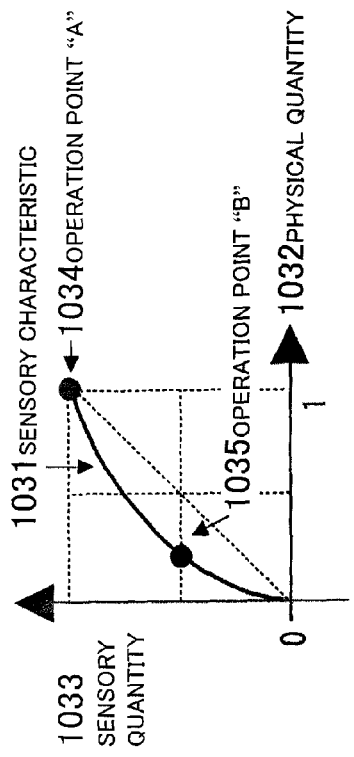
FIGS. 17A to 17D are views showing a haptic information presentation method in which a sensory characteristic relating to a haptic sense is used, and rotations of both an eccentric rotator A 1012 and an eccentric rotator B 1013 are phase synchronized in opposite directions.
Figure 17B:
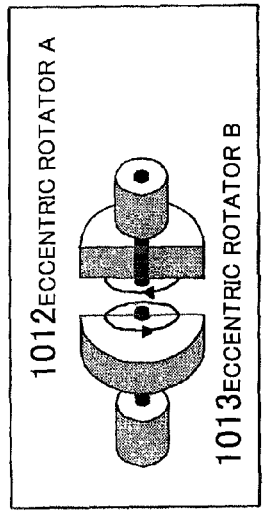
Figure 17C:
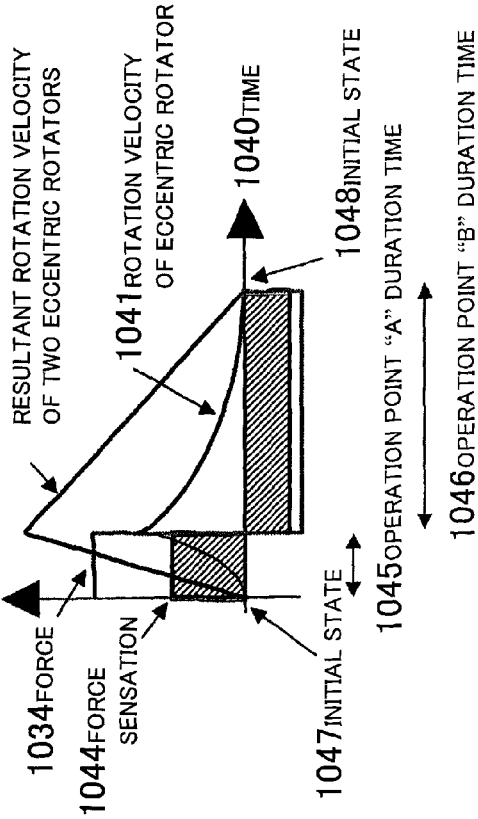
Figure 17D:
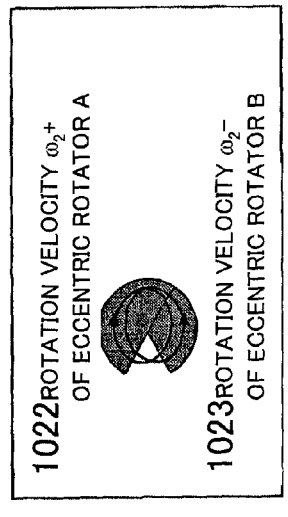

FIG. 17B schematically shows a case where both the eccentric rotator A 1012 and the eccentric rotator B 1013 of FIG. 17A are synchronously rotated in the opposite directions. As a result of the synchronous rotation in the opposite directions, a force to linearly generate simple harmonic oscillations in an arbitrary direction can be synthesized. FIG. 17C schematically shows a case where a sensory characteristic 1031 is a logarithmic function characteristic, and similarly to the sensory characteristic 211, the sensory characteristic 1031 indicates that a sensory quantity 1033 has a nonlinear characteristic of a logarithm or the like with respect to a physical quantity 1032 as a stimulus. When consideration is given to a case where a positive force is generated at an operation point A 1034 on the sensory characteristic 1031 and a negative force in the reverse direction is generated at an operation point B 1035, a force sensation 1044 is represented as in FIG. 17D. A magnitude 1042 of a resultant rotation velocity of both the eccentric rotators is the combination of rotation velocities of the eccentric rotator A 1012 and the eccentric rotator B 1013, and a force 1043 is proportional to the time differential of the magnitude 1042 of the resultant rotation velocity of both the eccentric rotators. When an operation is performed at an operation point A 1034 and an operation point B 1035, a force sensation 1044 is perceived. The force 1043 is physically returned to an initial state 1048 in one cycle, and an integral value is zero. However, a sensory integral value of the force sensation 1044 as a sensory quantity does not necessarily become zero. The force sensation can continue to be freely presented in an arbitrary direction by suitably selecting the operation point A 1034 and the operation point B 1035, by suitably selecting an operation point A duration time 1045 and an operation point B duration time 1046, and by adjusting the synchronous phases of both the eccentric rotator A 1012 and the eccentric rotator B 1013.

The above is established also when the sensory characteristic 1031 exhibits a nonlinear characteristic of an exponential function case or the like. Also in the case where the sensory characteristic 1031 of FIG. 17C has a threshold value like the sensory characteristic 231 of FIG. 3A, a force sensation similar to that of FIG. 3B occurs, and the force sensation can continue to be intermittently presented only in one direction.

Figure 18A:
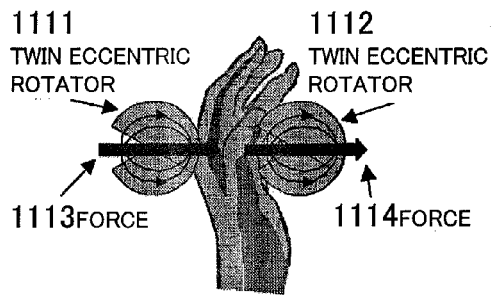
FIGS. 18A to 18F are schematic views of a method in which the presentation method of a force sensation using both the eccentric rotators shown in FIG. 17A is used to present a pushing feeling by oneself, an expansion feeling, a pressure feeling, a pulling feeling by oneself, a pulled feeling from outside, and a pushed feeling from outside.
Figure 18B:
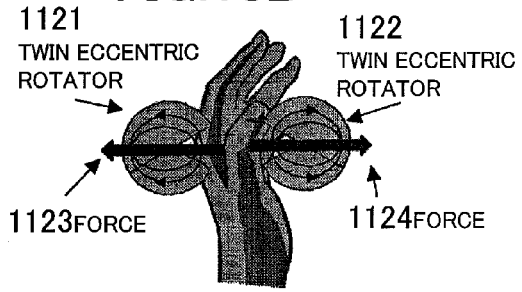
Figure 18C:
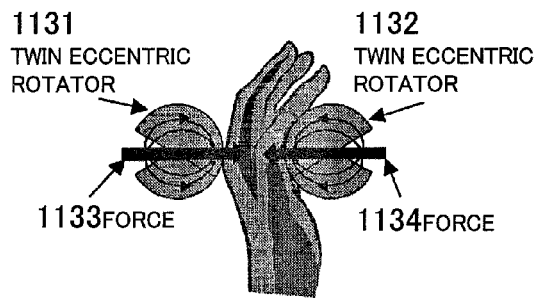
Figure 18D:
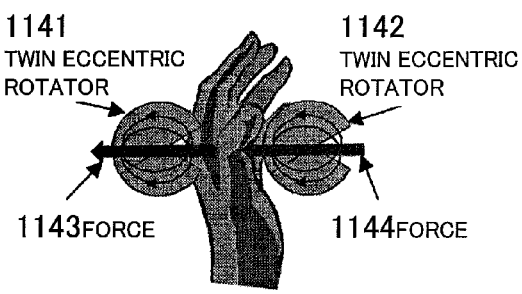
Figure 18E:
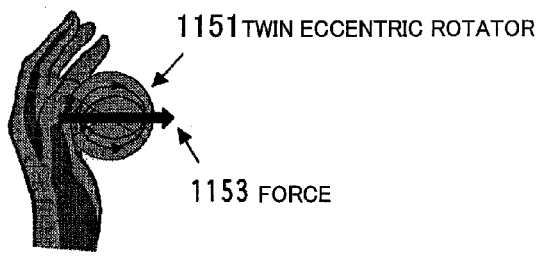
Figure 18F:
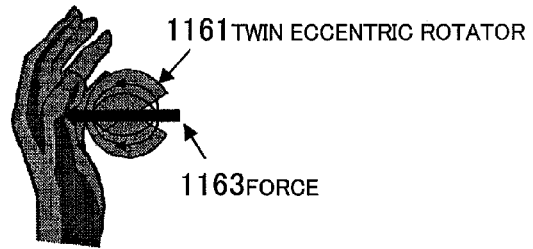

FIGS. 18A to 18F are schematic views of a method in which the presentation method of the force sensation using both the eccentric rotators shown in FIGS. 17A to 17D is used to present a pushing feeling by oneself (FIG. 18A), an expansion feeling (FIG. 18B), a pressure feeling (FIG. 18C), a pulling feeling by oneself (FIG. 18D), a pulled feeling from outside (FIG. 18E), and a pushed feeling from outside (FIG. 18F).

In the pushing feeling by oneself (FIG. 18A), a twin eccentric rotator 1111 and a twin eccentric rotator 1112 are used on the front and back of a palm, and a force 1113 and a force 1114 are presented, so that a feeling such as to push an object by oneself with the front of the palm can be presented.

The expansion feeling (FIG. 18B), the pressure feeling (FIG. 18C), the pulling feeling by oneself (FIG. 18D), the pulled feeling from outside (FIG. 18E), and the pushed feeling from outside (FIG. 18F) can also be similarly presented.

Figure 19:
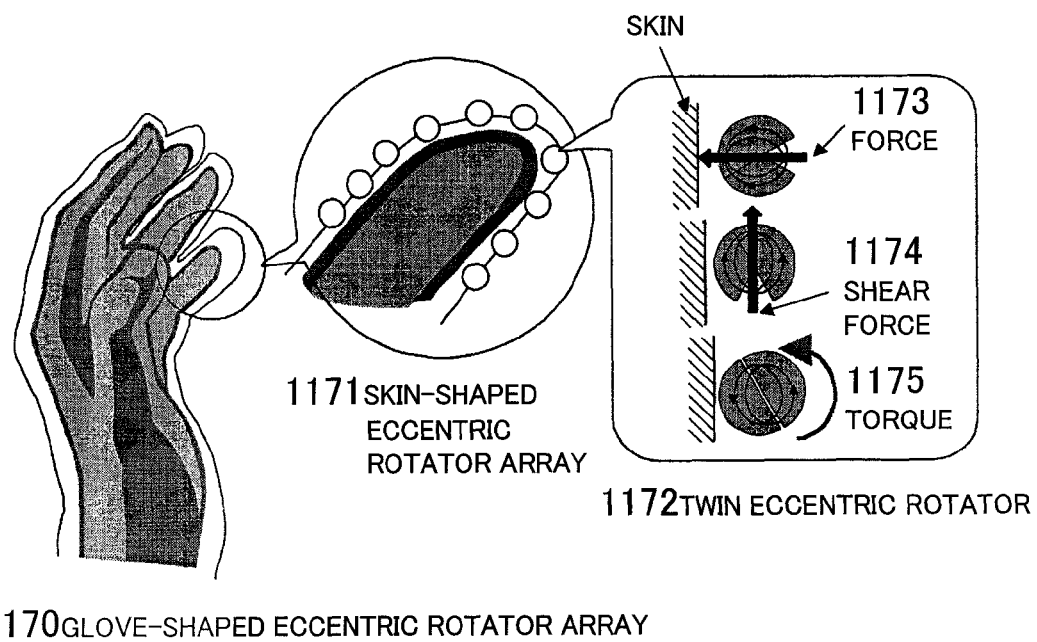
FIG. 19 is an explanatory view of a skin-shaped eccentric rotator array to which the invention is applied.

FIG. 19 is a view showing a method of presenting a force 1173, a shear force 1174, and a torque 1175 to a palm and a finger tip by suitably controlling the rotation of each twin eccentric rotator 1172 on 1171 of the groove-shaped eccentric rotator arrays 1170.

Figure 20:
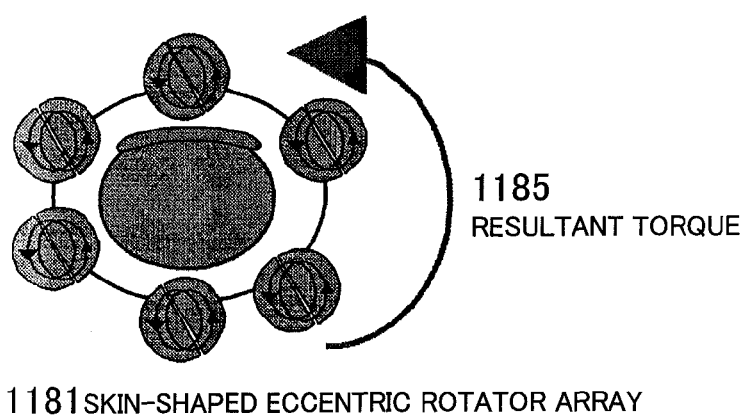
FIG. 20 is an explanatory view of a skin-shaped eccentric rotator array to which the invention is applied.

Besides, as shown in FIG. 20, by presenting a torque in the same direction on a skin-shaped eccentric rotator array 1181 round around a finger, a resultant torque 1185 to twist the whole finger can be presented.

Figure 21:
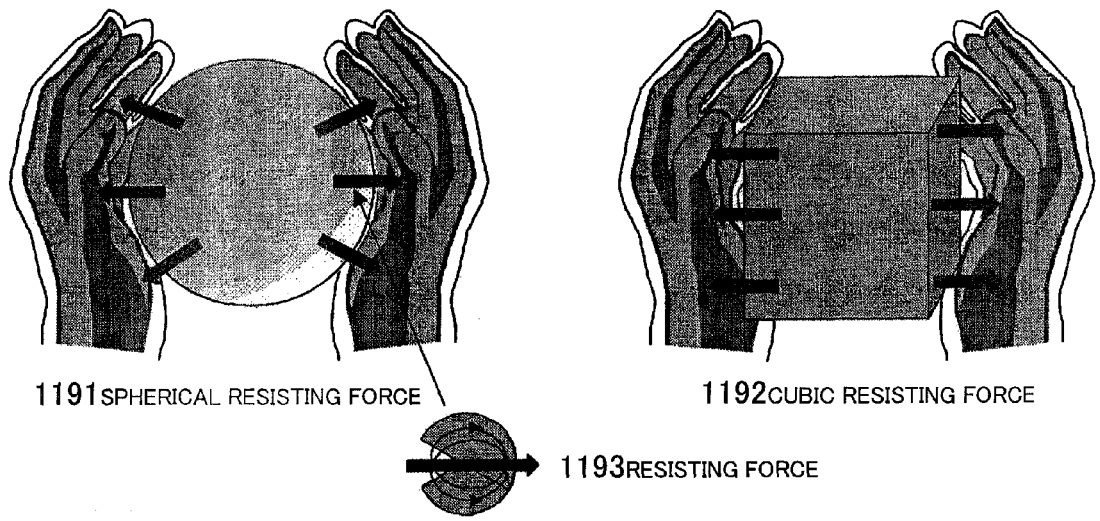
FIG. 21 is an explanatory view of a skin-shaped eccentric rotator array to which the invention is applied.

Further, as shown in FIG. 21, by suitably adjusting the spatial intensity distribution of a resisting force 1193 presented to a palm, and by presenting a spherical resisting force 1191, a cubic resisting force 1192 or the like, a three-dimensional shape feeling of a sphere, a cubic or the like, or a tactile sensation such as an elastic feeling or a soft feeling can be presented to the palm.

Figure 22:
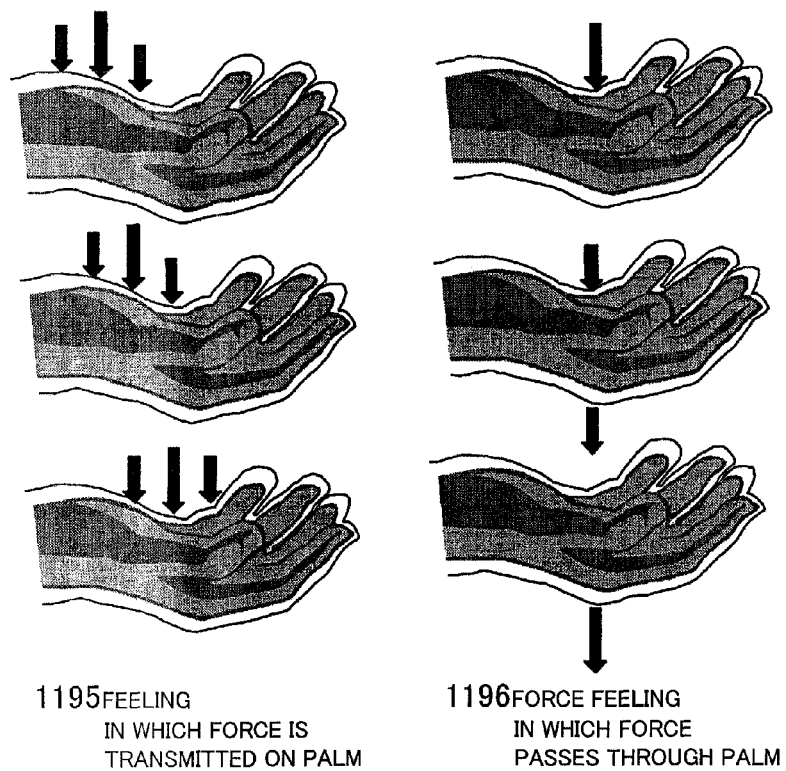
FIG. 22 is an explanatory view of a skin-shaped eccentric rotator array to which the invention is applied.

Further, as shown in FIG. 22, by temporally changing the spatial intensity distribution of the resisting force 1193 presented onto the palm, it is possible to present a feeling 1195 in which a force is transmitted on the palm, a feeling in which a object rotates on the palm, and a force sensation 1196 in which a force passes through the palm. Similarly, by changing the shear force, the torque and the like, the texture of a surface of a virtual object, such as surface roughness, can be presented.

According to the presentation methods shown in FIGS. 19 to 22, by suitably changing the space distribution of the force sensation in conformity with the movement of the palm, it is possible to present various haptic information relating to the object, such as the existence, shape, elasticity, texture and the like of the virtual object.

(Operation Principle 2)

FIGS. 23A to 23D are views showing a vibration haptic information presentation method in an arbitrary direction using a method of changing a sensory characteristic by a masking effect relating to a haptic sense, which is an example of a control method of continuously or intermittently presenting haptic information of at least one of a vibration sensation, a force sensation and a torque sensation in an arbitrary direction.

Figure 23A:
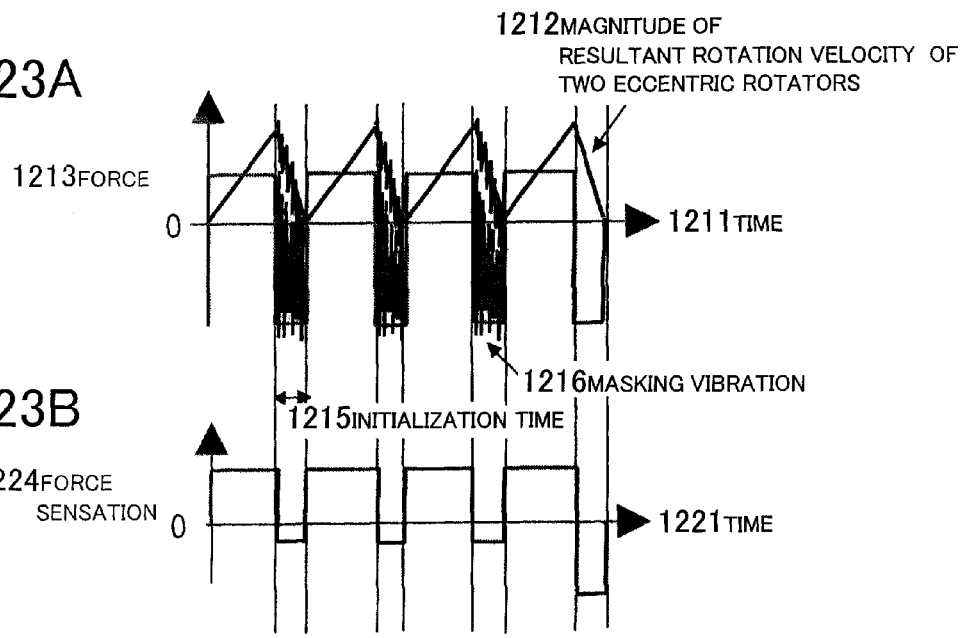
FIGS. 23A to 23D are views showing a haptic information presentation method in an arbitrary direction by using a method of changing a sensory characteristic by a masking effect relating to a haptic sense.
Figure 23B:
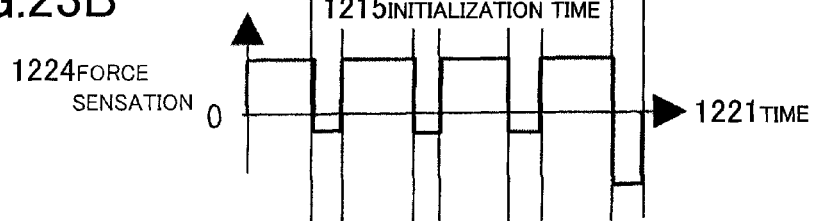

The sensory characteristic is masked by a masking vibration 1216, and a force sensation 1224 is decreased. This masking vibration can be generated by synchronizing the rotation velocity 1022 of the eccentric rotator A with the rotation velocity 1023 of the eccentric rotator A in FIG. 17B and by fluctuating the velocities. FIG. 23A schematically shows this, and the force sensation 1224 perceived at this time is represented as in FIG. 23B. A force 1213 is proportional to the time differential of a magnitude 1212 of a resultant rotation velocity of the two eccentric rotators.

Figure 23C:
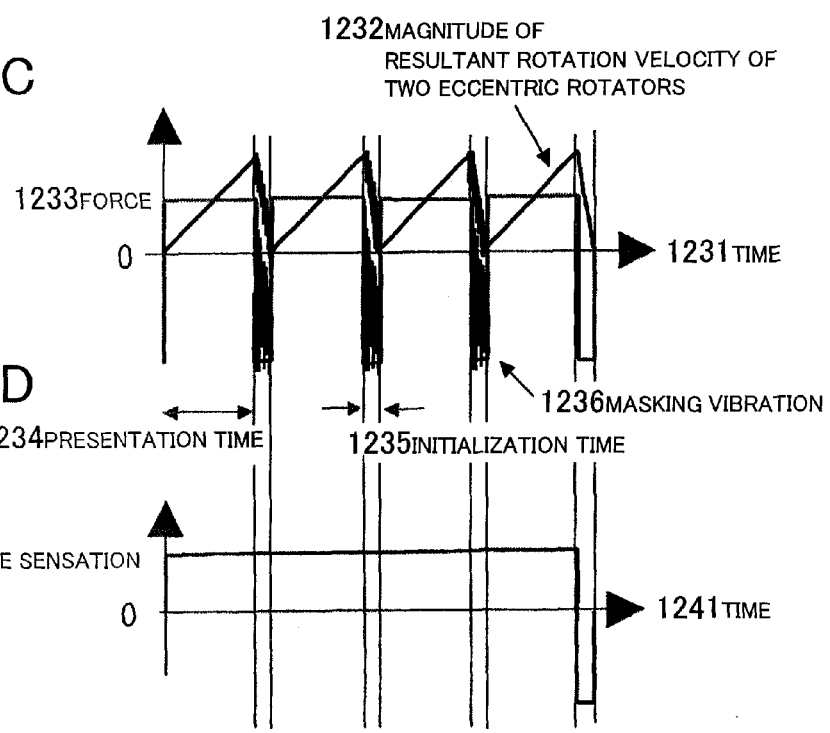
Figure 23D:
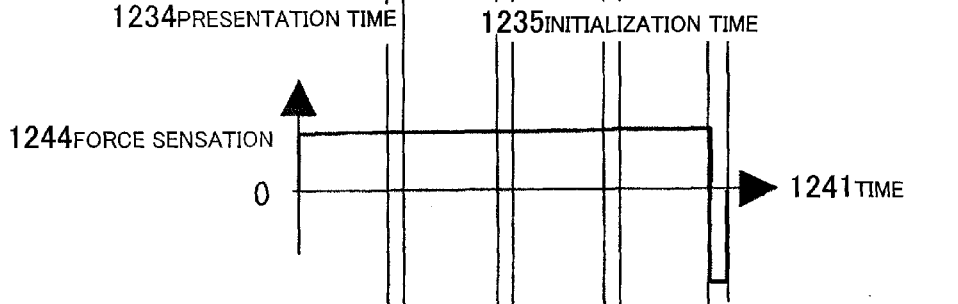

At this time, an initialization time 1215 in which the rotation velocity 1212 of the rotator is initialized is shortened and when it becomes shorter than a certain specific time as shown in FIG. 23C, a critical fusion occurs in which although a negative force due to the initialization physically exists, it is felt as if a force is continuously presented like a force sensation 1244.

The above occurs also in the case where a maskee and a masker are different rotators, and a similar continuous presented sensation occurs not only in the case of the force but also in the case of a torque.

In the actual use of the haptic information presentation system, since a posture change of a torque presentation device by a human unconscious motion is felt as an inertial force due to the Coriolis force or gyro effect, it is necessary that the inertial force of the rotator itself is suppressed to the utmost, and a large torque can also be presented. In the following, this inertial force will be considered.

Figure 24A:
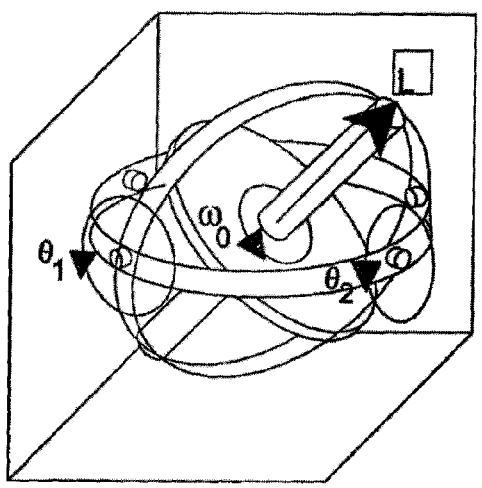
FIGS. 24A and 24B are explanatory views of a gyroscope type and a resultant angular momentum vector differential type.
Figure 24B:
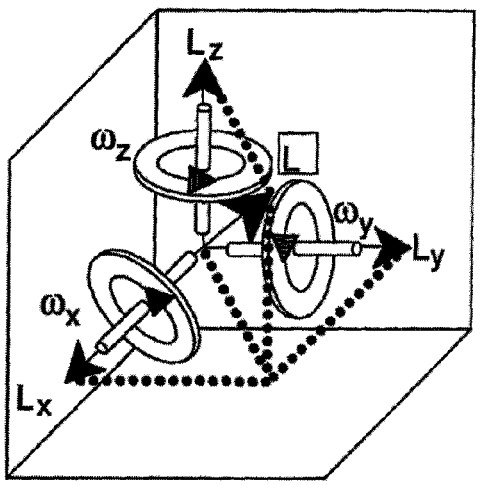

As methods of generating a torque sensation, there are a method of accelerating and decelerating the rotation velocity of a rotation body having an inertia moment, and a method of turning a rotation body around an axis orthogonal to its rotation axis. From the viewpoint of dynamics of mechanism, the method is roughly classified into following two types, namely, a rotator posture control type (hereinafter referred to as a gyroscope type 1311) and a resultant angular momentum vector differential type 1312 (FIGS. 24A and 24B).

First, the gyroscope type 1311 using a gyroscope to control the posture of a rotator will be described. A gimbal structure is used, and with respect to the posture of the rotator turning at a constant angular velocity $\omega_0$, turning angles $\theta_1$ and $\theta_2$ around two gimbal shafts are changed so that torque can be generated. An angular momentum $L_0$ at the time when the rotation body with an inertia moment I is rotated at an angular velocity $\omega_0$ is expressed by $$L_0 = I\omega_0.$$

At this time, in view of the direction in which the torque is generated, a torque vector $\tau$ at the time when an angular momentum vector L ($|L|=L_0$) having a constant magnitude is turned at an angular velocity $\omega$ is expressed by $$\tau = \omega \times L, \text{ where } \omega = d\theta/dt.$$

Next, the resultant angular momentum vector differential type 1312 to control the time change of the resultant angular momentum vector will be described. Rotation speeds $\omega_x$, $\omega_y$ and $\omega_z$ of three rotators fixed to an x-axis, a y-axis and a z-axis are independently controlled, and the angular momentums of the rotators are combined, so that an angular momentum vector can be formed in an arbitrary direction. When this is suitably controlled, a torque can be formed in an arbitrary direction. A torque vector at the time when the angular momentum vector L is changed is expressed as follows.

When an inertia moment around each axis is made $I_i$, the angular momentum $L_i$ of rotation at an angular velocity $\omega_i$ around each of the x-axis, y-axis and z-axis is expressed by $$L_i = I_i \omega_i, \; i=x,y,z.$$

When unit vectors in the x-axis, y-axis and z-axis directions are made i, j and k, the resultant angular momentum vector composed of the angular momentums around the respective axes is expressed by $$L = L_x i + L_y j + L_z k.$$

The time differential of the resultant angular momentum vector is the torque vector $\tau$.

$$\tau = dL/dt$$

Accordingly, by changing the ratio $\omega_x:\omega_y:\omega_z$ of the angular speeds in the x-axis, y-axis and z-axis directions, the direction of the angular momentum vector generated can be controlled in an arbitrary direction. This method has merits that the control is easy, and various three-dimensional force sensations can be presented. Incidentally, the torque felt by a person has the same magnitude as this torque vector $\tau$ and the opposite direction by the action-reaction law (Newton's third law).

Figure 25:
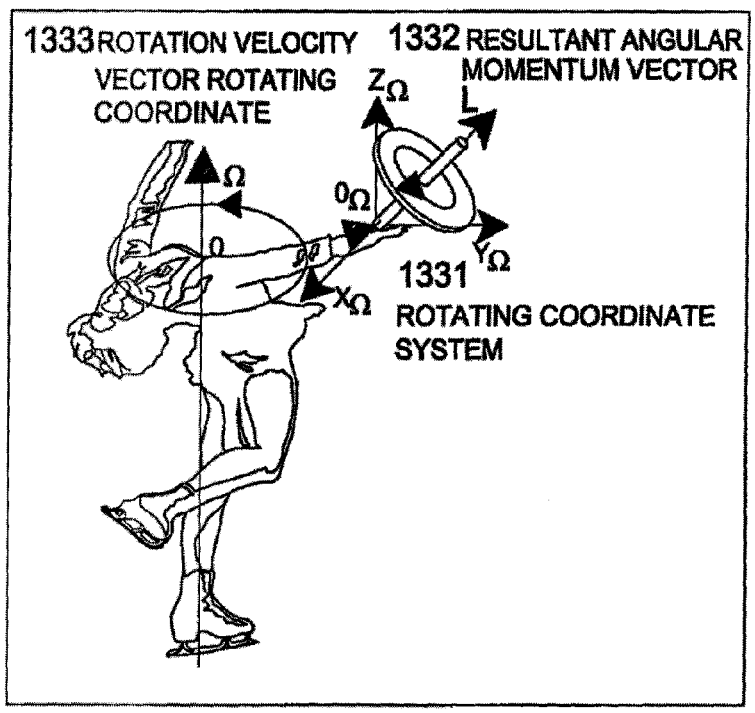
FIG. 25 is an explanatory view of a resultant angular momentum in an inertia coordinate system.

When reference is made to FIG. 25,

Where, in the case where $|L|=L_0$ is constant, and the direction of the resultant angular momentum vector L is turned at $\omega=d\Omega/dt$, the torque vector is expressed by $$\tau = dL/dt$$
$$= \omega \times L,$$

and is coincident with that of the gyroscope type. This indicates that although the torque which can be presented in the gyroscope type can be presented by the proposed method, the converse is not.

Now, in the case where consideration is given to the use in the so-called human navigation, the motion of the posture of a user generates a change of angular momentum vector, and there is a possibility that an unintentional torque is presented. Then, consideration is given to a torque generated by the resultant angular momentum vector L turning on a turning coordinate system $O_\Omega$ turning at an angular velocity vector $\Omega$ with respect to the inertia coordinate system O.

The equation of motion in the inertia coordinate system O 1330 and the turning coordinate system $O_\Omega$ 1331 is expressed by $$\tau = [dL/dt]_O$$
$$= [dL/dt]_{O\Omega} + \Omega \times L.$$

As shown in FIG. 25, a torque felt by a person through the temporal change of a resultant angular momentum vector 1332 on the palm of the turning person is the sum of a torque $[dL/dt]_{O\Omega}$ by the temporal change of the resultant angular momentum vector 1332 in the turning coordinate system $O_\Omega$ 1331 and the precession torque $\Omega \times L$. The term "precession" means that when a torque is applied to a gyro from outside, the spin axis of the gyro is turned in a direction orthogonal to the applied torque. The cause of the generation of the precession torque here is the turning of the coordinate axis. That is, even in the case where there is no temporal change of the angular momentum L on the palm of the user when viewed from the user, when the user turns at the angular velocity $\Omega$ as shown in FIG. 25, the precession torque $\Omega \times L$ is felt.

Here, in the case where the navigation is performed, there occurs a case where the change of the posture of the user is suppressed. This is because when the body of the user is turned in the horizontal direction, the precession torque well known in a gyrocompass is exerted on the angular momentum $L_x i$ orthogonal to the angular velocity $\Omega$ and $L_y j$, and functions to suppress the turn $\Omega$ of the body of the user. Although this precession torque prevents the free movement of the user, it has an effect to suppress the fluctuation of the torque presentation device due to the walking of the user. Besides, when the arm of the user is moved in the vertical direction, a similar precession torque is exerted on the angular momentum $L_x i$ and $L_z k$. That is, when the user moves the body, the torque is exerted, and the same direction is always indicated like the gyrocompass.

The control feature of this embodiment is to control the temporal change of the resultant angular momentum vector L 1332, and the easiness of the control is a great merit. By abruptly changing L in the vicinity of zero, a large torque $[dL/dt]_{O\Omega}$ is generated, and the precession torque ($\Omega \times L$) can be suppressed to be low. By this, the navigation is enabled without hindering the movement of the user.

On the other hand, in the case where the torque presentation device is swayed by the movement of the user and a difficulty occurs, by temporally changing L in the vicinity of the resultant angular momentum vector L 1332 having a suitable magnitude, the torque can be presented while the sway of the torque presentation device is suppressed.

On the other hand, in the case where the gyroscope type 1311 is used, $$\tau = [dL/dt]_{O\Omega} + \Omega \times L$$
$$= \omega \times L + \Omega \times L$$

is established. In order to present a large torque, a large angular momentum vector L is required, and as a result, a large precession torque is generated without fail.

Especially, for the use in the so-called human navigation, miniaturization is required to such a degree as to enable internal or external mounting to a cellular phone or a PDA. Here, consideration will be given to a torque presentation method and operation principle in the case where internal mounting to a cellular phone is performed.

According to the number of dimensions in which a torque is actually generated, a classification into four can be made as shown in FIGS. 26A to 26D.

In a conventional cellular phone, a vibration has been used to inform an incoming call. In the navigation by a recent cellular phone, when a street corner approaches, attention is first aroused by vibration, and then, the direction in which a turn is to be made is indicated by voice. That is, since attention is aroused by the vibration, and direction information is not presented, this is defined as a Zero dimension (vibration 1341).

Figure 26A:
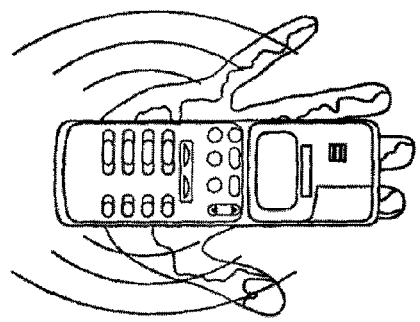
FIGS. 26A to 26D are explanatory views showing a torque presentation method and an operation principle in the case where a cellular phone has a built-in haptic information presentation system to which the invention is applied.
Figure 26B:
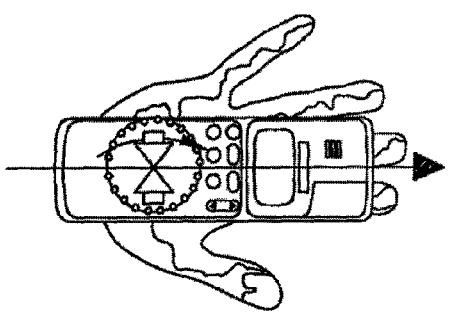
Figure 26C:
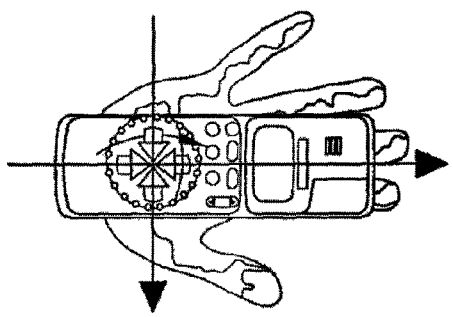
Figure 26D:
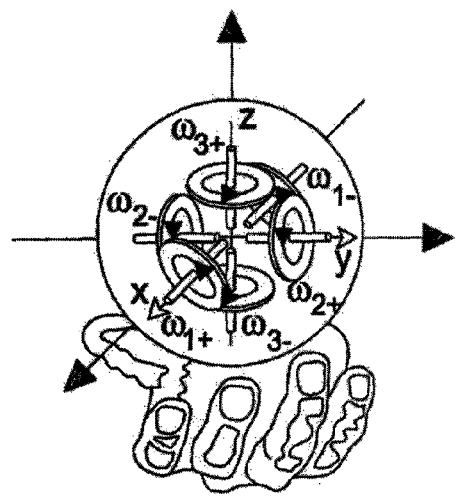
Figure 27:
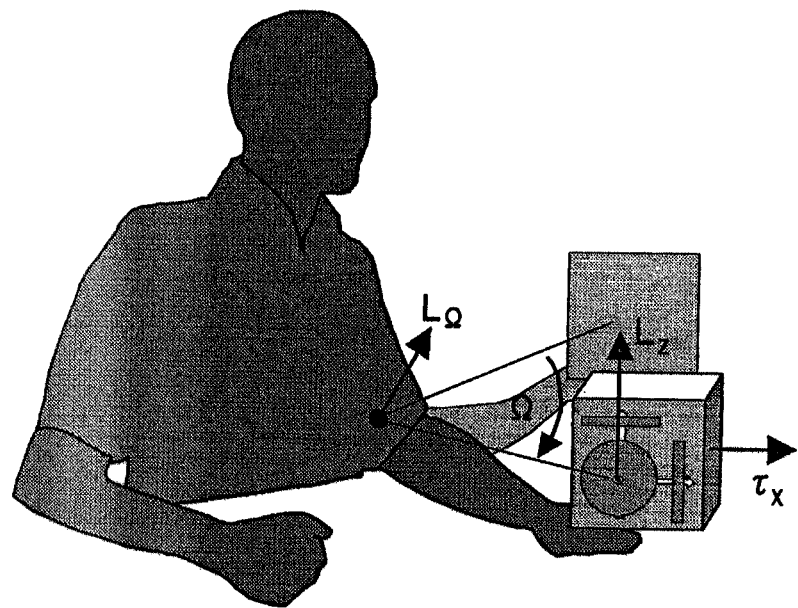
FIG. 27 is an explanatory view showing that in the explanation of merits of three-dimensional torque presentation, when an arm is moved vertically, the posture of a torque presentation device is stabilized by the conservation of a turning axis like a vertical gyro in an airplane.

Besides, in the direction presentation on a plane space as in the navigation or the like, two dimensions are sufficient as shown in FIG. 26C, and a haptic navigation system can be constructed by internal mounting to a cellular phone or the like. FIG. 26D shows a model which adopts an opposed type twin motor system newly invented in view of the balance of the center of gravity and the like.

Next, merits of three-dimensional torque presentation will be described.

As described above, since the $\Omega \times L$ component hinders the motion of the user, it has been proposed that the operation is performed at the control point where L is in the vicinity of zero. However, with respect to the Lz component, although the precession torque is not exerted in the turn on the horizontal surface, such as the turning of the user, the posture of the torque presentation device becomes stable in the vertical motion of the arm by the conservation of the rotation axis like a vertical gyro in an airplane (see FIG. 27).

That is, the arm is lowered, the turning vector $\Omega$ is generated around an elbow as a fulcrum, a torque $\tau_x$ is generated in the torque presentation device and in the x direction on the palm so as to turn the $L_z$ vector, and a torque is generated in the direction of canceling the turning vector $\Omega$. It is conceivable that the torque around the elbow as the fulcrum, which suppresses the vertical movement of the torque presentation device, stabilizes the position of the torque presentation device.

When this is Lx, like a gyroscope(an 'CHUKYU GOMA') which does not fall but turns while keeping the horizontal, it is conceivable that while the arm is turning on the horizontal plane, the torque to cancel the gravity is generated to float the torque presentation device, and reduces the user's fatigue caused by continuing to hold it.

(Operation Principle 3)

Hereinafter, a description will be given to a haptic presentation device in which the haptic presentation device 1301 shown in FIG. 13 is further improved.

Figure 28:
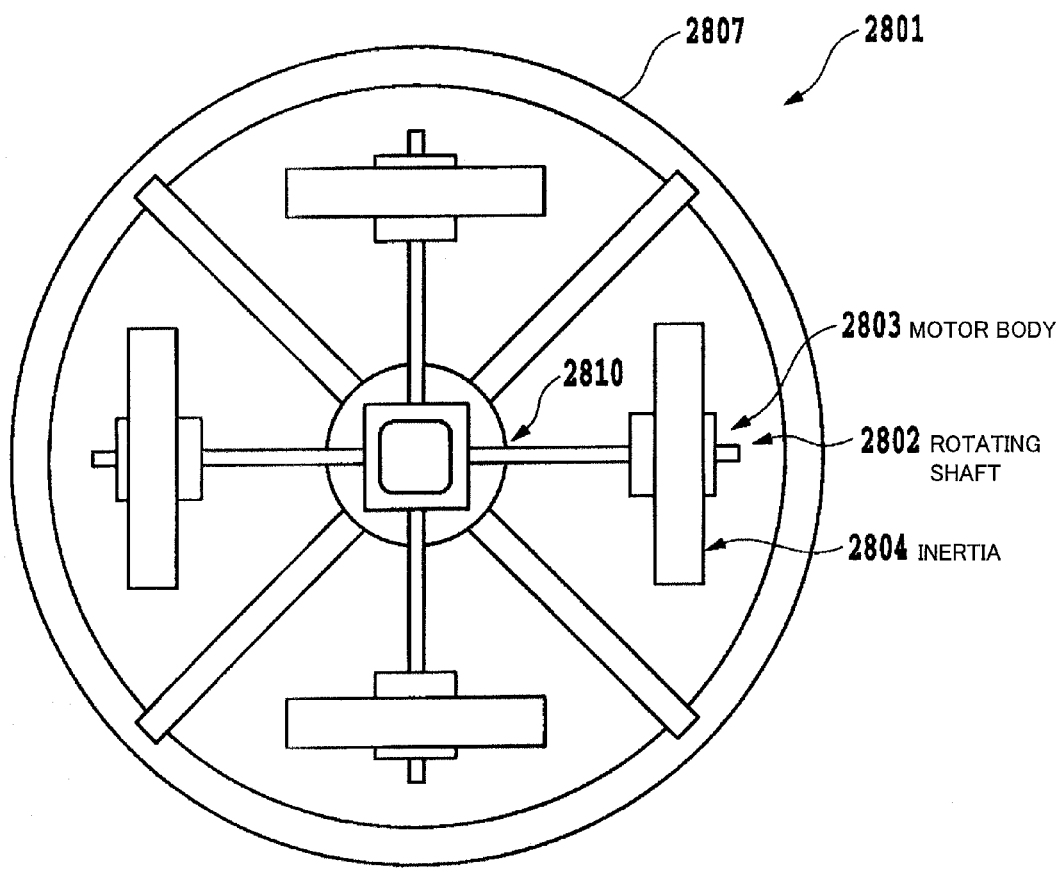
FIG. 28 is a view showing a two-dimensional sectional view of a haptic presentation device 2801 in which two facing eccentric rotators are made one pair and three such pairs are arranged in an orthogonal coordinate system.

FIG. 28 is a view showing a two-dimensional sectional view of a haptic presentation device 2801 in which similarly to the haptic presentation device 1301 of FIG. 13, two facing eccentric rotators are made one pair and three such pairs are arranged in an orthogonal coordinate system. In the haptic presentation device 2801, an eccentric rotator (inertia; inertial body) 2804, a motor 2803 and the like are arranged in a spherical housing 2807, and FIG. 28 is a sectional view taken along the center of the spherical housing 2807. The eccentric rotator 2804 and the motor 2803 are united, and a rotating shaft 2802 of the motor is fixed to a joint 2810 of the housing 2807. That is, the rotating shaft 2820 is fixed, and similarly to the rotation of a normal motor, a magnet of a rotator of the motor integral with the rotating shaft 2802 and an electromagnet of the main body of the motor 2803 repel each other and the motor 2803 is rotated. By this, in the haptic presentation device 2801, a rotation body in which the eccentric rotator and the motor are united is rotated. Incidentally, it would be apprehensible for one of ordinary skill in the art that a terminal for power supply to the main body of the motor 2803 is fabricated so that the polarity of the contact is kept even if the main body of the motor 2803 is rotated (not shown). Thus, as compared with the haptic presentation device 1301 of FIG. 13 in which the motor is fixed to the housing and only the eccentric rotator is rotated, in the haptic presentation device 2801, the mass of the rotation portion can be made large (that is, the inertia moment can be made large), and the efficiency of the mechanical operation (presentation of vibration, torque and force) by the rotation of the rotation body is improved. Further, as the weight of the housing 2807 is reduced, the efficiency is improved.

Incidentally, the haptic presentation device 2801 shown in FIG. 28 is not limited to the case where the eccentric rotator is applied, but is naturally applicable to a rotator which is not eccentric. Further, although the spherical housing is exemplified for the haptic presentation device 2801, the principle of the haptic presentation device 2801 can be naturally applied to a housing other than the spherical shape.

Figure 29:
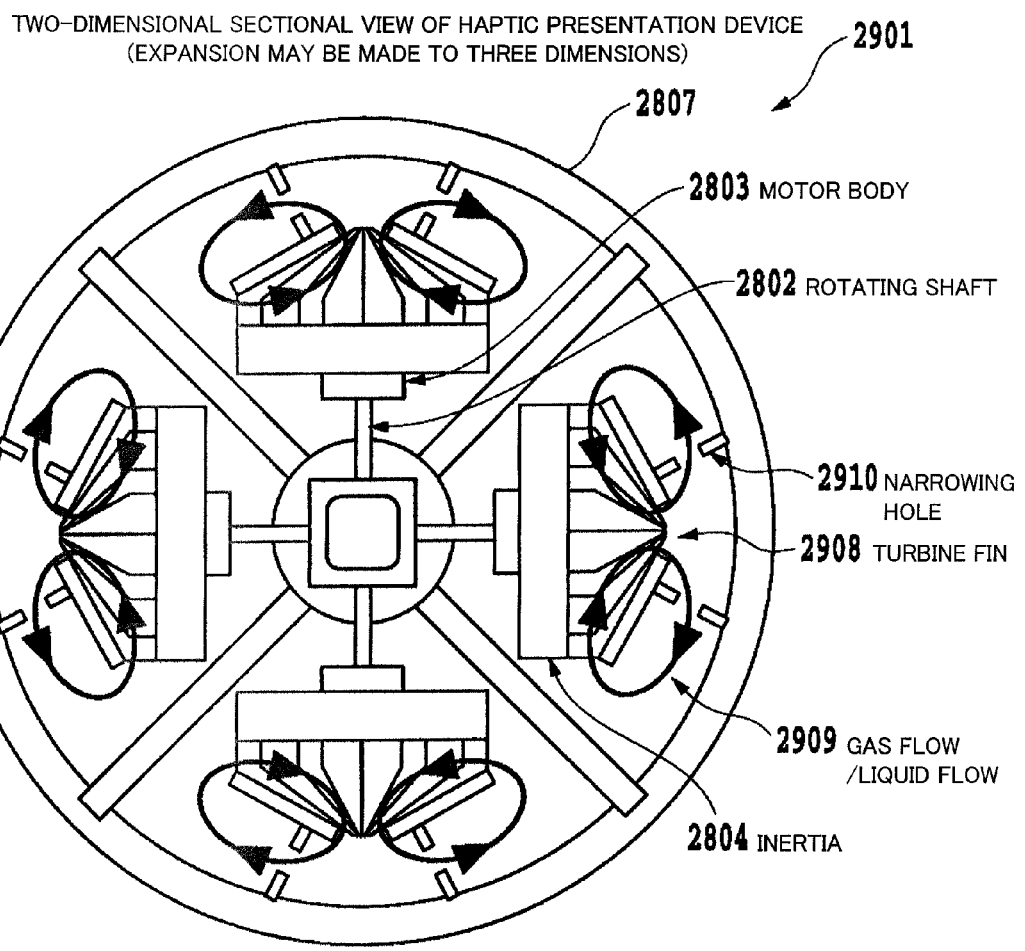
FIG. 29 is a view showing a two-dimensional sectional view of a haptic presentation device 2901 in which the haptic presentation device 2801 is further improved.

FIG. 29 is a view showing a two-dimensional sectional view of a haptic presentation device 2901 in which the haptic presentation device 2801 of FIG. 28 is further improved. The haptic presentation device 2901 includes a turbine fin 2908 arranged in a spherical housing 2807 and a fluid (gas flow or liquid flow) 2909, and FIG. 28 is a sectional view taken along the center of the spherical housing 2807. The turbine fin 2908 is provided in a rotation body in which an eccentric rotator 2804 and a motor 2803 are united. By this, in the haptic presentation device 2901, when the rotation body in which the eccentric rotator and the motor are united is rotated, the turbine fin stirs the fluid 2909. Thus, as compared with the rotation of the rotation body of the haptic presentation device 2801 of FIG. 28, in the haptic presentation device 2901, the load resistance is applied to the rotation of the turbine fin by the circulation of the fluid, and as a result, since the effective inertia moment of the rotation body is increased, the efficiency of the mechanical operation (presentation of vibration, torque and force) by the rotation of the rotation body is improved. Further, as the relative weight of the housing 2807 is reduced, the efficiency is improved. Besides, the load resistance can be applied to the rotation of the turbine fin by providing a narrowing hole 2910 to narrow the section of a liquid flow passage in a route for circulation of the fluid.

Figure 30:
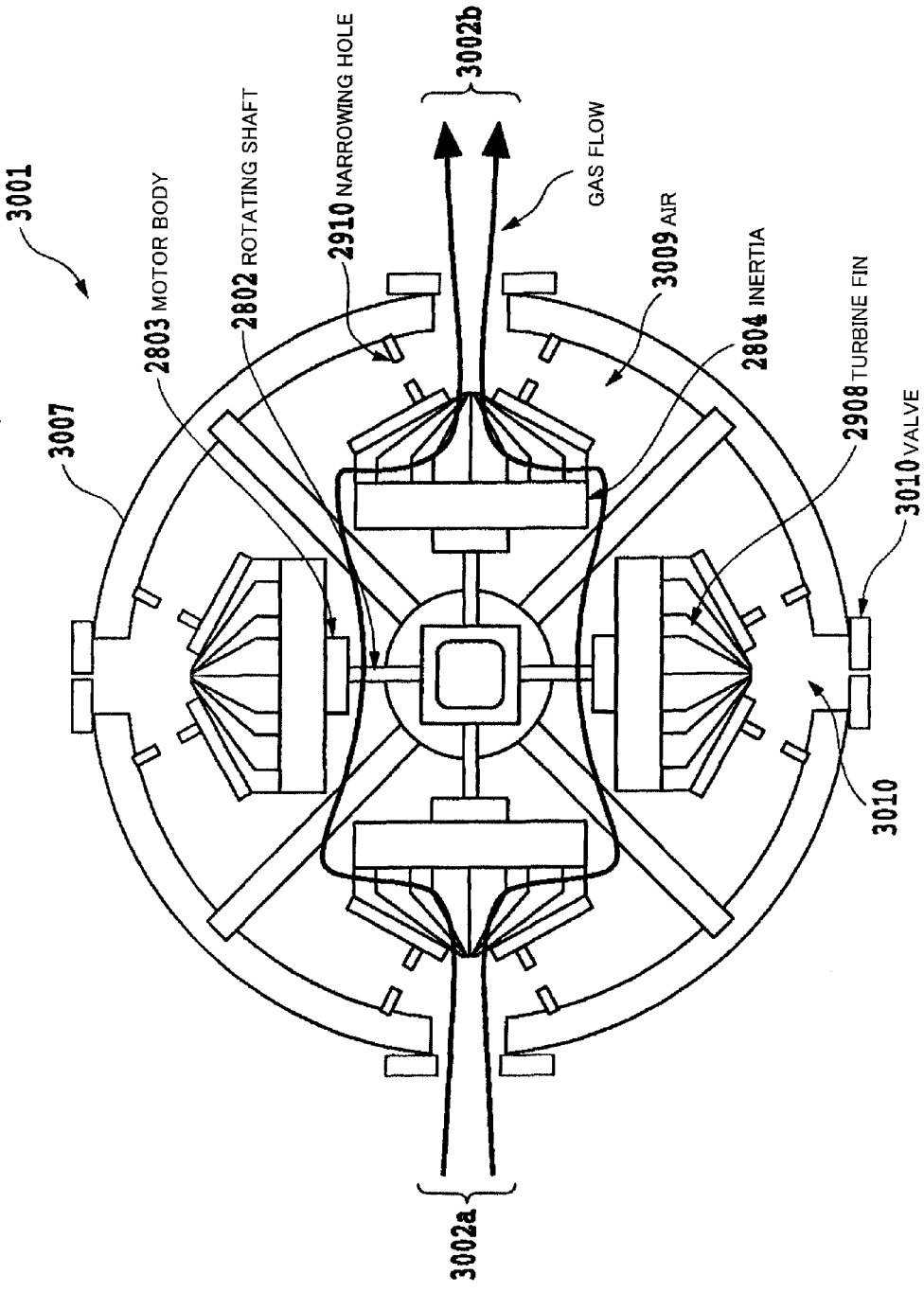
FIG. 30 is a view showing a two-dimensional sectional view of a haptic presentation device 3001 in which the haptic presentation device 2901 is further improved.

FIG. 30 is a view showing a two-dimensional sectional view of a haptic presentation device 3001 in which the haptic presentation device 2901 of FIG. 29 is further improved. The haptic presentation device 3001 includes an air 3009 in a spherical housing 3007, holes 3010 are provided in the housing 3007 to be opposite to turbine fins, and FIG. 30 is a sectional view taken along the center of the spherical housing 3007. As a result that the holes 3010 are provided in the housing 3007, in the haptic presentation device 3001, according to the control of a motor, for example, air flows 3002a and 3002b flowing through the haptic presentation device 3001 from the left to the right of FIG. 30 are generated. In this case, as compared with the haptic presentation device 2901 of FIG. 29 in which a force sensation continues to be presented in the left direction in the drawing, in the haptic presentation device 3001, the force of jet of the air flow 3002b is also added, and the efficiency of continuing to present the force sensation in the left direction in the drawing is improved. Incidentally, it would be obvious for one skilled in the art that the closing and opening of these holes is controlled (not inevitable) by a valve 3010 and a control circuit, so that the flow rate and flow speed can be controlled.

The turbine fin is a variable fin which can control a relation between a rotation direction and a blast direction, and even if the torque direction resulting from the rotation is the same direction, the flowing direction of an air current can be controlled by changing the angle of the fin. Besides, it may be fixed according to a use.

Incidentally, rotators of two motors, motor bodies, eccentric rotation bodies, two turbine fins in which the generating directions of air currents are opposite to each other are mounted to one rotating shaft 2802, and the flow direction of the air current may be controlled by selecting the turbine fin to be rotated (not shown).

(Applied Example 2)

Figure 31:
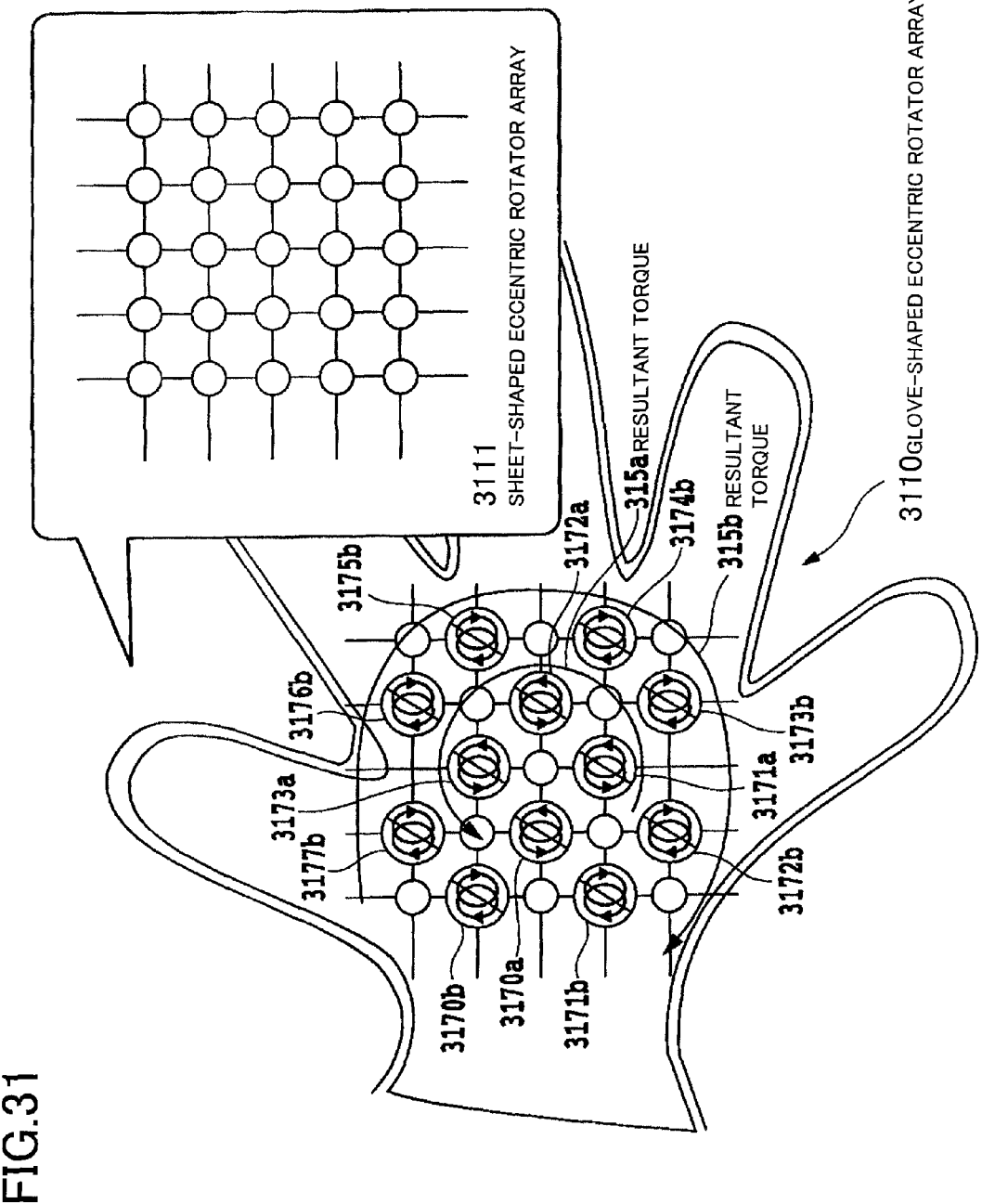
FIG. 31 is a view showing another applied example of the glove-shaped eccentric rotator array 890 of FIG. 15.

FIG. 31 is a view showing another applied example of the groove-shaped eccentric rotator array 890 of FIG. 15 and is a view showing a groove-shaped eccentric rotator array 3110 in which a sheet-shaped eccentric rotator array 3111 is formed into a groove shape. In FIG. 31, rotators are arranged like a grid, and only eccentric rotators 3170a to 3173a, and 3170b to 3177b rotate. By this, by suitably controlling the rotations of the eccentric rotators 3170a to 3173a, and 3170b to 3177b of the groove-shaped eccentric rotator array 3110, haptic information of a virtual twist as a spatial expansion can be presented onto the palm. In more detail, a large torque is presented in the same direction by the eccentric rotators 3170a to 3173a, so that a large resultant torque 315a to twist the center part of the palm counterclockwise is presented. Besides, a small torque is presented in the same direction by the eccentric rotators 3170b to 3177b, so that a resultant torque 315b to twist the palm peripheral part clockwise is presented. By this, a virtual twist haptic sensation is felt in which the palm center part is intensely twisted counterclockwise, and the palm peripheral part is weakly twisted clockwise.

Figure 32:
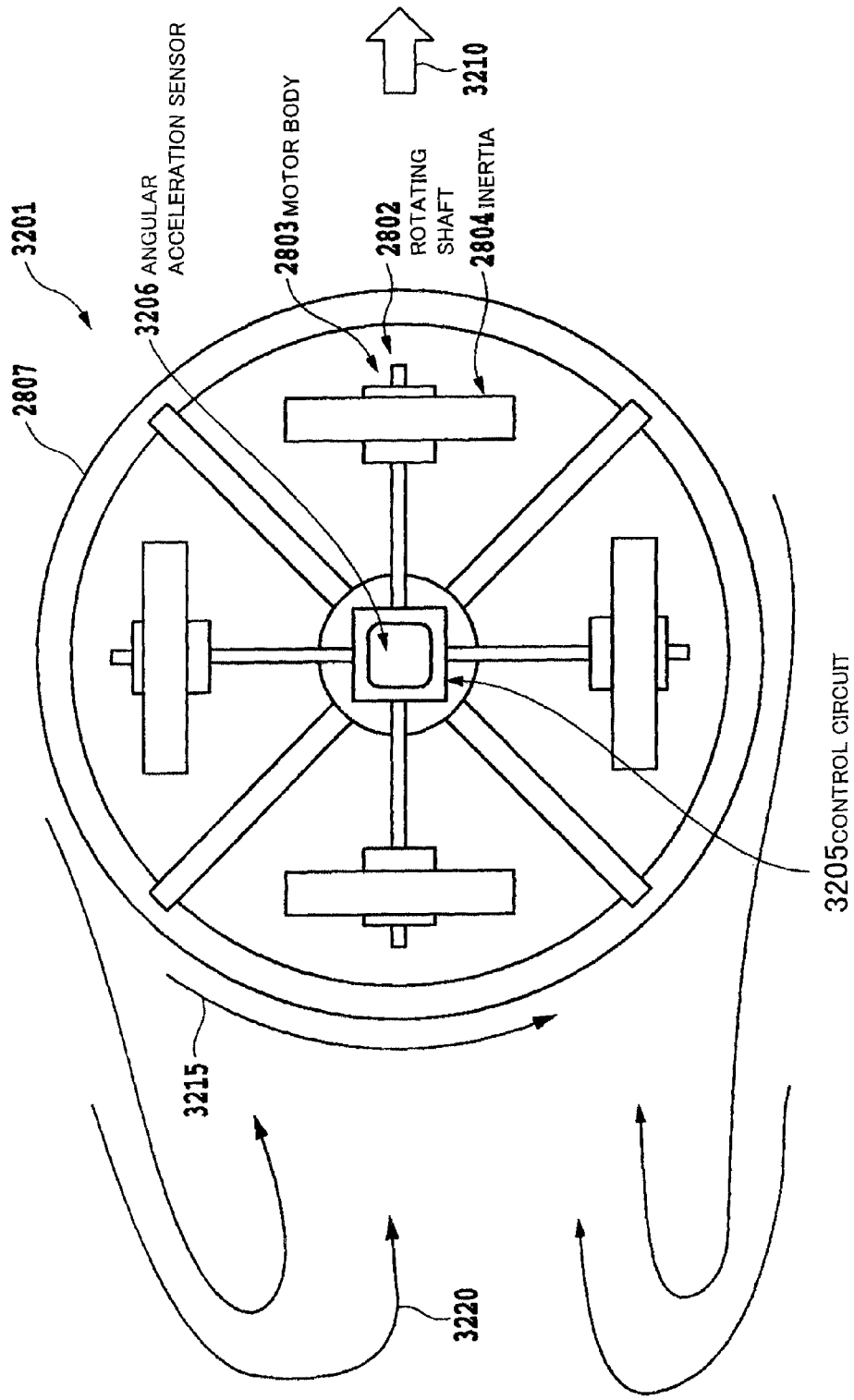
FIG. 32 is a view showing a two-dimensional sectional view of a haptic presentation device 3201 in which the haptic presentation device 2801 is further improved.

FIG. 32 is a view showing a two-dimensional sectional view of a haptic presentation device 3201 in which the haptic presentation device 2801 of FIG. 28 is further improved. In the haptic presentation device 3201, a control circuit 3205 and an angular acceleration sensor (and gravity/acceleration sensor) 3206 are arranged at the center part of a spherical housing 2807, and FIG. 32 is a sectional view taken along the center of the spherical housing 2807. The control circuit 3205 corresponds to the control device 4120 of FIG. 41, and the angular acceleration sensor (and the gravity/acceleration sensor) 3206 corresponds to the input device 4130 of FIG. 41. Although it is assumed that the haptic presentation device 3201 of FIG. 32 is a ball in a mode of a baseball ball, it may be a ball with any shape. The angular acceleration sensor 3206 monitors a back spin 3215 generated at the release when the ball (haptic presentation device 3201) is pitched in a direction denoted by reference numeral 3210 in the drawing. Besides, in the case of a uniform rotation motion, the gravity direction is detected by the gravity/acceleration sensor, and since the gravity direction is periodically changed in the xyz axis components of the sensor, the rotation of the ball can be monitored. Incidentally, even if the method as stated above is not used, when the rotation of the ball can be detected, another method can be applied. The control circuit 3205 analyzes the input information from the angular acceleration sensor (and the gravity/acceleration sensor) 3206, and controls a motor in the haptic presentation device 3201 so as to cancel the back spin 3215 of the ball (haptic presentation device 3201). Thus, the ball (haptic presentation device 3201) is not rotated, and becomes a breaking ball (so-called knuckle ball) irregularly swaying and changing by the influence of the flow and swirl generated behind it. Similarly, by freely controlling the rotation and the like, it is possible to realize various breaking balls including a curve, a shoot, and a breaking ball which is impossible in a real baseball, such as a breaking ball which is curved and then shoots and drops. Incidentally, the embodiment of FIG. 32 can be applied to the haptic presentation device 2901 of FIG. 29.

Reference is again made to the haptic presentation device 3001 of FIG. 30. In a conventional haptic presentation device in the VR, its own weight reduces the original VR effect to be felt by the user. Then, in the haptic presentation device 3001 of FIG. 30, the air current flowing through the haptic presentation device 3001 from the top to the bottom of FIG. 30 is generated by the control of the motor, so that the force of the jet of the air current toward the bottom reduces the weight of the haptic presentation device 3001 itself to be felt by the user, and the original effect to cause the user to feel the VR can be improved. Similarly, by generating the air current flowing through the haptic presentation device 3001 from the bottom to the top of FIG. 30, the user can be made to feel that the weight of the haptic presentation device 3001 itself is heavier than actual by the force of the jet of the air current toward the top.

FIGS. 33A and 33B are explanatory views of a pen-shaped device 3301 having the built-in haptic presentation device described in the embodiment. The pen-shaped device 3301 is provided with a touch panel 3350 on a surface, the touch panel 3350 indicates respective button columns denoted by reference numerals 3310, 3320, 3330, and 3340 in the drawing, and each of the button columns includes four buttons. It is intended that the pen-shaped device 3301 of this embodiment is applied to, for example, a pen-shaped cellular phone. Incidentally, the function of the touch panel 3350 may be realized by a physical button instead of the touch panel. Besides, each of the button columns may include a desired number of buttons instead of the four buttons. Besides, a desired number of button columns may be provided (as examples of these, FIGS. 42A to 42C are provided as supplemental explanation views of FIGS. 33A and 33B). Here, although the rotation of 180° is performed from FIG. 33A to FIG. 33B and the use is made, virtual operation panels which is the number of columns exist at intervals of a rotation angle of (360°/the number of columns).

As shown in FIG. 33A, in the case where the user grasps the pen-shaped device 3301 and the pen-shaped device 3301 is seen from a direction denoted by reference numeral 3302, the button columns 3310, 3320 and 3330 respectively have buttons of numeral input functions of "1, 4, 7, \*", "3, 6, 9, #" and "2, 5, 8, 0".

On the other hand, as shown in FIG. 33B, in the case where the user rotates the pen-shaped device 3301 from the state of FIG. 33A by 180° and grasps it, and the pen-shaped device 3301 is seen from a direction denoted by reference numeral 3302, the buttons "1, 4, 7, \*" of the button column 3310 respectively become kana input functions of "A, TA, MA, .", the buttons "3, 6, 9, #" of the button column 3320 respectively become kana input functions of "SA, HA, RA, (enter)", and the buttons

[◇, ♡, ♤, ♧]

of the button column 3340 become kana input functions of "KA, NA, HA, WA". That is, in the case of this example, the realization is performed with four rows and four columns, and as the front side of the device, the first column, the second column and the third column are used, and as the back side of the device, the third column, the fourth column, and the first column are made usable.

Figure 34A:
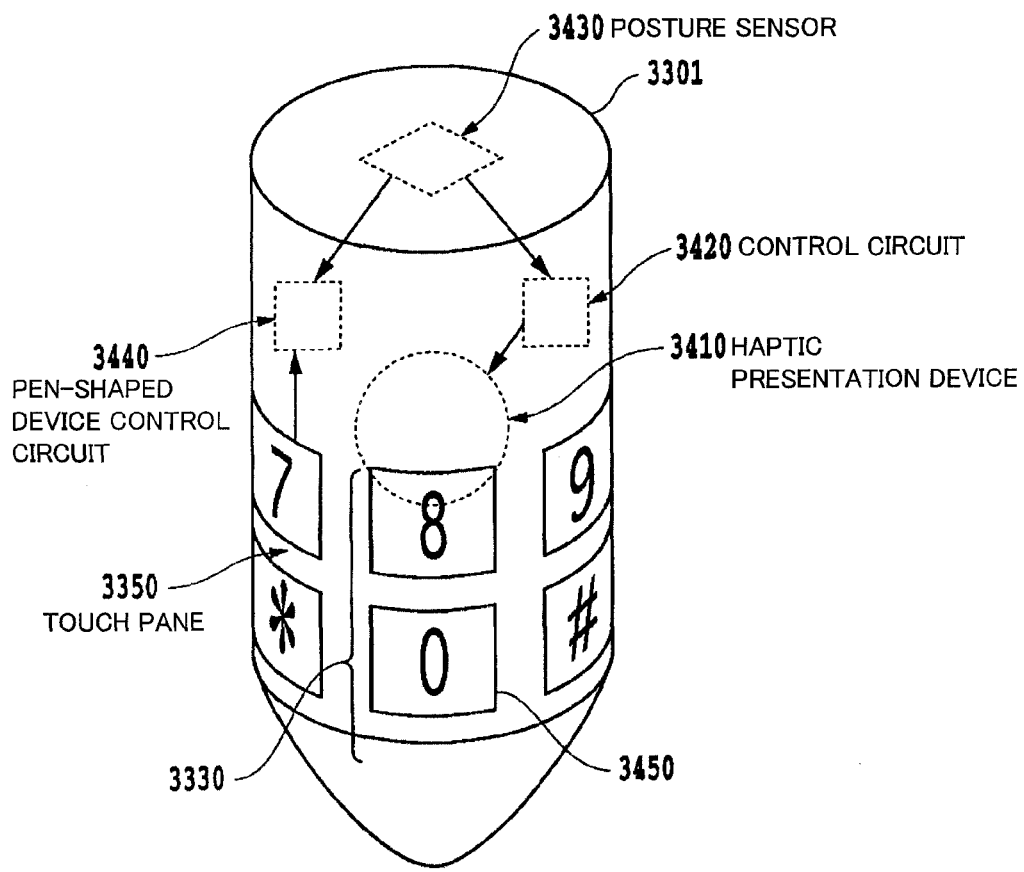
FIGS. 34A and 34B are views showing a rough structure of a pen-shaped device 3301.
Figure 34B:
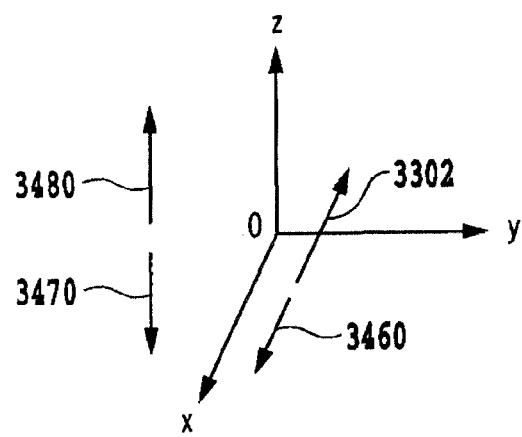

FIGS. 34A and 34B are views showing a rough structure of the pen-shaped device 3301. The pen-shaped device 3301 includes a haptic presentation device 3410, a control circuit 3420, a posture sensor 3430 based on a well-known acceleration sensor, a pen-shaped device control circuit 3440, and a touch panel 3350. The control circuit 3420 corresponds to the control device 4120 of FIG. 41, and the posture sensor 3430 corresponds to the input device 4130 of FIG. 41. The pen-shaped device control circuit 3440 judges, based on the input from the posture sensor 3430, in which state of FIG. 33A and FIG. 33B the user sees the pen-shaped device 3301. As in FIG. 33A or FIG. 33B, the input functions of the respective button columns denoted by reference numerals 3310, 3320, 3330 and 3340 are determined, and the corresponding buttons are displayed on the touch panel. Besides, the pen-shaped device control circuit 3440 processes the input from the touch panel 3350, and in the case where for example, the button "0" is depressed by the user, the input of numeral 0 is processed. Since a circuit and its control to process the input from the posture sensor 3430 and the input from the touch panel 3550, such as the pen-shaped device control circuit 3440, are well-known for one skilled in the art, the detailed description would be unnecessary.

Here, for example, in the case where the button "0" is depressed by the user, the posture sensor 3430 detects the posture change toward a direction 3302 in FIG. 34B, or the pressure sensor of the touch panel detects the motion of the depressing finger, and the control circuit 3420 analyzes the input information from the posture sensor 3430, controls the motor in the haptic presentation device 3410, and gives haptic feedback so as to present the movement in the directions 3460 and 3302, so that a feeling such as to press an actual button is presented in spite of the virtual button on the touch panel. Thus, the haptic presentation device 3410 presents the force in the directions 3460 and 3302, and causes the user to feel the depression of the button "0".

Besides, for example, in the case where the button "0" is rubbed by the user from the top to the bottom, the posture sensor 3430 detects a posture change toward a direction 3470 in FIG. 34B, or the sensor of the touch panel detects the movement of the finger, and the control circuit 3420 analyzes input information from the posture sensor 3430 and the touch panel sensor, controls the motor in the haptic presentation device 3410, and gives haptic feedback the movement in the directions 3470 and 3480, so that a feeling such as to operate an actual scroll wheel or joystick is presented in spite of the virtual wheel on the touch panel. Thus, the haptic presentation device 3410 presents the force in the directions 3470 and 3480, and causes the user to feel the operation feeling of the virtual scroll wheel.

Figure 35:
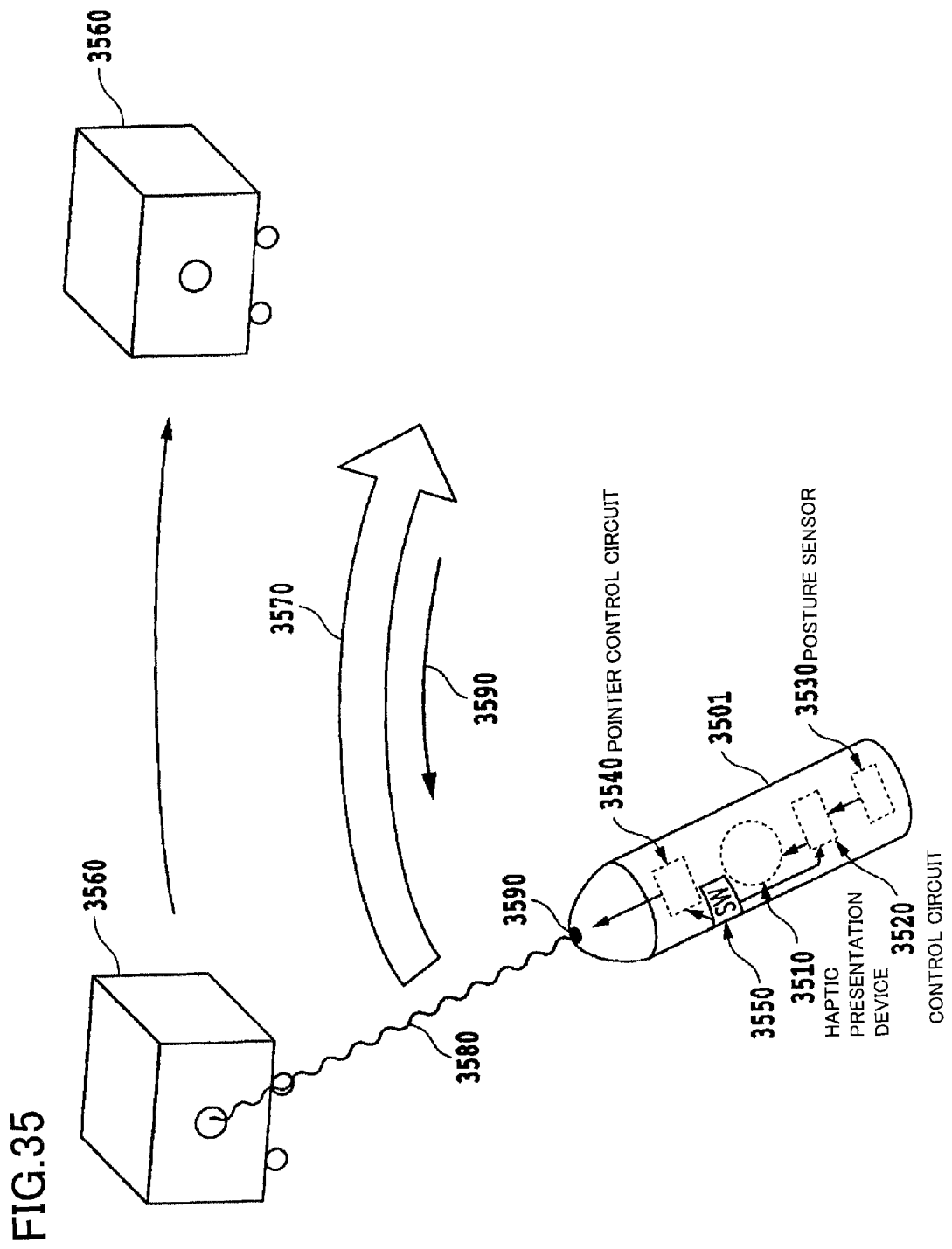
FIG. 35 is an explanatory view of a laser pointer 3501 having a built-in haptic presentation device of the embodiment and is a view showing a rough structure of the laser pointer 3501.

FIG. 35 is an explanatory view of a pointer 3501 having a built-in haptic presentation device described in the embodiment, and is a view showing a rough structure of the pointer 3501. The pointer 3501 includes a haptic presentation device 3510, a control circuit 3520, a posture sensor (or a position sensor or an acceleration sensor) 3530, a pointer control circuit 3540, a switch 3550, and a laser light source 3590. The control circuit 3520 corresponds to the control device 4120 in FIG. 41, and the posture sensor 3530 and the switch 3550 correspond to the input device 4130 in FIG. 41. The pointer control circuit 3540 makes a control so that when the switch 3550 is turned ON, a laser beam 3580 is emitted from the laser light source 3590. Since a circuit to control the laser light source 3590 to emit the laser beam 3580, such as the pointer control circuit 3540, and its control are well known for one skilled in the art, the detailed description would be unnecessary.

Here, in the case where the user depresses the switch 3550, and the pointer 3501 is swayed in a direction 3570, the posture sensor 3530 detects the posture change toward the direction 3570, and the control circuit 3520 analyzes input information from the posture sensor 3530, and controls a motor in the haptic presentation device 3510 so as to suppress the movement of the haptic presentation device 3510 toward the direction 3570. Thus, the haptic presentation device 3510 presents a force in a direction 3590, and causes the user to feel a resisting force against the sway direction 3570. By this, for example, in the case where the laser beam 3580 is irradiated to an object 3560 having a laser beam tracking function, and the object 3560 is moved from the left to the right in FIG. 35 while being pointed, the user is made to feel the resisting force (force in the direction 3590) against the direction 3570 in which the object 3560 is moved, and as a result, such a feeling that the user grasps the object 3560 and moves it is given. Here, although the selection of the object 3560 and the grasping intention are informed to the pointer control circuit 3540 by using the laser light source 3590 and the laser beam tracking function, no limitation is made to this as long as the selection and the grasping intension can be inputted.

Figure 36:
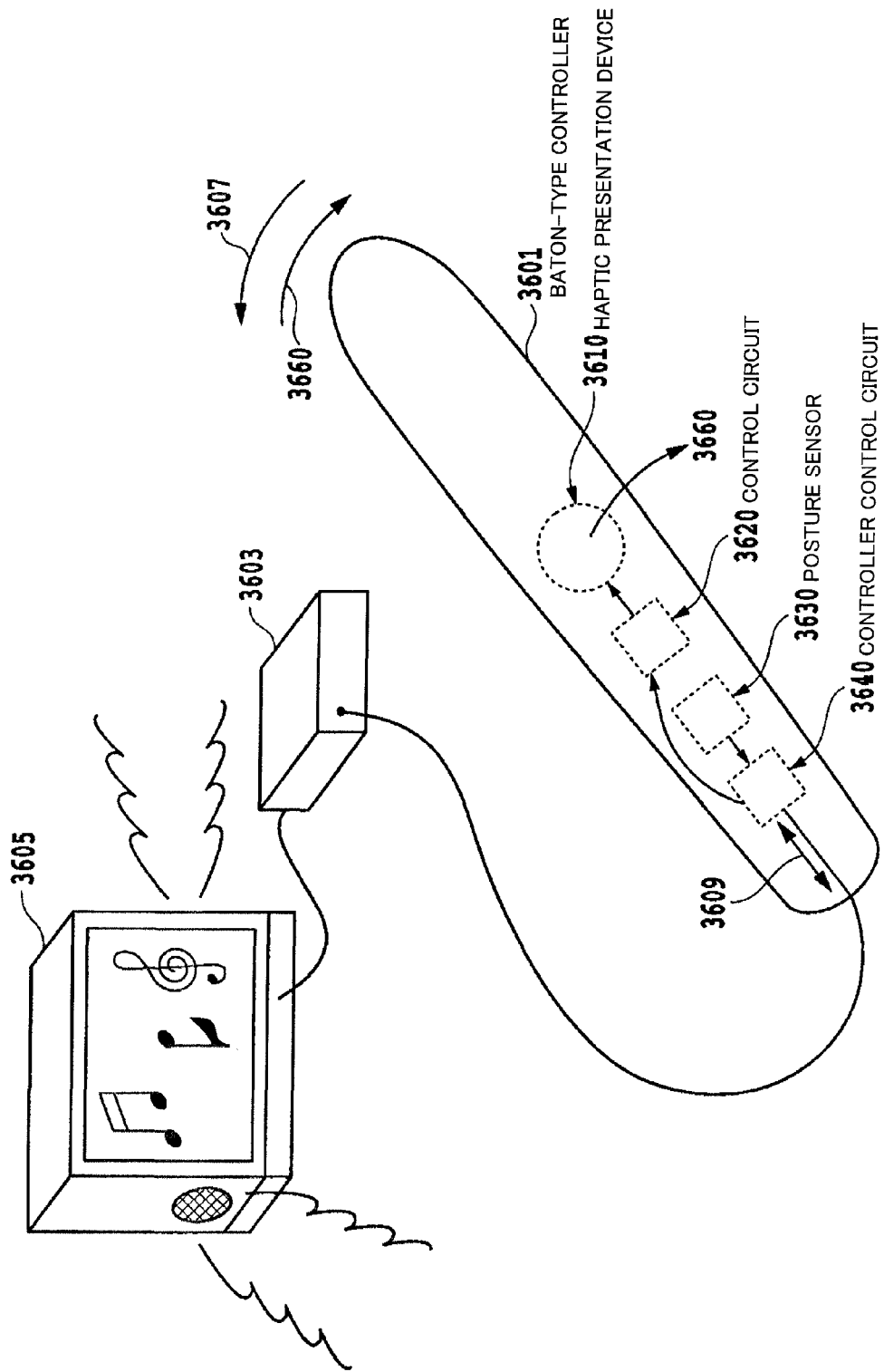
FIG. 36 is an explanatory view of a baton-type controller 3601 having a built-in haptic presentation device of the embodiment and is a view showing a rough structure of the baton-type controller 3601.

FIG. 36 is an explanatory view of a baton-type controller 3601 having a built-in haptic presentation device described in the embodiment, and is a view showing a rough structure of the baton-type controller 3601. The baton-type controller 3601 is a controller used in a well-known (conducting) music game of a home video game machine. The baton-type controller 3601 includes a haptic presentation device 3610, a control circuit 3620, a posture sensor 3630, and a controller control circuit 3640. The control circuit 3620 corresponds to the control device 4120 in FIG. 41, and the posture sensor 3630 and the controller control circuit 3640 correspond to the input device 4130 in FIG. 41. The controller control circuit 3640 transmits/receives a signal 3609 to/from a game machine 3606, processes input information from the posture sensor 3630 to transmit it to the game machine 3606, and receives an instruction from the game machine 3606. Since a circuit to perform a control to communicate with the game machine 3606, such as the controller control circuit 3640, and its control are well-known for one skilled in the art, the detailed description would be unnecessary. Incidentally, in FIG. 36, although a signal of a wired system is exemplified as the signal 3609, no limitation is made to this, and the signal 3609 may be a signal in a wireless system.

Here, when the user plays the music game of a monitor 3605, in the case where the baton-type controller 3601 is swayed in a direction 3607, the posture sensor (or pressure sensor) 3630 detects the grasping way and the posture change toward the direction 3607, and the controller control circuit 3640 processes the input information from the posture sensor 3630, and transmits it to the game machine 3606. The game machine 3606 processes the music game based on the information of the posture change from the posture sensor 3630, and the performance of an orchestra in the music game, such as a tempo, rhythm, and breath, is changed by the swinging way of the baton of the conductor. In the case where it is judged that the music at that time exceeds the performance speed at which a person can play and the dynamic range of a playing method, a suppression signal is transmitted to the controller control circuit 3640. When receiving the suppression signal, the controller control circuit 3640 transmits the information to the control circuit 3620. The control circuit 3620 analyzes the input information from the controller control circuit 3640, and controls a motor in the haptic presentation device 3610 so as to suppress the motion of the haptic presentation device 3610 toward the direction 3607. Thus, the haptic presentation device 3610 presents a force toward a direction 3660, and causes the user to feel a resisting force against the swing direction 3607. By this, in the music game, the music does not exceed the performance speed at which a person can play and the dynamic range of the playing method, and the music game becomes more real.

(Modified Examples)

Hereinafter, modified examples of the operation principles 1 to 3 will be described.

Figure 37:
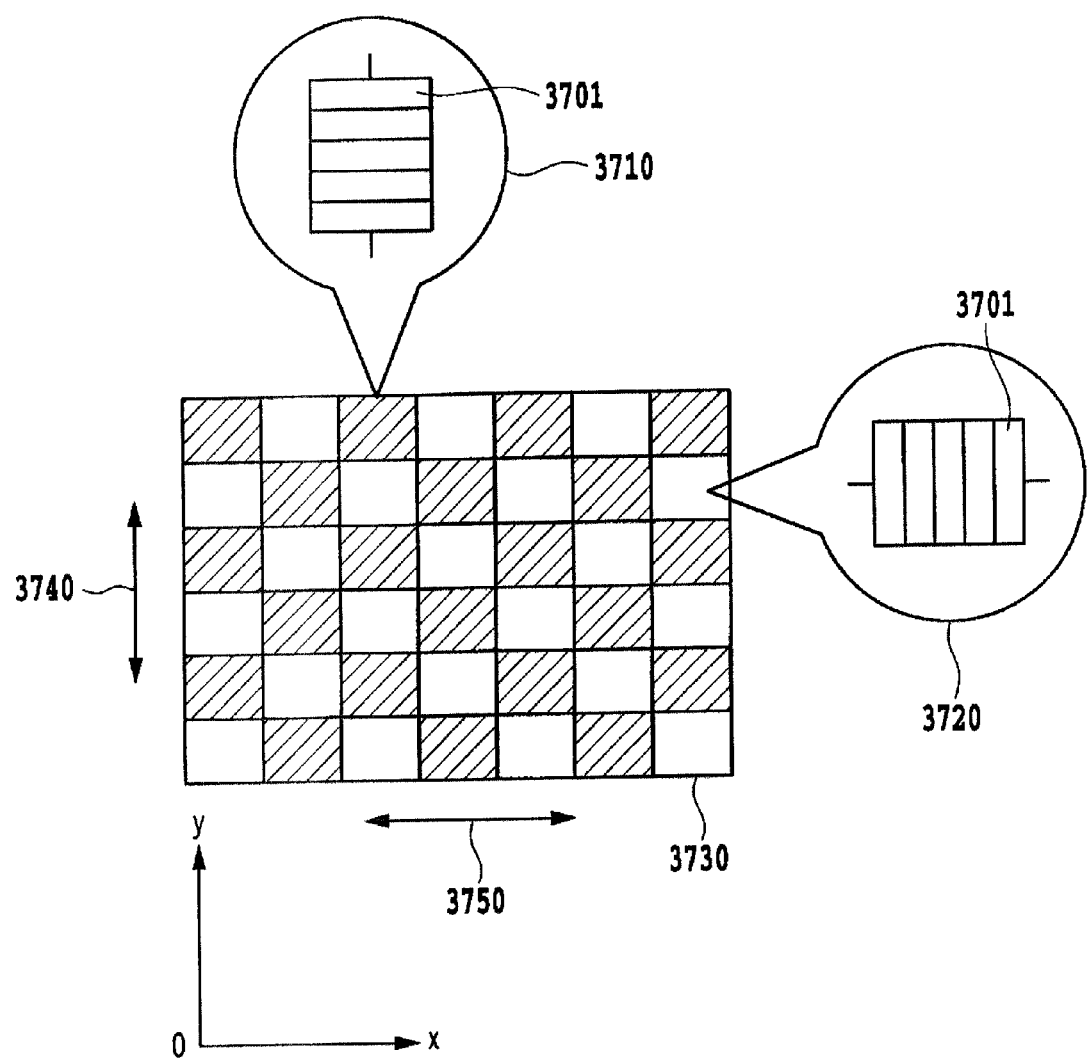
FIG. 37 is a view showing a rough structure of a modified example of the haptic information presentation method of FIG. 11D.

FIG. 37 is a view showing a rough structure of a modified example of the haptic information presentation method of FIG. 11D described in the embodiment. In FIG. 11D, the two eccentric rotators are synchronously rotated in the opposite directions, and the force to linearly generate the simple harmonic oscillations in an arbitrary direction is synthesized. FIG. 37 is a view showing a piezoelectric matrix 3730 as an oscillator in which instead of the eccentric rotators, piezoelectric elements 3701 are used. A piezoelectric array 3710 is constructed in which the plural piezoelectric elements 3701 are laminated in an x-direction in the drawing, a piezoelectric array 3720 is constructed in which the plural piezoelectric elements 3701 are laminated in a y-direction in the drawing, and the piezoelectric arrays 3710 and 3720 are alternatively arranged in the x and the y directions in the oscillator.

A haptic information presentation method using the piezoelectric matrix 3730 of FIG. 37 is a method in which the piezoelectric matrix 3730 is used instead of the rotator 4180 in FIG. 41. In the structure as stated above, the control device 4120 of FIG. 41 controls the voltage in the x direction in FIG. 37 to control simple harmonic oscillations 3750 in the x direction, and controls the voltage in the y direction in FIG. 37 to control simple harmonic oscillations 3740 in the y direction. Although a sufficient amplitude is not obtained by the single piezoelectric element 3701, in the structure of FIG. 37, the piezoelectric arrays 3710 and 3720 are constructed, so that a large amplitude can be produced. According to the method of FIG. 37, in the haptic presentation device 4110 of FIG. 41, a stepping motor and a servo motor required for driving the rotator 4180 become unnecessary, and also in the control device 4120, a control circuit for the motors becomes unnecessary, and the structure of the combination of the haptic presentation device and the control device becomes simple.

Further, it would be understood for one skilled in the art that when the piezoelectric matrix 3730 of FIG. 37 is expanded, and a piezoelectric cube is formed in which the piezoelectric arrays 3710 and 3720 are alternately arranged in the x, y and z directions, an oscillator can be formed in which simple harmonic oscillations in the x, y and z directions can be controlled. The method of FIG. 37 can be applied to, for example, a mechanism for generating a force in a desired direction by a controller of a game machine. Here, the arrangement pattern of the piezoelectric elements 3701 is arbitrary as long as the simple harmonic oscillations in the x, y and z directions can be generated.

Figure 38A:
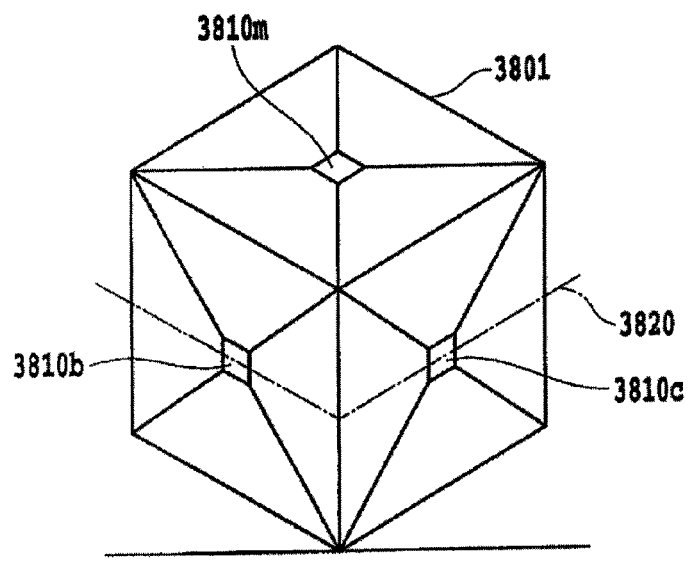
FIGS. 38A and 38B are views showing a rough structure of another modified example of the haptic information presentation method of FIG. 11D.
Figure 38B:
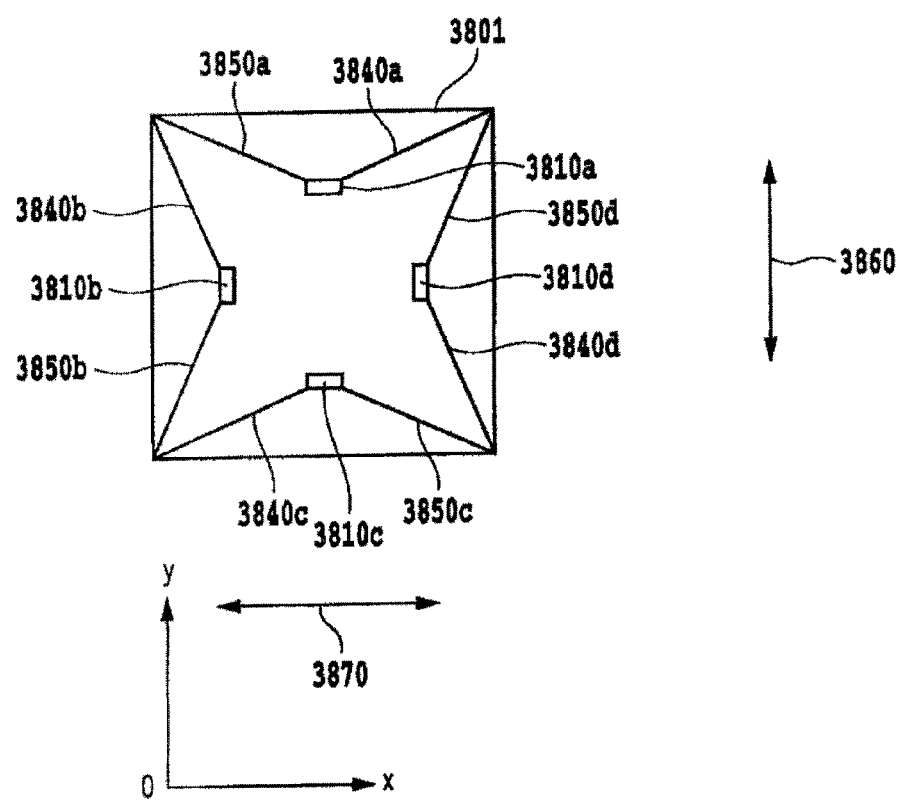

FIGS. 38A and 38B are also views showing a rough structure of another modified example of the haptic information presentation method of FIG. 11D described in the embodiment. FIG. 38A shows a cubic oscillator 3801 using a speaker structure instead of an eccentric rotator, and the oscillator 3801 includes magnets 3810b, 3810c, 3810m and the like of the speaker at the centers of the respective planes. Incidentally, the magnets 3810b, 3810c, 3810m and the like are not restricted to the centers of the respective planes, but may be located at arbitrary positions on the planes.

FIG. 38B is a view showing a sectional view in a case where in FIG. 38A, the oscillator 3801 is cut along a horizontal section 3820 passing through the barycenter and is seen. The oscillator 3801 includes, at the respective planes, cones 3840a, 3850a, 3840b, 3850b, 3840c, 3850c, 3840d and 3850d of the speaker combined with the magnets 3810a, 3810b, 3810c and 3810d, respectively.

The haptic information presentation method using the oscillator 3801 of FIGS. 38A and 38B is a method using the oscillator 3801 instead of the rotator 4180 in FIG. 41. In the structure as stated above, the control device 4120 of FIG. 41 controls, for example, the voltage of the magnet in the x direction in FIG. 38B to control simple harmonic oscillations 3870 in the x direction, and controls the voltage of the magnet in the y direction in FIG. 38B to control simple harmonic oscillations 3860 in the y direction. In the structure of FIGS. 38A and 38B, a large amplitude caused by the magnets of the speaker and by the vibrations of the cones can be produced. According to the method of FIGS. 38A and 38B, in the haptic presentation device 4110 of FIG. 41, a stepping motor and a servo motor required for driving the rotator 4180 become unnecessary, and also in the control device 4120, a control circuit for the motors becomes unnecessary, and the structure of the combination of the haptic presentation device and the control device becomes simple. Here, the structure of the cones 3840a, 3850a, 3840b, 3850b, 3840c, 3850c, 3840d and 3850d of the speaker combined with the respective magnets 3810a, 3810b, 3810c and 3810d may not be adopted, and as long as the simple harmonic oscillations in the x, y and z directions can be generated, no limitation is made particularly to the combination of the magnets and the cones, and a structure of only magnets may be adopted.

Figure 39A:
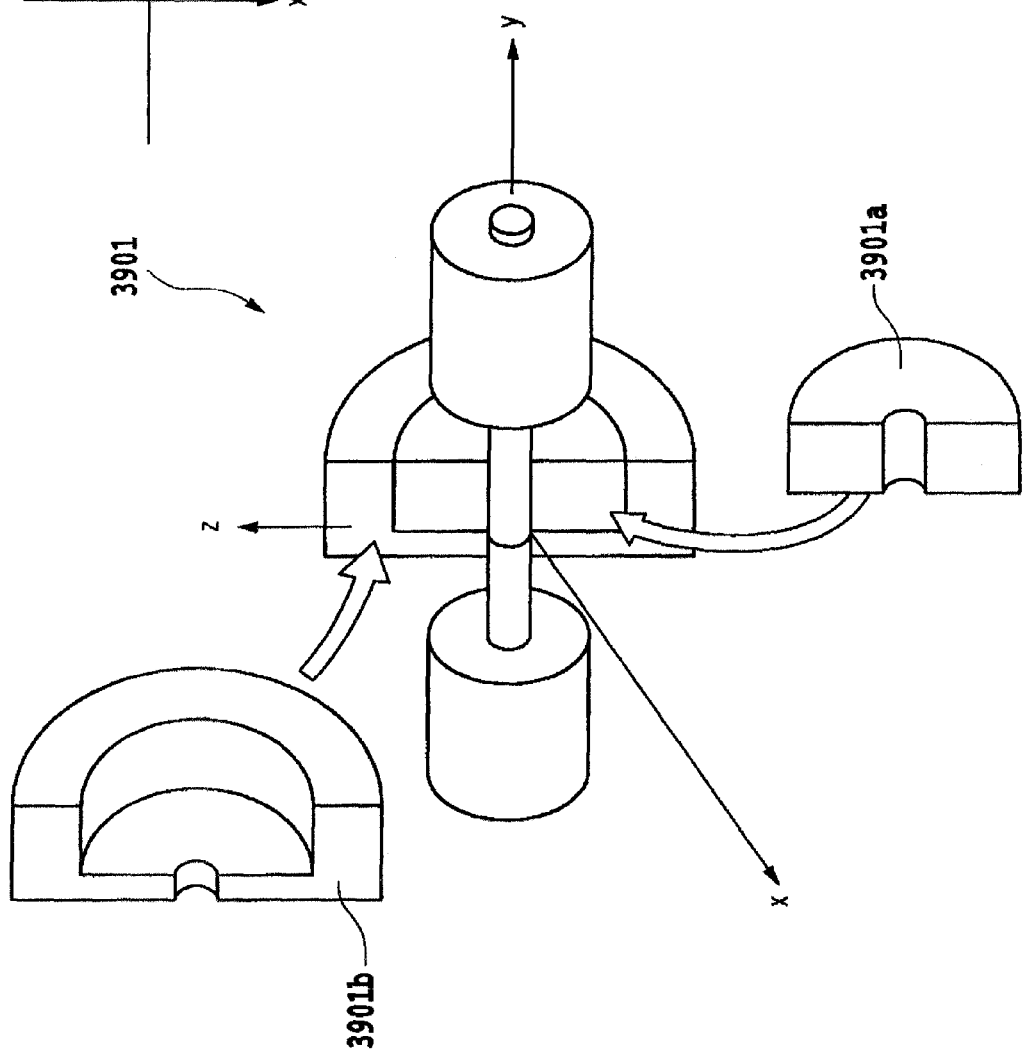
FIGS. 39A and 39B are views showing a rough structure of a modified example of a haptic presentation device 1301 of FIG. 13.
Figure 39B:
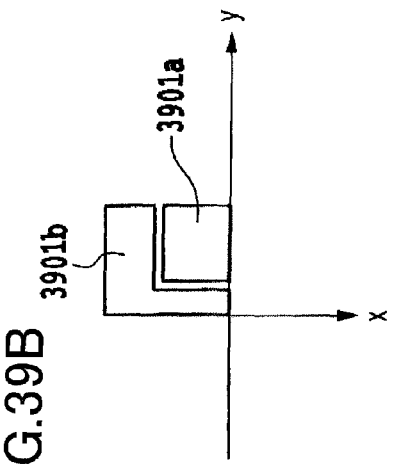

FIGS. 39A and 39B are views showing a rough structure of a modified example of the haptic presentation device 1301 of FIG. 13 described in the embodiment. In the haptic presentation device 1301 of FIG. 13, as in the description in FIGS. 11A to 11D and FIGS. 12A and 12B which is the premise thereof, the rotation axes of the two eccentric rotators opposite to each other have only to be parallel to each other, inclusive of the case where they are on the same axis. Thus, in the haptic presentation device 1301 of FIG. 13, since the two facing eccentric rotators are separated in the rotation axis direction and respectively rotate on different planes, a surplus moment caused by mutual forces generated in the rotation plane directions of the two eccentric rotators is generated in the haptic presentation device 1301, and there is a fear that a rattle or the like of the rotation axis is caused. FIGS. 39A and 39B are views showing a structure in which a surplus moment caused by the rotation of two eccentric rotators on different planes is suppressed.

The arrangement of two facing eccentric rotators 3901a and 3901b shown in FIGS. 39A and 39B is such that the rotation axes thereof are on the same axis, and a part of the eccentric rotator 3901b covers the eccentric rotator 3901a. By the structure as stated above, since many material particles of the two eccentric rotators 3901a and 3901b are rotated on the same plane around the same rotation axis, the generation of the surplus moment caused by the rotation of the two facing eccentric rotators on the different planes is suppressed, and the rattle or the like of the rotation axis is also relieved. As a result of this, it is impossible to cause three pairs of the eccentric rotators 3901a and 3901b and the like to intersect at right angles at the barycenter position as in FIG. 13, and the respective eccentric rotator pairs 3901a and 3901b and the like have only to be in an orthogonal relation. Besides, when the rotations can be three-dimensionally combined in an arbitrary direction, they may not be orthogonal to each other. Incidentally, this embodiment is not limited to the three dimensions, and according to a use, it can be applied to one dimension or two dimensions.

(Applied Example 3)

Figure 40:
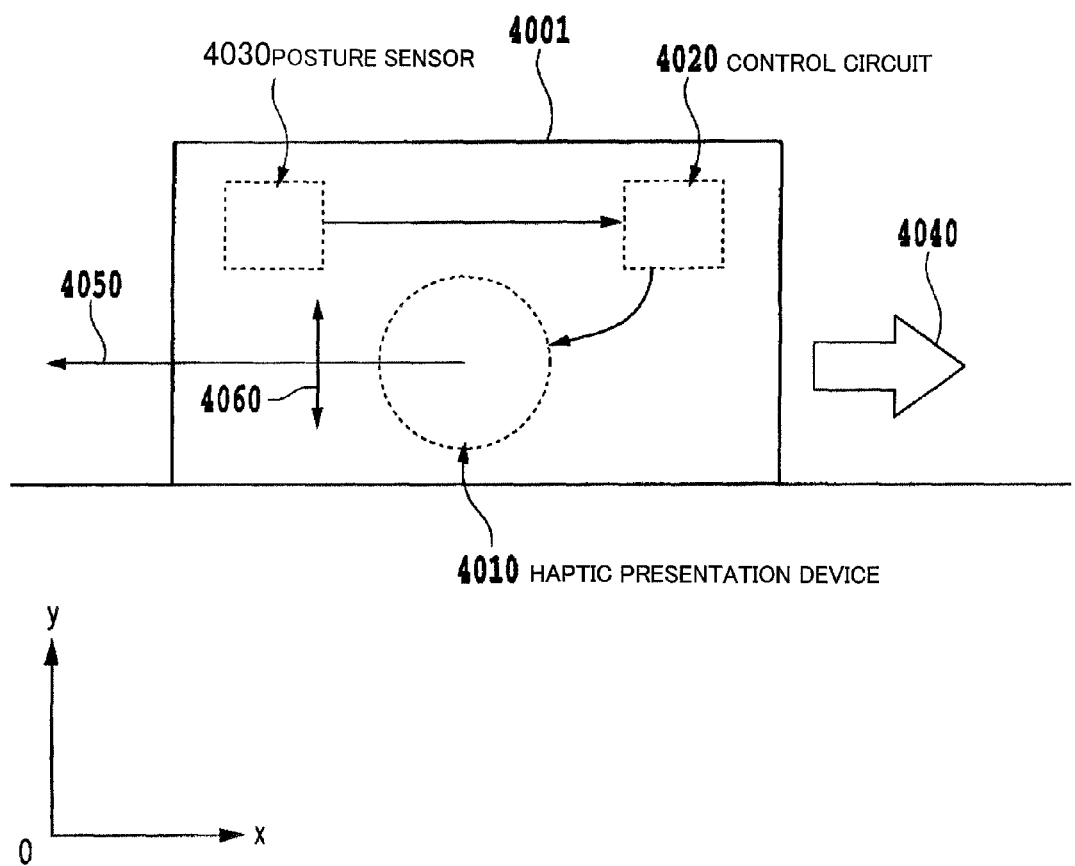
FIG. 40 is an explanatory view of a desk device 4001 having a built-in haptic presentation device of the embodiment and is a view showing a rough structure of the desk device 4001.

FIG. 40 is an explanatory view of a desk device 4001 having a built-in haptic presentation device described in the embodiment, and is a view showing a rough structure of the desk device 4001. The desk device 4001 includes a haptic presentation device 4010, a control circuit 4020, and a posture sensor 4030 (may be an acceleration, angular acceleration, or position sensor). The control circuit 4020 corresponds to the control device 4120 in FIG. 41, and the posture sensor 4030 corresponds to the input device 4130 in FIG. 41.

Here, for example, in the case where the desk device 4001 is moved on the desk by the user toward a direction 4040, the posture sensor 4030 detects the position change toward the direction 4040 in FIG. 40, and the control circuit 4020 analyzes input information from the posture sensor 4030, and controls motors in the haptic presentation device 4010 so as to suppress the motion of the haptic presentation device 4010 toward the direction 4040 or so as to sway it in the horizontal direction. Thus, the haptic presentation device 4010 presents a force in a direction 4050, and causes the user to feel the friction force on the desk against the movement toward the direction 4040.

Besides, for example, in the case where the desk device 4001 is moved on the desk by the user toward the direction 4040, the posture sensor 4030 detects the position change toward the direction 4040 in FIG. 40, and the control circuit 4020 analyzes input information from the posture sensor 4030, and controls motors in the haptic presentation device 4010 so as to generate a force in a normal direction to the direction 4040 of the haptic presentation device 4010. Thus, the haptic presentation device 4010 presents a force to generate simple harmonic oscillations or the like in the direction 4060, and causes the user to feel the roughness on the desk against the movement toward the direction 4040.

[Industrial Applicability]

By carrying out the invention, it is possible to realize the useful man-machine interface which can be mounted on an equipment used in the field of VR (Virtual Reality), an equipment used in the field of game, a cellular phone, a portable navigation equipment, a PDA (Personal digital Assistant) and the like.

More specifically, for example, in the field of the VR, the existence of an object in a virtual space, or the shock due to a collision can be presented by presenting a force to the person through the man-machine interface to which the invention is applied, or by giving a resisting force or a reaction force to limit the motion of the person. Besides, by mounting the interface on the cellular phone, the portable navigation equipment or the like, various instructions, guides and the like, which have not been conventionally seen, can be realized through the skin of the operator.

What is claimed:

1. A haptic information processing system comprising:
    an information media device comprising haptic information, wherein the information media device further comprises at least one of an object, a display member, and a wearable device, wherein the haptic information is obtained using at least one of a finger of an operator, a palm of the operator, a hand of the operator, a leg of the operator, a head of the operator, a body of the operator, an operation device, and a man-machine interface, and wherein the operator operates at least one of a surface of the information media device, an inside of the information media device, and a space around the surface of the information media device; and
    a haptic information processing device,
    wherein the haptic information processing device comprises:
    a reading device that reads the haptic information from the information media device;
    a haptic information presentation device that presents haptic information comprising illusion as if the operator operates the information media device, from the haptic information read by the reading device, by applying a haptic sensory characteristic of the operator; and
    a control device that controls the haptic information presentation device,
    wherein the haptic sensory characteristic comprises:
        (i) one or more of a physical quantity being given to the operator and a physical quantity being brought by an operation of the operator, and a sensory quantity to be presented to the operator, or
        (ii) a sensory quantity to be presented to the operator,
        wherein the haptic sensory characteristic is obtained by using at least one of a nonlinear characteristic, a hysteresis characteristic, a masking characteristic relating to a haptic sense, a threshold characteristic, and, muscle reflection, and
    wherein the sensory quantity comprises at least one of:
    a sensory quantity where an integral value of the sensory quantity does not become zero even if a further integral value of the physical quantity becomes zero; and
    a sensory quantity that does not exist physically.

2. The haptic information processing system according to claim 1, further comprising a detection device that detects a motion of the information media device and/or at least one motion of the finger, the palm, the hand, the leg, the head, the body, the operation device, and the man-machine interface for operating the information media device.

3. The haptic information processing system according to claim 1, wherein the information media device and/or the haptic information processing device further comprise a driving device that drives the haptic information.

4. The haptic information processing system according to claim 1, wherein the object comprises a virtual object.

5. The haptic information processing system according to claim 1, wherein the display member comprises at least one of a touch panel, a screen, an object to be moved, and a virtual reality space.

6. The haptic information processing system according to claim 1, wherein the haptic information presentation device comprises at least one of a motor, a piezoelectric element, a magnet, a speaker, a rotator, an eccentric rotator, and a rotation unit.

7. The haptic information processing system according to claim 1, wherein at least one information of presence of the information media device, a shape, an elastic force, a texture, state, a sensation, a change of the shape, a change of the elastic force, a change of the state, a change of the sensation, a change of a position, movement, an acceleration, a deceleration, rotation, a grasping behavior, a pushing behavior, a frictioning behavior, a rubbing behavior, a touch, video information, music information, visual information, and auditory information is presented to the operator in accordance with at least one motion of the finger, the palm, the hand, the leg, the head, the body, the operation device, and the man-machine interface.

8. The haptic information processing system according to claim 1, wherein the sensory quantity is changed according to at least one of muscle tensile state, physical state, physiological state, psychological state, breath state, posture state, and neural firing state, and/or
wherein the sensory quantity comprises at least one of:
a shape feeling;
an elastic force feeling;
a tactile sensation;
a feeling in which force is transmitted on a presentation object;
a feeling in which an object rolls on a presentation object;
a force sensation;
a vibration sensation;
a torque sensation;
an operation feeling;
an existence feeling;
an elastic feeling;
a texture sensation;
a pushing feeling by the operator;
an expansion feeling;
a pressure feeling;
a pulling feeling by the operator;
a pulled feeling from outside;
a sensation such that the operator feels the weight that is heavier than actual;
a sensation such that the operator feels the weight that is different from actual;
a pushed feeling from outside;
a feeling in which force is transmitted on at least one of the finger, the palm, the hand, the leg, the head, and the body;
a feeling in which an object rolls on at least one of the finger, the palm, the hand, the leg, the head, and the body;
a feeling in which force passes through at least one of the finger, the palm, the hand, the leg, the head, and the body;
a texture sensation on a surface of an object;
a feeling such that the operator grasps an object and moves the object;
an intensity sensation and/or an intensity change sensation of at least one of force, a force sensation, a vibration, a vibration sensation, fatigue, and a fatigue sensation;
a feeling such that the operator presses an object by at least one of the finger, the palm, the hand, the leg, the head, and the body;
a three-dimensional shape feeling of a sphere or a cubic;
an elastic feeling of a sphere or a cubic;
a soft feeling of a sphere or a cubic;
a torque sensation only in one direction;
a hysteresis sensation;
a feeling such that the intensity of a presentation physical quantity is corrected;
an operation feeling at a performance speed which the operator can play music, and/or in a playing method which the operator can play the music; and
an existence sensation of an object or a shock sensation due to a collision in a virtual space by presenting force to the operator and/or giving resisting force or reaction force to limit the motion of the operator.

9. The haptic information processing device according to claim 1, wherein the physical quantity comprises at least one of force, a vibration, a torque, an acceleration, a deceleration, an air pressure, a video, and sound, and
wherein the physical quantity comprises a plurality of physical quantities corresponding to a plurality of operation points, and the plurality of operation points on a curve representing the relationship of the haptic sensory characteristic are utilized, and/or
wherein the physical quantity is obtained by setting each of operation points on a curve representing the relationship of the haptic sensory characteristic and each operation duration time on each of operation points.

10. The haptic information processing system according to claim 1, wherein the control device controls the haptic information presentation device by at least one motion of the finger of the operator, the palm, the hand, the leg, the head, the body, the operation device, and the man-machine interface thereby to present at least one motion of:
a motion of a virtual object at least one of on a surface of the display member, inside of the display member, and around the surface of the display member;
a motion for grasping a virtual object by at least one movement of the finger, the palm, the hand and the body;
a motion for pushing a virtual object by at least one movement of the finger, the palm, the hand, the leg, the head, and the body;
a motion for presenting presence and/or collision of an object in a virtual space;
a motion due to an pressing operation and/or a touch operation;
an accelerated or decelerated motion;
a motion due to at least one sensitivity change of a vibration sensation, a haptic sensation, and a torque sensation in accordance with at least one of muscle tensile state, physical state, physiological state, psychological state, breath state, posture state, and neural firing state;
a motion acting on a muscle spindle in the muscle;
a motion due to at least one change of a vibration sensation, a force sensation, and a torque sensation by activating at least one of a vibration, force, and a torque in synchronization with the contraction of the muscle;

a motion due to at least one sensation change of muscle tensile state, physical state, physiological state, psychological state, breath state, posture state, and neural firing state;

a motion for suitably changing the space distribution of the haptic sensation in conformity with at least one movement of the finger, the palm, the hand, the leg, the head, the body, the operation device, and the man-machine interface;

a motion due to at least one operation of a posture sensor, a touch panel, and a corresponding button;

a motion due to input information from the detection of the posture and/or the motion of the finger, a motion for frictioning and/or rubbing the display member;

a motion due to at least one operation of a posture, a position, an acceleration, a deceleration, a switch, and a dial;

a motion for selecting and/or grasping and/or manipulating a virtual object;

a motion for presenting a posture change by detecting at least one of a grasping way, a direction and a position by the posture sensor;

a motion for suppressing the motion of the display member and/or swaying the display member in the horizontal direction by detecting a posture change by the posture sensor;

a motion for presenting force in a normal direction to a direction of the haptic information presentation device;

a motion that is limited by giving resisting force and/or reaction force;

a motion that is limited by giving resisting force and/or reaction force, wherein the resisting force and/or reaction force are spatially and/or temporally changed;

a motion of a virtual object which is presented by at least one of video information, visual information, auditory information, and haptic information;

a motion of a virtual object which is presented by at least one of a shape change, a surface change, movement, and rotation; and a motion with gyro effect.

11. A sensor for the haptic information processing system according to claim 1.

12. A haptic information processing device comprising:
a reading device that reads haptic information of an operator that operates at least one of a surface of an information media device, an inside of the information media device, and a space around the surface of the information media device;
a haptic information presentation device that presents haptic information comprising illusion as if the operator operates the information media device, from the haptic information read by the reading device, by applying a haptic sensory characteristic of the operator; and
a control device that controls the haptic information presentation device,
wherein the haptic sensory characteristic comprises:
  (i) one or more of a physical quantity being given to the operator and a physical quantity being brought by an operation of the operator, and a sensory quantity to be presented to the operator, or
  (ii) a sensory quantity to be presented to the operator,
wherein the haptic sensory characteristic is obtained by using at least one of a nonlinear characteristic, a hysteresis characteristic, a masking characteristic relating to a haptic sense, a threshold characteristic, and, muscle reflection, and wherein the sensory quantity comprises at least one of:
a sensory quantity where an integral value of the sensory quantity does not become zero even if a further integral value of the physical quantity becomes zero; and
a sensory quantity that does not exist physically.

13. The haptic information processing device according to claim 12, wherein the information media device comprises at least one of an object, a display member, a wearable device, a database, a content, and edit information of the object, the display member, the wearable device, the database and the content.

14. The haptic information processing device of claim 12, wherein data indicative of at least one of haptic device physical and sensory quantity is stored in memory.

15. The haptic information processing device according to claim 12, wherein at least one of haptic device physical and sensory quantity is modified.

16. The haptic information processing device according to claim 12, further comprising a driving device that drives the haptic information.

17. The haptic information processing device according to claim 11, wherein the object comprises a virtual object.

18. The haptic information processing device according to claim 12, wherein the display member comprises at least one of a touch panel, a screen, an object to be moved, and a virtual reality space.

19. The haptic information processing device according to claim 12, wherein the haptic information presentation device comprises at least one of a motor, a piezoelectric element, a magnet, a speaker, a rotator, an eccentric rotator, and a rotation unit.

20. The haptic information processing device according to claim 12, wherein at least one information of presence of the information media device, a shape, an elastic force, a texture, state, a sensation, a change of the shape, a change of the elastic force, a change of the state, a change of the sensation, a change of a position, movement, an acceleration, a deceleration, rotation, a grasping behavior, a pushing behavior, a frictioning behavior, a rubbing behavior, a touch, video information, music information, visual information, and auditory information is presented to the operator in accordance with at least one motion of the finger, the palm, the hand, the leg, the head, the body, the operation device, and the man-machine interface.

21. The haptic information processing device according to claim 12, wherein the control device controls the haptic information presentation device by at least one motion of the finger of the operator, the palm, the hand, the leg, the head, the body, the operation device, and the man-machine interface thereby to present at least one motion of:
a motion of a virtual object at least one of on a surface of the display member, inside of the display member, and around the surface of the display member;
a motion for grasping a virtual object by at least one movement of the finger, the palm, the hand and the body;
a motion for pushing a virtual object by at least one movement of the finger, the palm, the hand, the leg, the head, and the body;
a motion for presenting presence and/or collision of an object in a virtual space;
a motion due to an pressing operation and/or a touch operation;

an accelerated or decelerated motion;

a motion due to at least one sensitivity change of a vibration sensation, a haptic sensation, and a torque sensation in accordance with at least one of muscle tensile state, physical state, physiological state, psychological state, breath state, posture state, and neural firing state;

a motion acting on a muscle spindle in the muscle;

a motion due to at least one change of a vibration sensation, a force sensation, and a torque sensation by activating at least one of a vibration, force, and a torque in synchronization with the contraction of the muscle;

a motion due to at least one sensation change of muscle tensile state, physical state, physiological state, psychological state, breath state, posture state, and neural firing state;

a motion for suitably changing the space distribution of the haptic sensation in conformity with at least one movement of the finger, the palm, the hand, the leg, the head, the body, the operation device, and the man-machine interface;

a motion due to at least one operation of a posture sensor, a touch panel, and a corresponding button;

a motion due to input information from the detection of the posture and/or the motion of the finger;

a motion for frictioning and/or rubbing the display member;

a motion due to at least one operation of a posture, a position, an acceleration, a deceleration, a switch, and a dial;

a motion for selecting and/or grasping and/or manipulating a virtual object;

a motion for presenting a posture change by detecting at least one of a grasping way, a direction and a position by the posture sensor;

a motion for suppressing the motion of the display member and/or swaying the display member in the horizontal direction by detecting a posture change by the posture sensor;

a motion for presenting force in a normal direction to a direction of the haptic information presentation device;

a motion that is limited by giving resisting force and/or reaction force;

a motion that is limited by giving resisting force and/or reaction force, wherein the resisting force and/or reaction force are spatially and/or temporally changed;

a motion of a virtual object which is presented by at least one of video information, visual information, auditory information, and haptic information;

a motion of a virtual object which is presented by at least one of a shape change, a surface change, movement, and rotation; and a motion with gyro effect.

22. The haptic information processing device according to claim 12, wherein the sensory quantity is changed according to at least one of muscle tensile state, physical state, physiological state, psychological state, breath state, posture state, and neural firing state, and/or wherein the sensory quantity comprises at least one of:
a shape feeling;
an elastic force feeling;
a tactile sensation;
a feeling in which force is transmitted on a presentation object;
a feeling in which an object rolls on a presentation object;
a force sensation;
a vibration sensation;
a torque sensation;
an operation feeling;
an existence feeling;
an elastic feeling;
a texture sensation;
a pushing feeling by the operator;
an expansion feeling;
a pressure feeling;
a pulling feeling by the operator;
a pulled feeling from outside;
a sensation such that the operator feels the weight that is heavier than actual;
a sensation such that the operator feels the weight that is different from actual;
a pushed feeling from outside;
a feeling in which force is transmitted on at least one of the finger, the palm, the hand, the leg, the head, and the body;
a feeling in which an object rolls on at least one of the finger, the palm, the hand, the leg, the head, and the body;
a feeling in which force passes through at least one of the finger, the palm, the hand, the leg, the head, and the body;
a texture sensation on a surface of an object;
a feeling such that the operator grasps an object and moves the object;
an intensity sensation and/or an intensity change sensation of at least one of force, a force sensation, a vibration, a vibration sensation, fatigue, and a fatigue sensation;
a feeling such that the operator presses an object by at least one of the finger, the palm, the hand, the leg, the head, and the body;
a three-dimensional shape feeling of a sphere or a cubic;
an elastic feeling of a sphere or a cubic;
a soft feeling of a sphere or a cubic;
a torque sensation only in one direction;
a hysteresis sensation;
a feeling such that the intensity of a presentation physical quantity is corrected;
an operation feeling at a performance speed which the operator can play music, and/or in a playing method which the operator can play the music; and
an existence sensation of an object or a shock sensation due to a collision in a virtual space by presenting force to the operator and/or giving resisting force or reaction force to limit the motion of the operator.

23. The haptic information processing device according to claim 12, wherein the physical quantity comprises at least one of force, a vibration, a torque, an acceleration, a deceleration, an air pressure, a video, and sound, and wherein the physical quantity comprises a plurality of physical quantities corresponding to a plurality of operation points, and the plurality of operation points on a curve representing the relationship of the haptic sensory characteristic are utilized, and/or wherein the physical quantity is obtained by setting each of operation points on a curve representing the relationship of the haptic sensory characteristic and each operation duration time on each of operation points.

24. A sensor for the haptic information processing device according to claim 12.

25. A haptic information processing system comprising:
an information media device comprising haptic information, wherein the information media device further comprises at least one of an object, a display member, and a wearable device, wherein the haptic information is obtained using at least one of a finger of an operator, a palm of the operator, a hand of the operator, a leg of the operator, a head of the operator, a body of the operator, an operation device, and a man-machine interface, and wherein the operator operates at least one of a surface of the information media device, an inside of the information media device, and a space around the surface of the information media device; and a haptic information processing device, wherein the haptic information processing device comprises:

a reading device that reads the haptic information from the information media device;

a haptic information presentation device that presents haptic information comprising illusion as if the operator operates the information media device, from the haptic information read by the reading device, by applying a haptic sensory characteristic of the operator; and a control device that controls the haptic information presentation device, wherein the haptic sensory characteristic comprises:
  (i) one or more of a physical quantity being given to the operator and a physical quantity being brought by an operation of the operator, and a sensory quantity to be presented to the operator, or
  (ii) a sensory quantity to be presented to the operator, wherein the haptic sensory characteristic is obtained by using at least one of a nonlinear characteristic, a hysteresis characteristic, a masking characteristic relating to a haptic sense, a threshold characteristic, and, muscle reflection, and wherein the physical quantity comprises a plurality of physical quantities corresponding to a plurality of operation points, and the plurality of operation points on a curve representing the relationship of the haptic sensory characteristic are utilized, and/or the physical quantity is obtained by setting each of operation points on a curve representing the relationship of the haptic sensory characteristic and each operation duration time on each of operation points.

26. A haptic information processing device comprising:

a reading device that reads haptic information of an operator that operates at least one of a surface of an information media device, an inside of the information media device, and a space around the surface of the information media device;

a haptic information presentation device that presents haptic information comprising illusion as if the operator operates the information media device, from the haptic information read by the reading device, by applying a haptic sensory characteristic of the operator; and a control device that controls the haptic information presentation device, wherein the haptic sensory characteristic comprises:
  (i) one or more of a physical quantity being given to the operator and a physical quantity being brought by an operation of the operator, and a sensory quantity to be presented to the operator, or
  (ii) a sensory quantity to be presented to the operator, wherein the haptic sensory characteristic is obtained by using at least one of a nonlinear characteristic, a hysteresis characteristic, a masking characteristic relating to a haptic sense, a threshold characteristic, and, muscle reflection, and wherein the physical quantity comprises a plurality of physical quantities corresponding to a plurality of operation points, and the plurality of operation points on a curve representing the relationship of the haptic sensory characteristic are utilized, and/or the physical quantity is obtained by setting each of operation points on a curve representing the relationship of the haptic sensory characteristic and each operation duration time on each of operation points.

* * * * *